(12) United States Patent
Sorenson et al.

(10) Patent No.: US 12,330,738 B2
(45) Date of Patent: Jun. 17, 2025

(54) OFF-ROAD VEHICLE

(71) Applicant: Arctic Cat Inc., Thief River Falls, MN (US)

(72) Inventors: Derek Sorenson, Thief River Falls, MN (US); Lucas Purcell, Grand Forks, ND (US); Ethan R. Klaphake, Royalton, MN (US); Jens T. Pearson, Grand Forks, ND (US); Brent Gilge, Bemidji, MN (US); Chuck Simenson, Thief River Falls, MN (US); Christopher J. Evans, Warren, MN (US); Gayland Jensen, Thief River Falls, MN (US); Todd MacDonald, Balderson (CA); Ira Johnson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 785 days.

(21) Appl. No.: 17/529,725

(22) Filed: Nov. 18, 2021

(65) Prior Publication Data

US 2022/0153380 A1     May 19, 2022

Related U.S. Application Data

(60) Provisional application No. 63/115,526, filed on Nov. 18, 2020.

(51) Int. Cl.
*B62K 5/01*     (2013.01)
*B62J 41/00*    (2020.01)
(Continued)

(52) U.S. Cl.
CPC ............... *B62K 19/40* (2013.01); *B62J 41/00* (2020.02); *B62K 5/01* (2013.01); *B62K 19/32* (2013.01)

(58) Field of Classification Search
CPC . B62K 5/01; B62K 5/08; B62K 11/04; B62K 19/40; B62K 19/32; B62L 3/08; B62L 3/023; B62J 35/00; B62J 41/00
(Continued)

(56) References Cited

U.S. PATENT DOCUMENTS

| 6,142,123 A | 11/2000 | Galasso et al. |
| 6,547,027 B1 | 4/2003 | Kalhok et al. |

(Continued)

FOREIGN PATENT DOCUMENTS

| CA | 2901479 A1 | 10/2014 |
| DE | 102017116223 A1 | 1/2019 |
| WO | 2020147417 A1 | 7/2020 |

OTHER PUBLICATIONS

"Non-Final Office Action for Application No. 3,139,436 mailed on Oct. 11, 2023, 3 pages", 3 Pages.

(Continued)

*Primary Examiner* — Kevin Hurley
*Assistant Examiner* — Felicia L. Brittman-Alabi
(74) *Attorney, Agent, or Firm* — Billion & Armitage

(57) ABSTRACT

Embodiments include an off-road vehicle with a straddle seat, a plurality of ground engaging members, a prime mover and a frame having a removable frame portion overlying the prime mover, wherein at least a portion of the engine extends above at least a portion of the removable frame portion, and wherein at least a portion of the straddle seat extends over the removable frame portion and the prime mover.

19 Claims, 96 Drawing Sheets

(51) Int. Cl.
*B62K 19/32* (2006.01)
*B62K 19/40* (2006.01)

(58) Field of Classification Search
USPC .......................................................... 180/219
See application file for complete search history.

(56) References Cited

U.S. PATENT DOCUMENTS

| | | |
|---|---|---|
| 6,929,278 B2 | 8/2005 | Vaisanen |
| 7,438,153 B2 | 10/2008 | Kalsnes et al. |
| 7,559,576 B1 | 7/2009 | Honkala et al. |
| 8,967,314 B2 | 3/2015 | Murayama |
| 9,649,928 B2 | 5/2017 | Danielson et al. |
| 9,873,316 B2 | 1/2018 | Lovold et al. |
| 9,944,177 B2 | 4/2018 | Fischer et al. |
| 10,576,817 B2 | 3/2020 | Battaglini et al. |
| 10,793,181 B2 | 10/2020 | Bennett et al. |
| 10,946,736 B2 | 3/2021 | Fischer et al. |
| 11,173,808 B2 | 11/2021 | Swain et al. |
| 11,332,211 B2 * | 5/2022 | Li .................... F02M 35/10091 |
| 2002/0033295 A1 | 3/2002 | Korenjak et al. |
| 2004/0216942 A1 * | 11/2004 | Tanaka .................... B60K 5/04 180/292 |
| 2005/0103553 A1 | 5/2005 | Korenjak et al. |
| 2007/0246901 A1 | 10/2007 | Houser et al. |
| 2008/0217088 A1 | 9/2008 | Berg |
| 2010/0327552 A1 | 12/2010 | Simard et al. |
| 2014/0262571 A1 | 9/2014 | Murayama |
| 2019/0248405 A1 | 8/2019 | Bennett et al. |
| 2021/0214038 A1 | 7/2021 | Couture-Pelletier et al. |
| 2021/0285368 A1 | 9/2021 | Wizgall et al. |
| 2022/0250704 A1 | 8/2022 | Li et al. |
| 2022/0258825 A1 | 8/2022 | Li et al. |

OTHER PUBLICATIONS

MXA's History of Reverse-Cylinder Engine Designs, Motocross Action Magazine, downloaded Jul. 11, 2023, 16 pages., Dec. 25, 2020.

"Office Action for Application No. 3,139,436, mailed on Nov. 27, 2024, 5 pages".

* cited by examiner

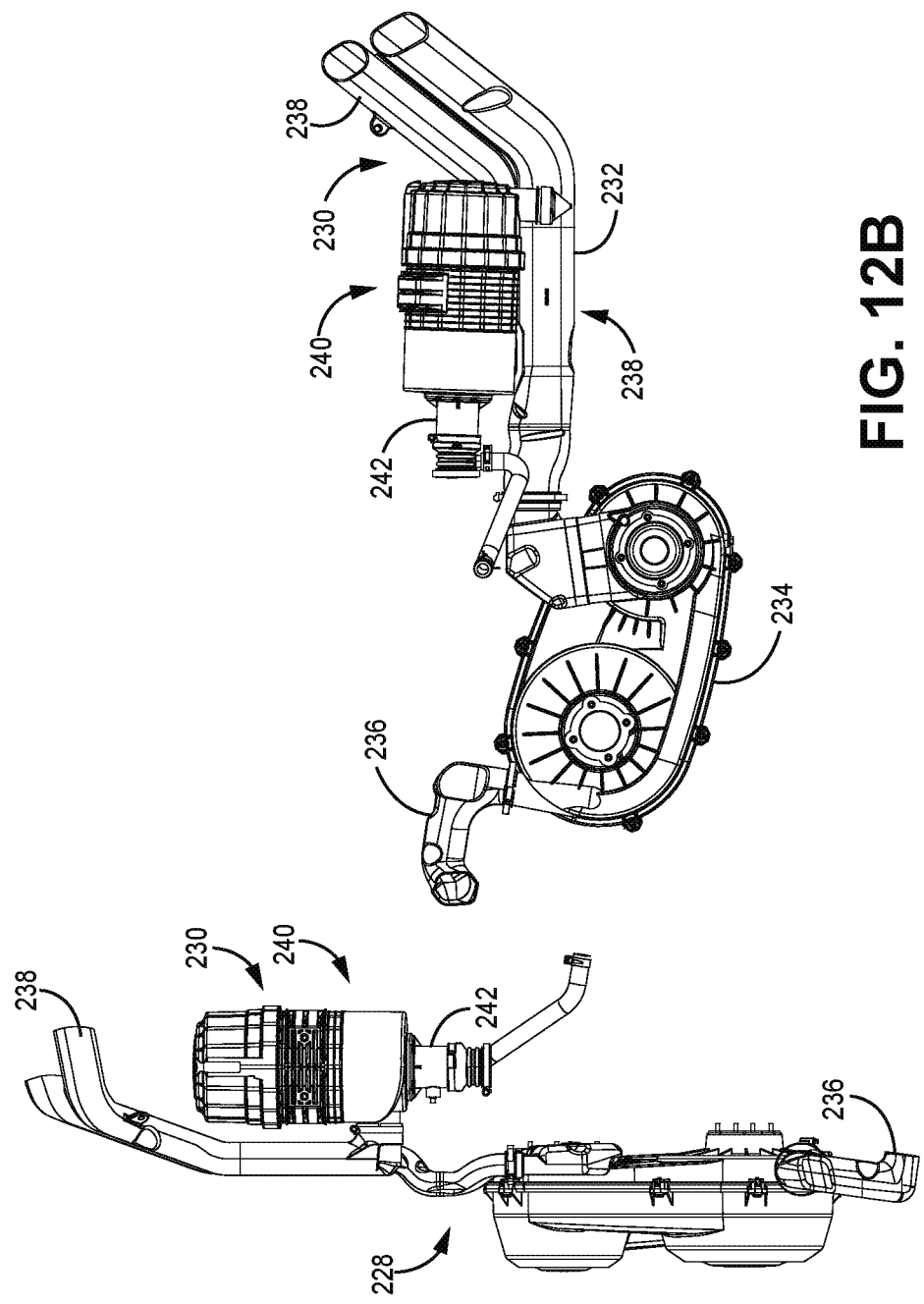

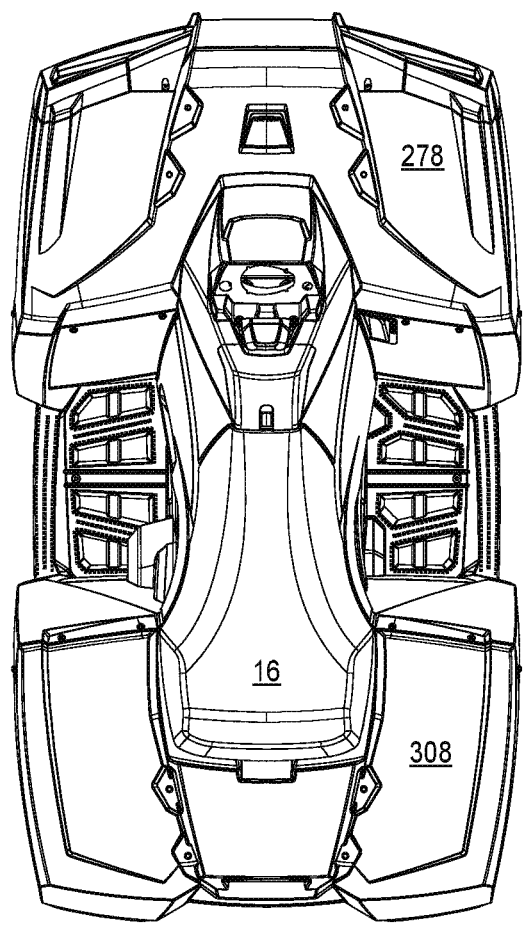
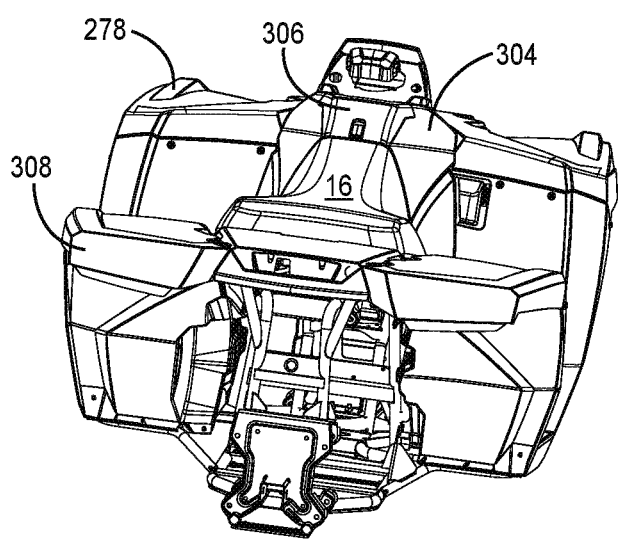
FIG. 15I
FIG. 15H

US 12,330,738 B2

OFF-ROAD VEHICLE

BACKGROUND

Off-road recreational vehicles, such as side-by-side recreational off-highway vehicles ("ROVs") or all-terrain vehicles ("ATVs"), are quite capable in a wide variety of riding environments and situations, whether for sport or utility purposes. The vehicles can be easy to enter and exit and easy to operate with controls and ergonomics somewhat similar to automobiles. However, unlike most automobiles, off-road recreational vehicles can be driven on harsh off-road terrain.

SUMMARY

Embodiments include an off-road vehicle with a straddle seat, a plurality of ground engaging members, a prime mover and a frame having a removable frame portion overlying the prime mover, wherein at least a portion of the engine extends above at least a portion of the removable frame portion, and wherein at least a portion of the straddle seat extends over the removable frame portion and the prime mover.

Embodiments additionally include an off-road vehicle including a straddle seat, a plurality of ground engaging members, a prime mover, a frame having a steering hub, and a steering assembly, the steering assembly comprising a steering post and a bellcrank, the bellcrank having an opening therein, the opening being coaxial with the steering post, wherein the opening in the bellcrank is rotatably coupled with the steering hub.

Embodiments include an off-road vehicle including a straddle seat, a plurality of ground engaging members, a prime mover, a frame, and a foot well system, in contact with the frame, wherein the foot well system includes two or more configurable panels connected by a living hinge.

BRIEF DESCRIPTION OF DRAWINGS

This written disclosure describes illustrative embodiments that are non-limiting and non-exhaustive. Reference is made to illustrative embodiments that are depicted in the figures, in which:

FIGS. 12A-B illustrate perspective views of a CVT air handling system, according to some embodiments of the present disclosure.

DETAILED DESCRIPTION

Figure 1A:
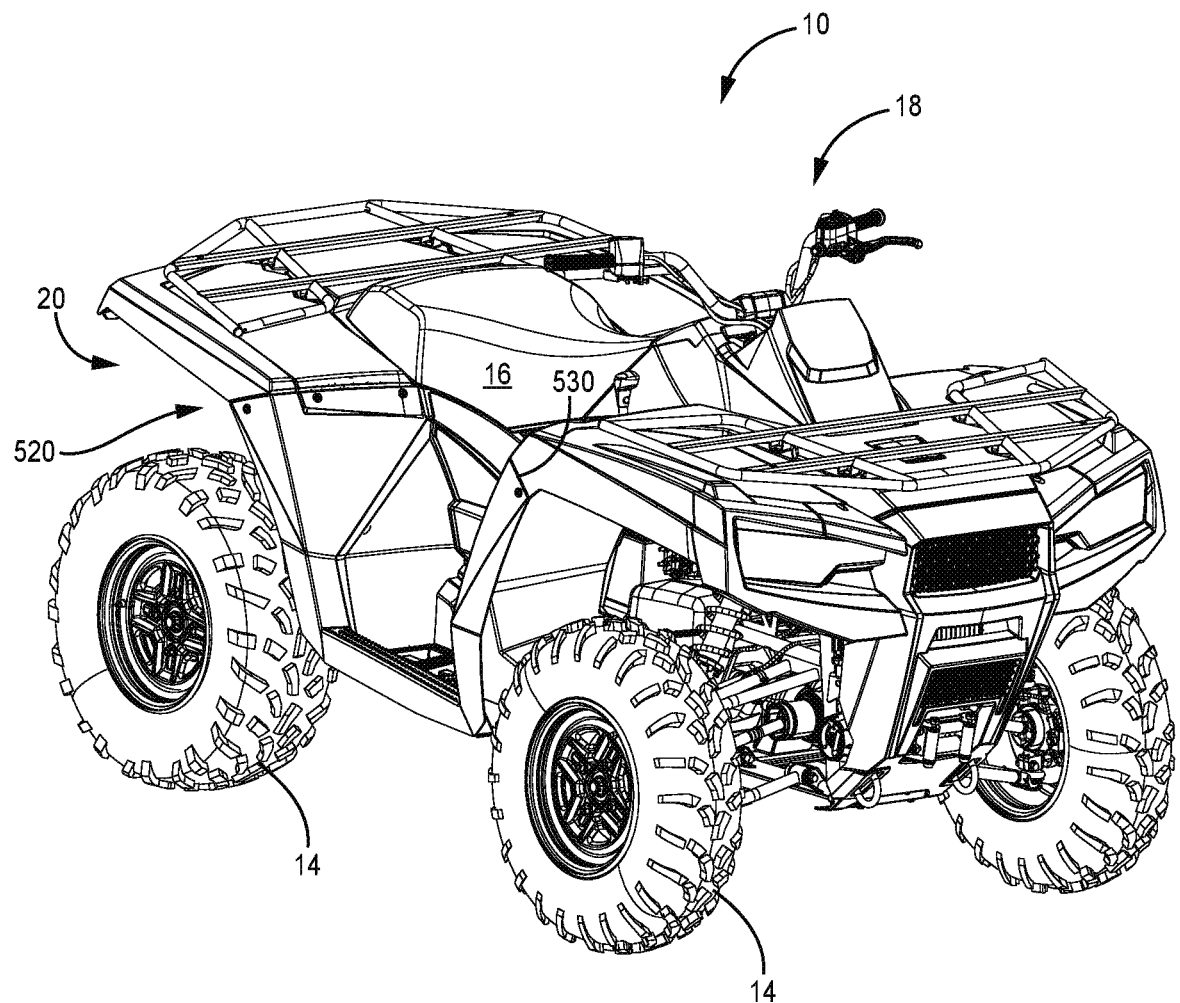
FIGS. 1A-F illustrate perspective views of an off-road vehicle, according to some embodiments of the present disclosure.

Embodiments of the present disclosure describe various aspects of an off-road vehicle, such as an ATV (all-terrain vehicle). Embodiments include a removable frame assembly for ease of engine and transaxle assembly and for great consistency of parts among various models. The disclosure here describes an air handling, cooling, and exhaust system optimized for handling muddy and wet off-road conditions of the vehicle. Also described within is a front rack support bracket that connects and support various components, saving space and reducing part count. Embodiments within also discuss a molded foot well system that lays flat for shipping and storage in a first configuration and when in second configuration (installation configuration), provides additional structural and aesthetic benefits to the vehicle. Numerous additional embodiments are disclosed herein that provide for a higher performing, lighter weight, narrower, and more efficiently built off-road vehicle.

This application incorporates by reference the subject matter of application titled, "ENGINE", having application Ser. No. 16/816,201, filed Mar. 11, 2020, and having inventors Eberhard Wizgall and Dominik Hermann.

As shown in FIGS. 1A-F, in some embodiments, an off-road vehicle 10 has frame 12 (FIGS. 1B and 1E), a plurality of ground engaging members 14, a straddle seat 16, operator controls 18, and a plurality of body panels 20. As further shown in FIG. 1B, in at least some embodiments, the off-road vehicle 10 includes a shifter 22. Shifter 22 permits the operator to select a transmission setting such as: park, reverse, neutral, high, low.

Figure 2A:
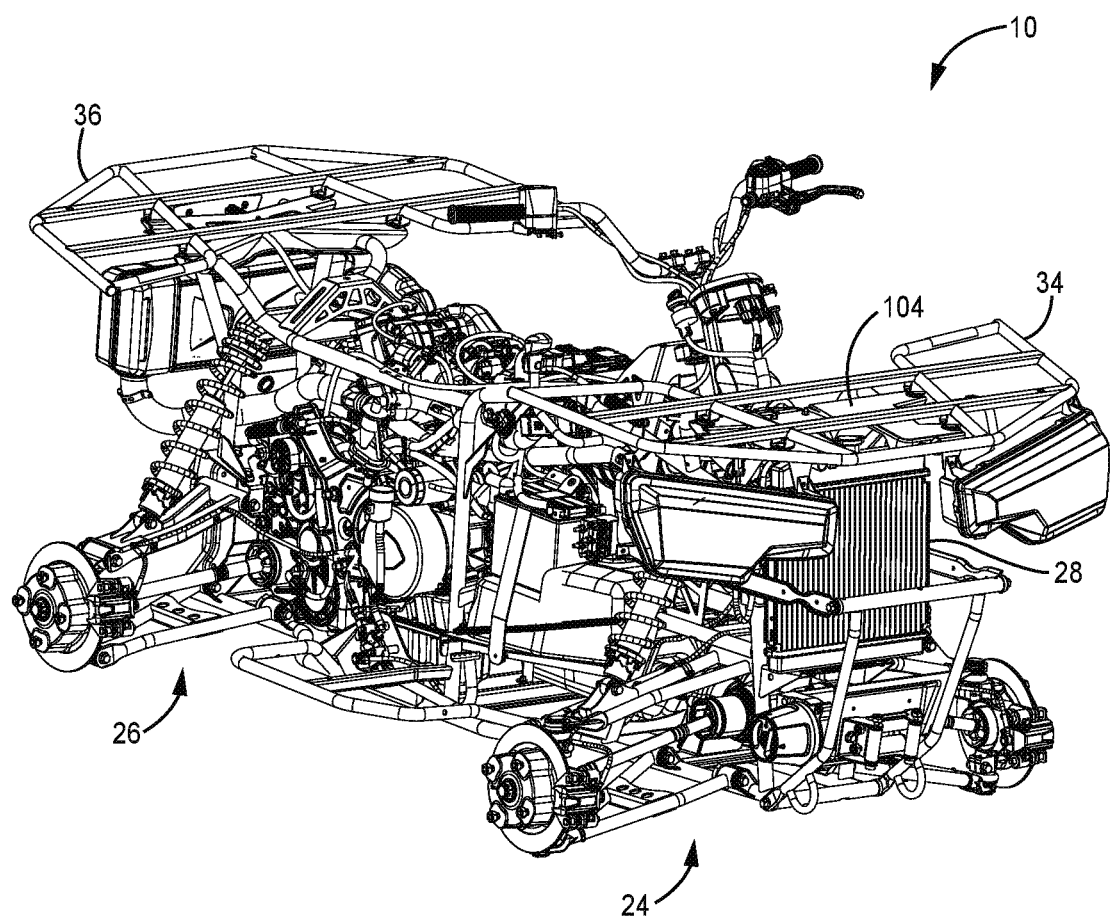
FIGS. 2A-F illustrate perspective views of a partial off-road vehicle including suspension components, according to some embodiments of the present disclosure.
Figure 2B:
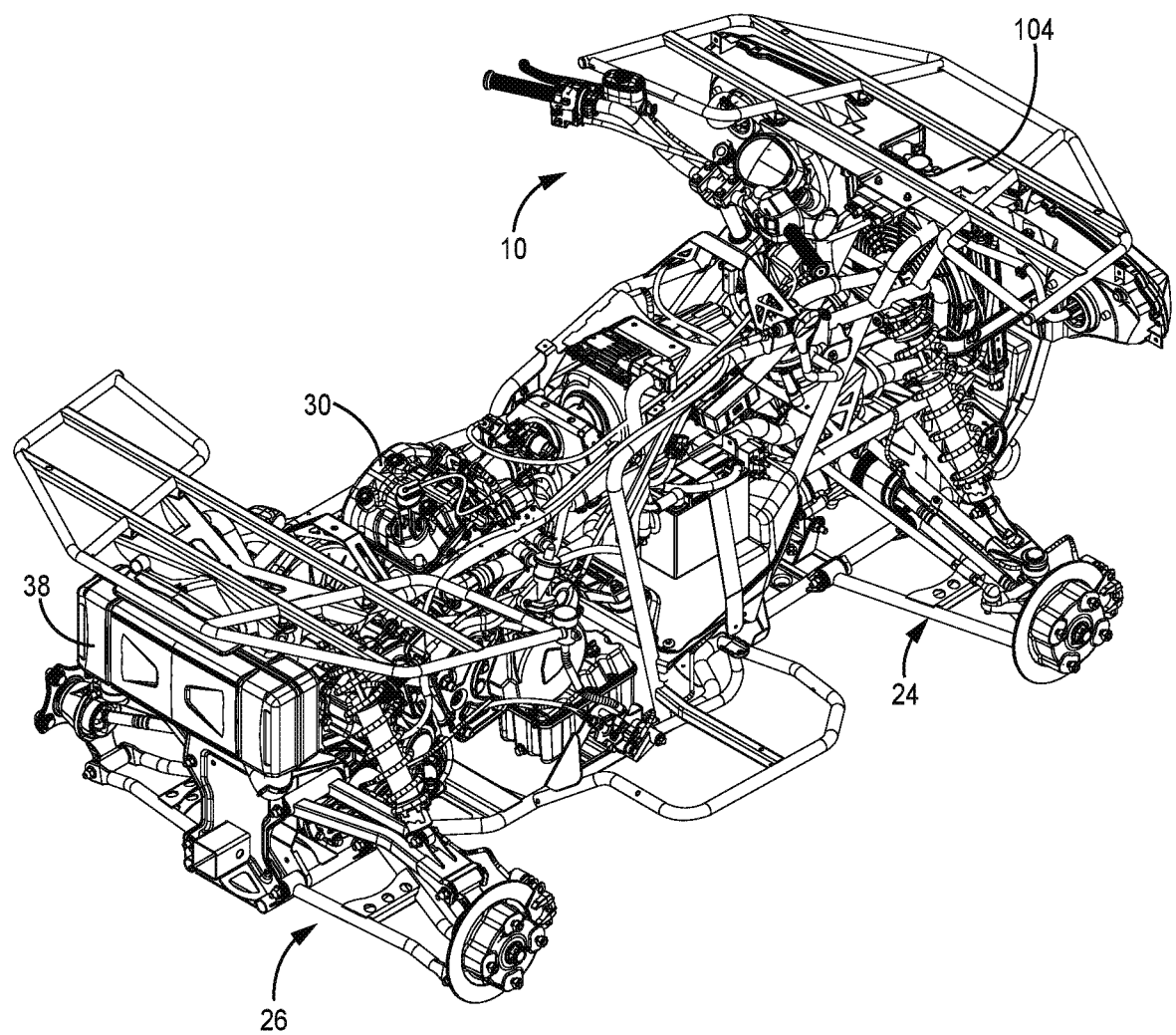
Figure 2C:
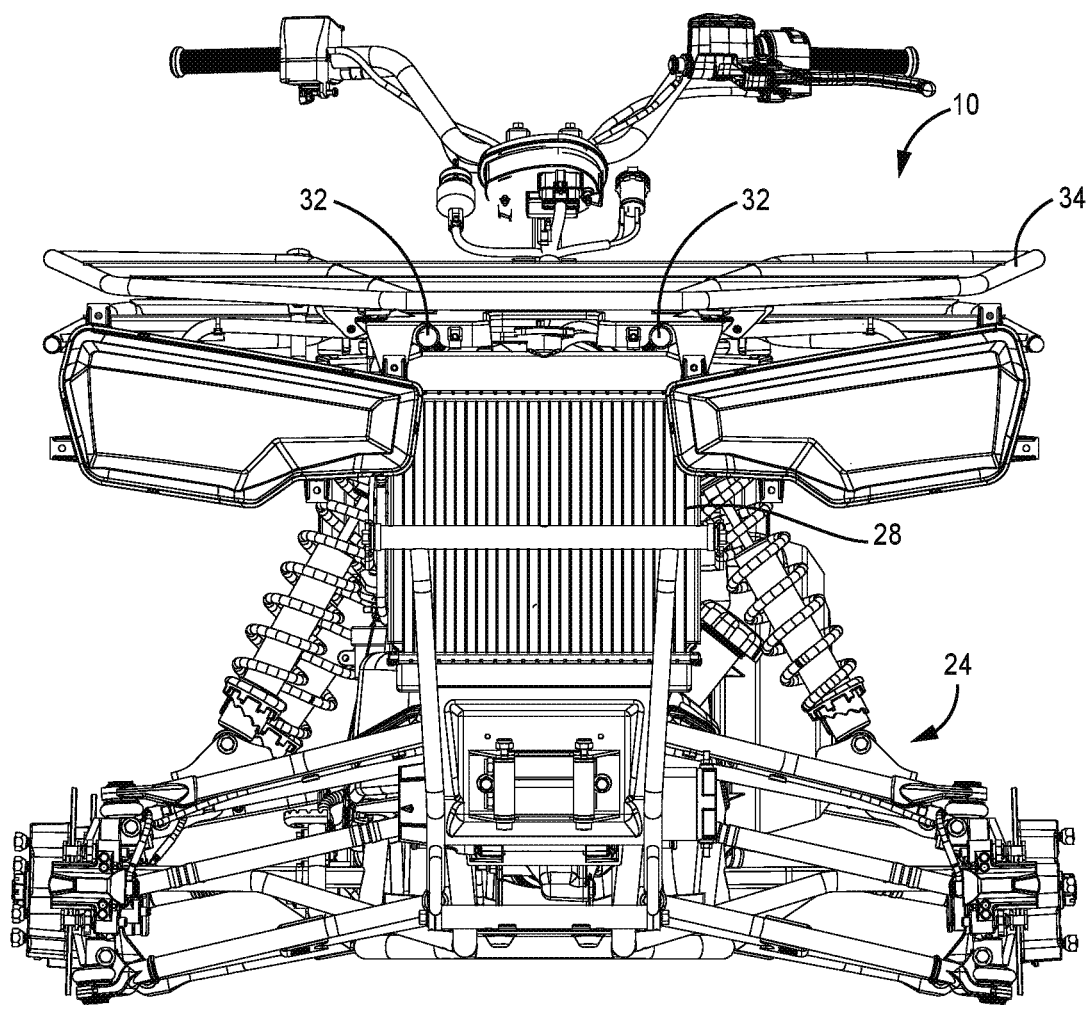
Figure 2D:
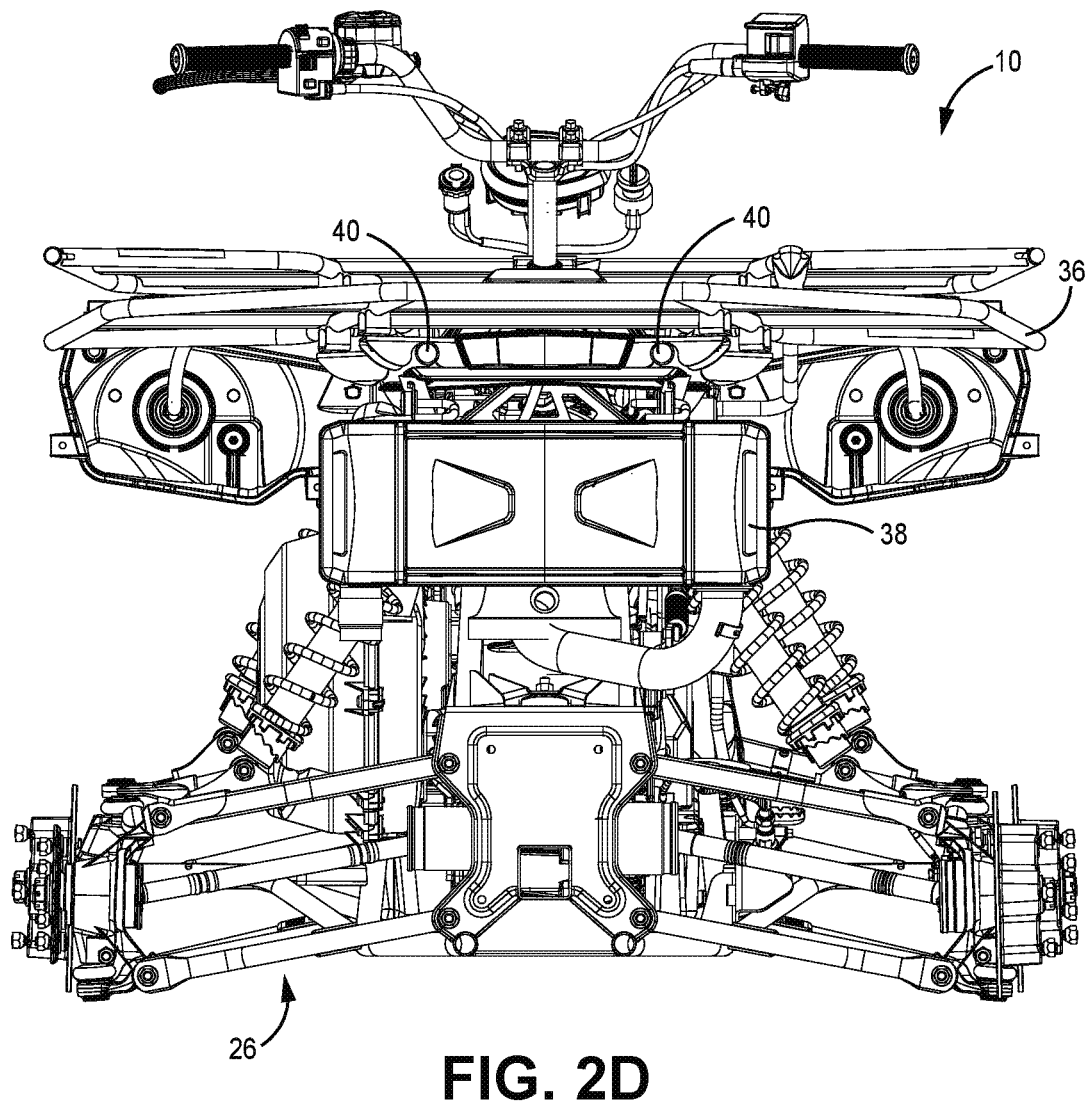
Figure 2E:
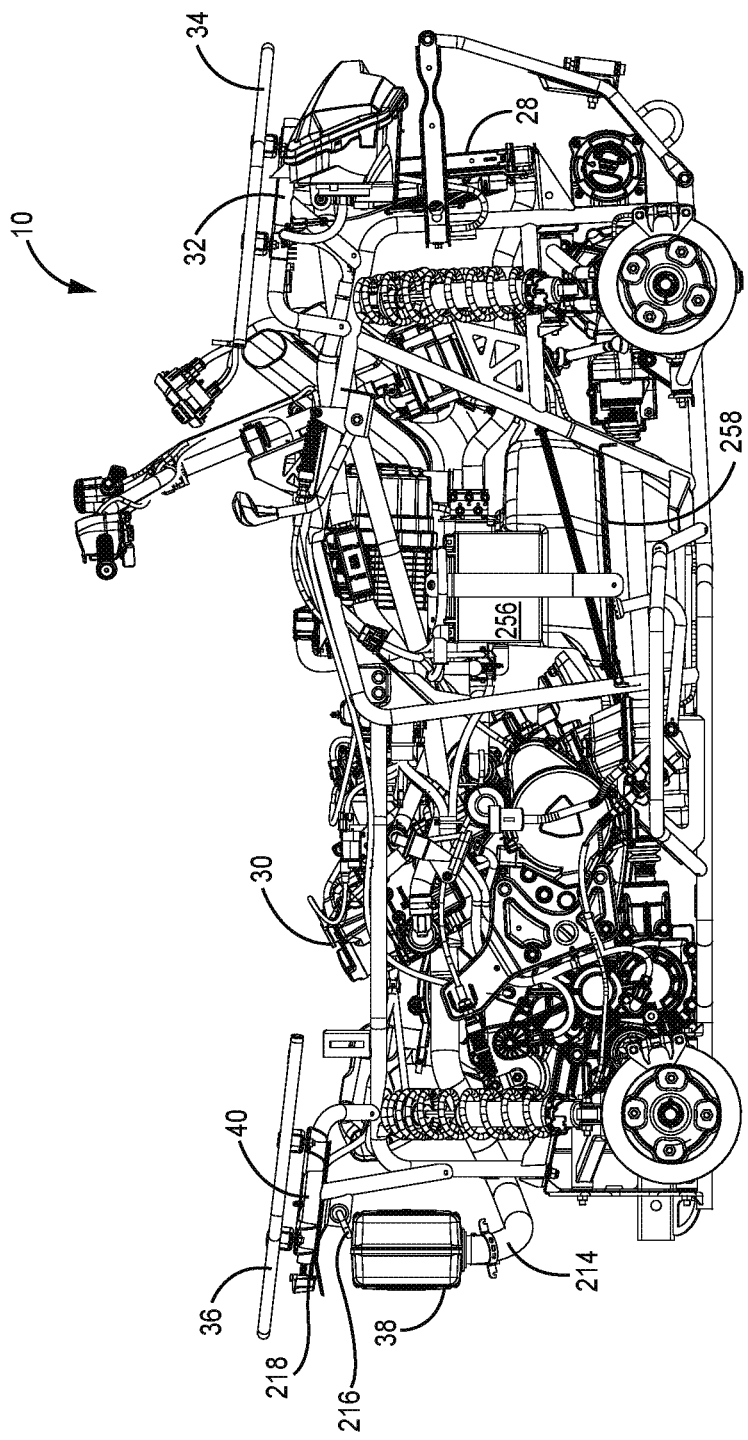
Figure 2F:
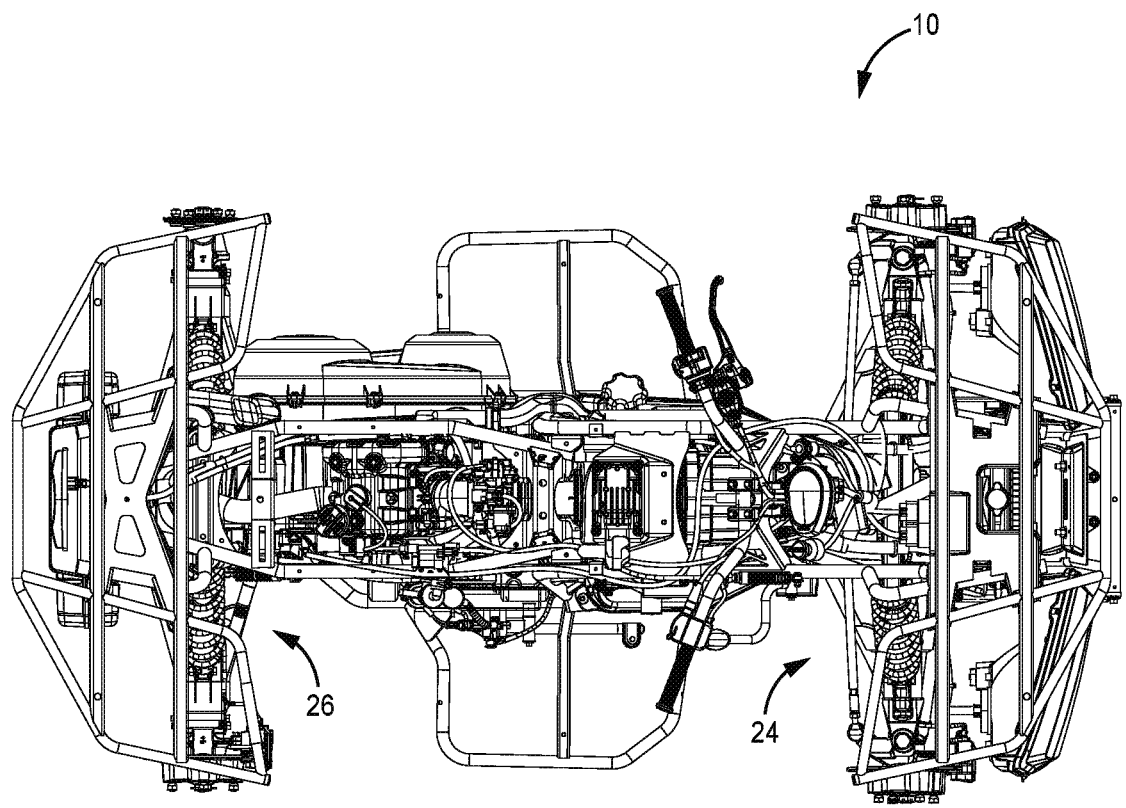

With regard to FIGS. 2A-F, in some embodiments, the off-road vehicle 10 further includes a front suspension 24 and rear suspension 26, each pivotally coupled to the frame 12. The off-road vehicle 10 has a radiator 28 to cool the coolant which, in turn, acts to cool the prime mover 30 (e.g., engine). As shown in FIG. 2E, in some embodiments, the radiator 28 is located below forward frame members 32. In some embodiments, the forward frame members 32 support front rack 34. Turning to FIG. 2B, a muffler 38 is located at the rear of off-road vehicle 10 below rearward frame members 40 (FIG. 2E). Rear rack 36 is located above rearward frame members 40.

Figure 3A:
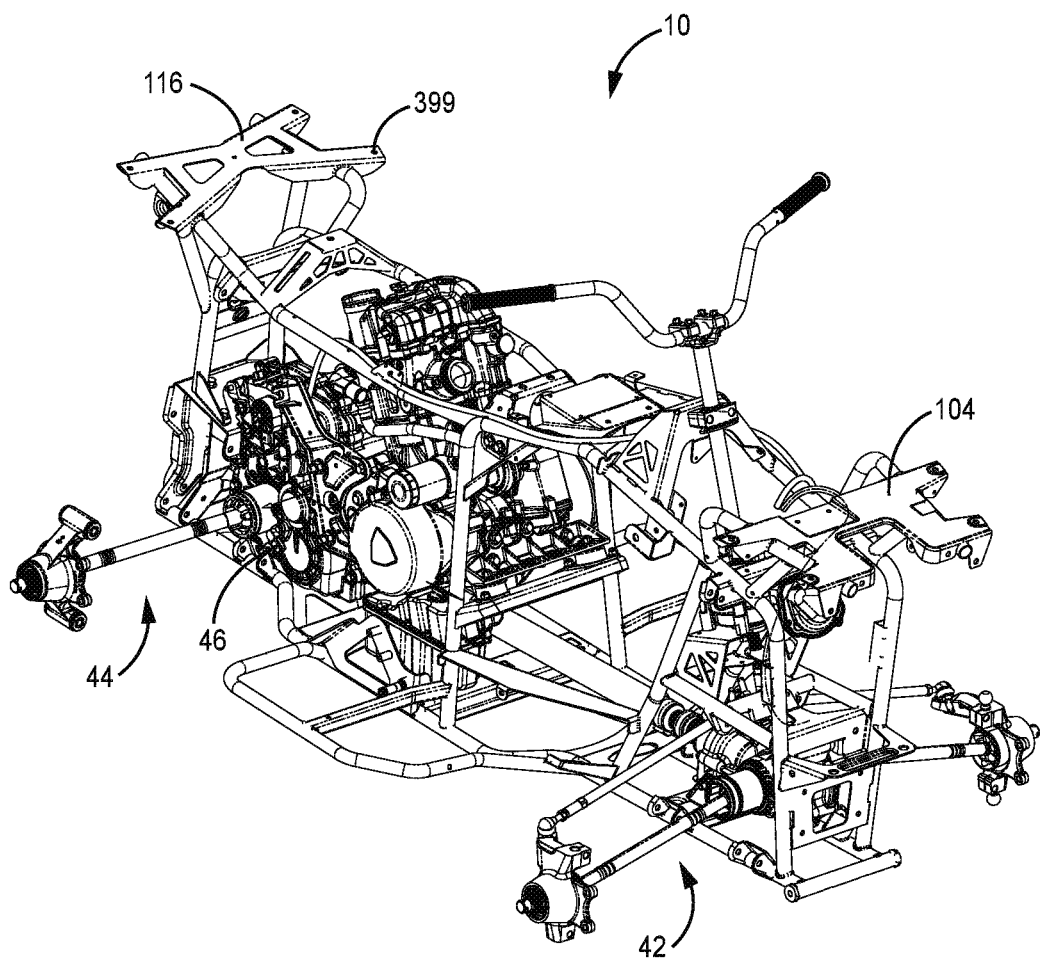
FIGS. 3A-C illustrate perspective views of a partial off-road vehicle including driveline components, according to some embodiments of the present disclosure.
Figure 3B:
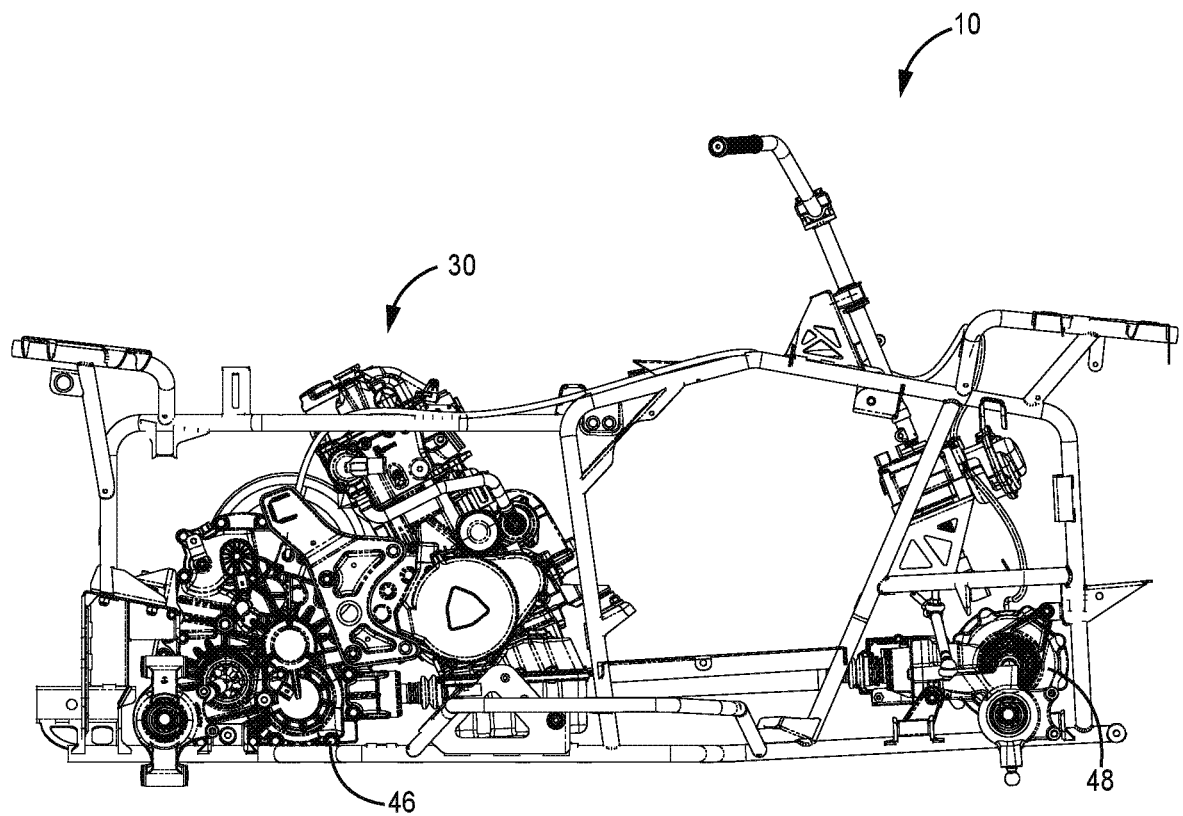
Figure 3C:
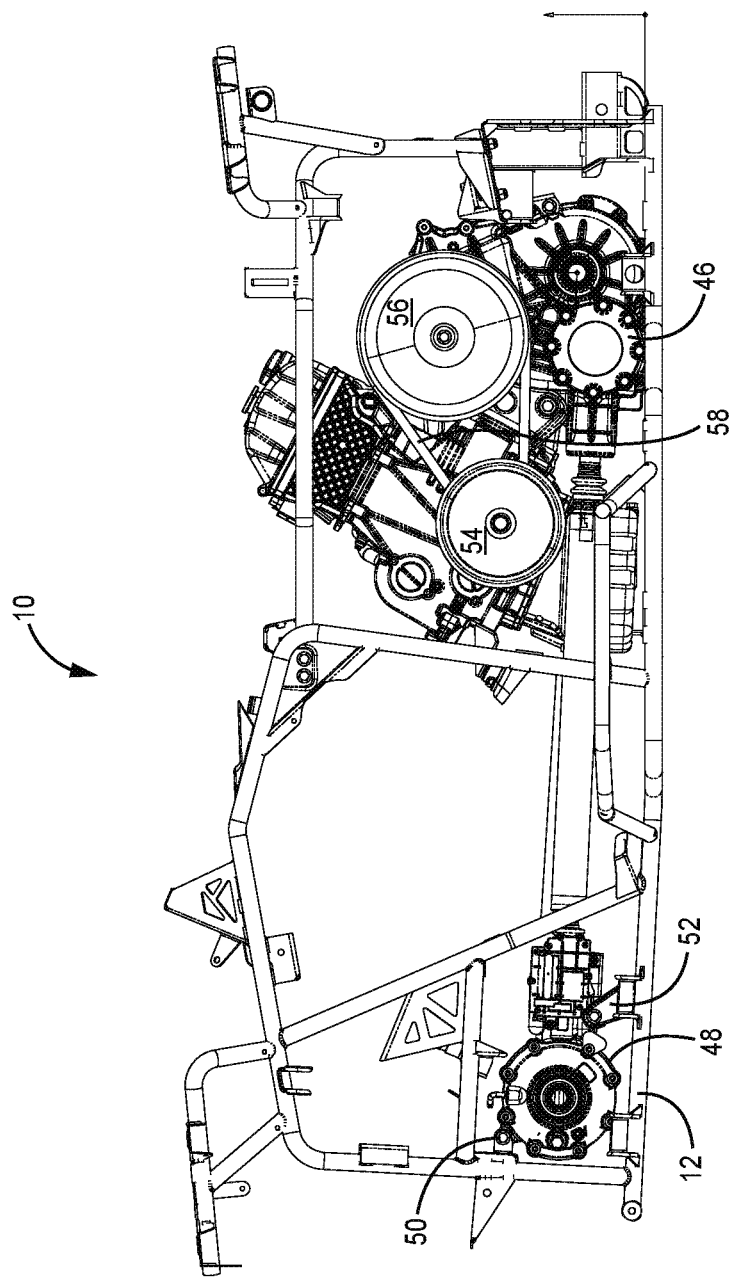

Turning to FIGS. 3A-C, the off-road vehicle 10 is shown to illustrate various driveline components. In some embodiments, the off-road vehicle 10 includes front CV (constant velocity) assemblies 42 and rear CV assemblies 44. In some embodiments, each of the rear CV assemblies 44 extends laterally from transaxle 46. Front CV assemblies 42 extend laterally from front gearcase 48. As shown in FIG. 3C, the front gearcase 48 is attached to the frame 12 via one or more attachment locations. For example, as shown, the front gearcase 48 is attached to the frame 12 at a front of front gearcase 48 at upper gearcase attachment location 50. Further, as shown, the front gearcase 48 is attached to the frame 12 at a rear of the gearcase 48 at a lower gearcase attachment location 52, which is rearward and below the upper gearcase attachment location 50. With regard to FIG. 3B, in some embodiments, the prime mover 30 is a single cylinder engine having a cylinder that extends vertically and rearwardly. The prime mover 30 (e.g. combustion engine) has a drive clutch 54 rotatably attached thereto. The drive clutch 54 can be rotatably coupled to driven clutch 56, for example via a belt 58 extending therebetween. The driven clutch 56 is, in turn, coupled to transaxle 46.

Figure 4A:
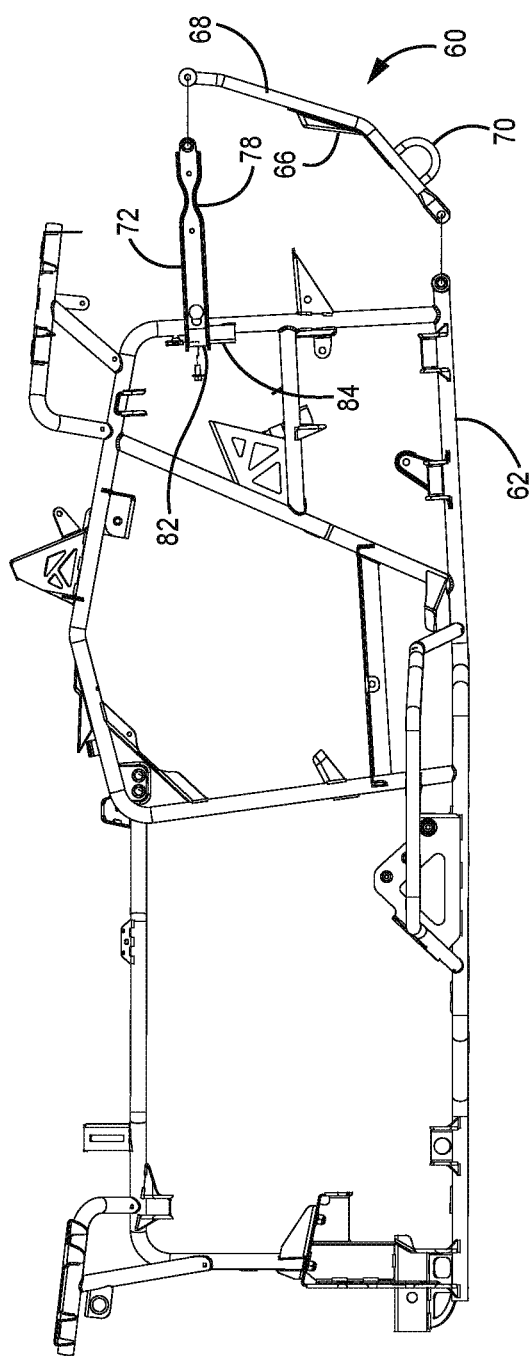
FIGS. 4A-H illustrate perspective views of a partial off-road vehicle showing frame components, according to some embodiments of the present disclosure.
Figure 4B:
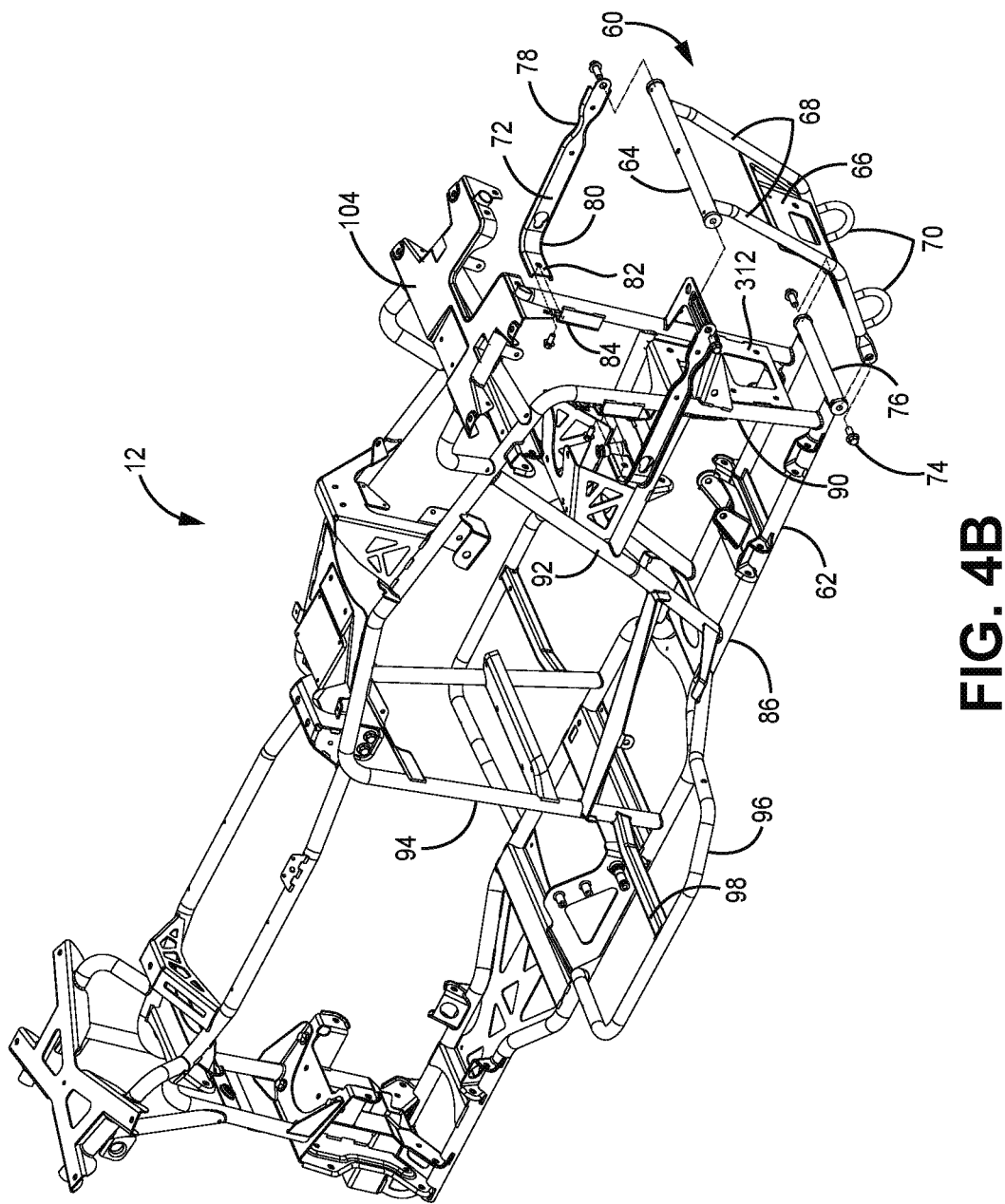

As shown in FIGS. 4A and 4B, in some embodiments, frame 12 includes a removable front frame portion 60. Removable front frame portion 60 is removably attached to a front portion of the main frame 62 via one or more fasteners. In some embodiments, the removable front frame portion 60 includes an upper cross member 64 (e.g., tube), a middle cross member 66, and removable upstanding members 68. As further shown, in some embodiments, the removable front frame portion 60 includes loop members 70 (e.g., tow hooks) which are, for example, attached (e.g., welded) to the removable upstanding members 68. The removable front frame portion 60 can be utilized as an internal bumper (inside out body panels) or as an external bumper (outside the body panels), and the portion 60 can be interchangeable and differently sized between multiple models. This is another example of a single assembly line having the capability to create multiple models using the same base frame 12.

Figure 4C:
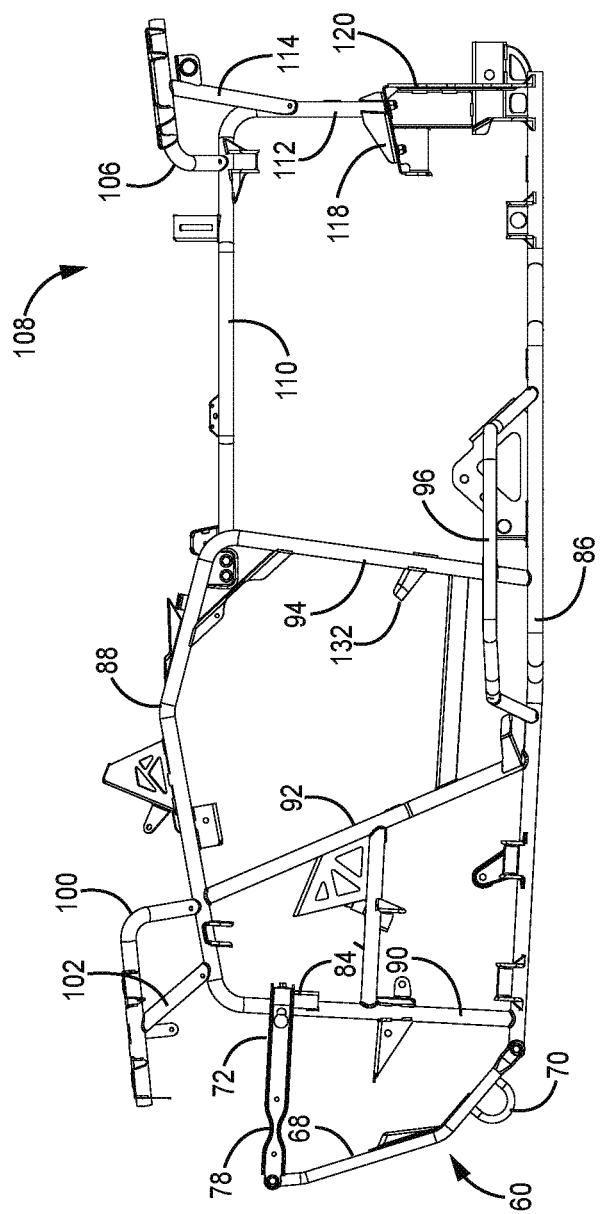
Figure 4D:
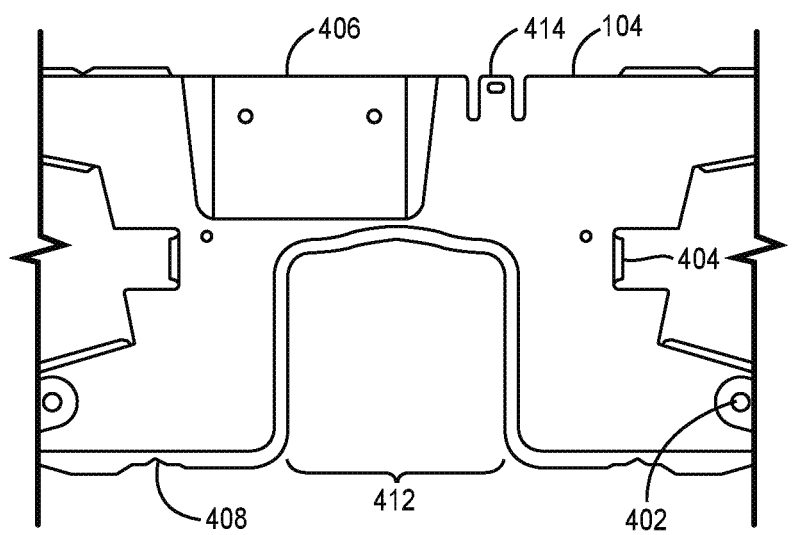
Figure 4E:
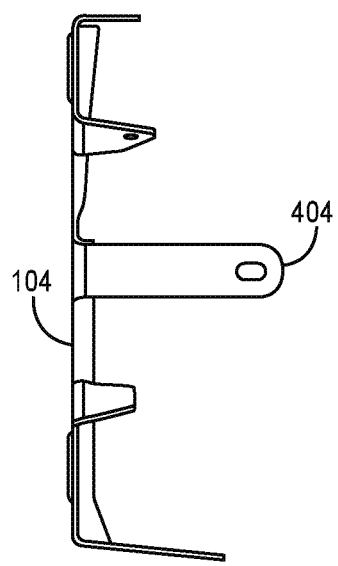
Figure 4F:
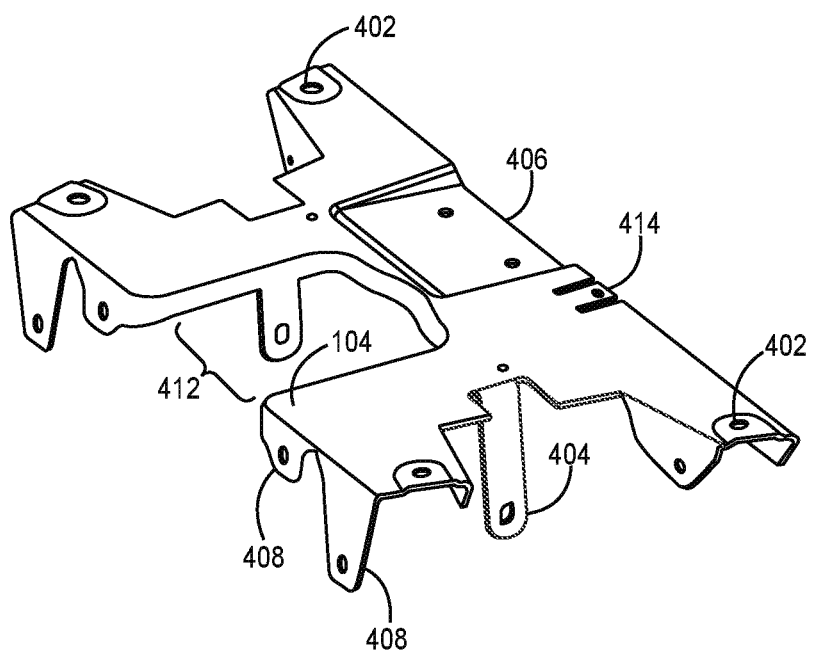
Figure 4G:
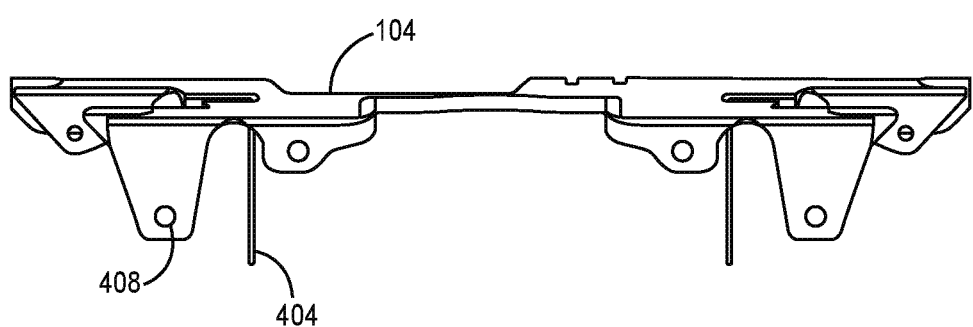
Figure 4H:
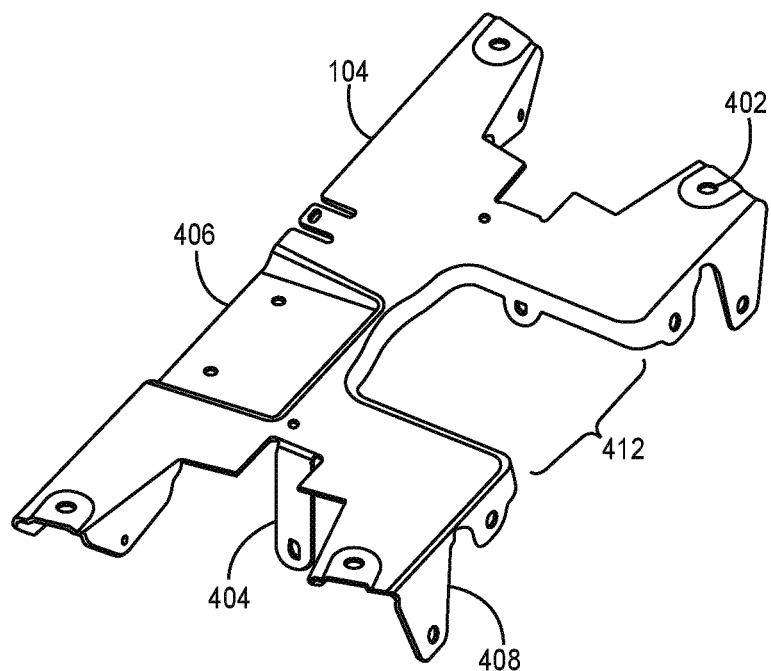

As shown in FIGS. 4A-C, in some embodiments, the removable front frame portion 60 is coupled to the main frame 62 via removable frame portion connecting brackets 72 and via lower fasteners 74 that extend through holes in the removable upstanding members 68 and into portions of the main frame 62. In some embodiments, the lower fasteners 74 are coupled to lower front cross member 76. As illustrated in FIG. 4B, for example, the removable frame portion connecting brackets 72 have a waist portion 78, which is narrower than adjacent portions, a bent portion 80, and a main frame attachment portion 82. The main frame attachment portion 82 is removably attached to the main frame 62, for example via brackets 84.

Figure 5A:
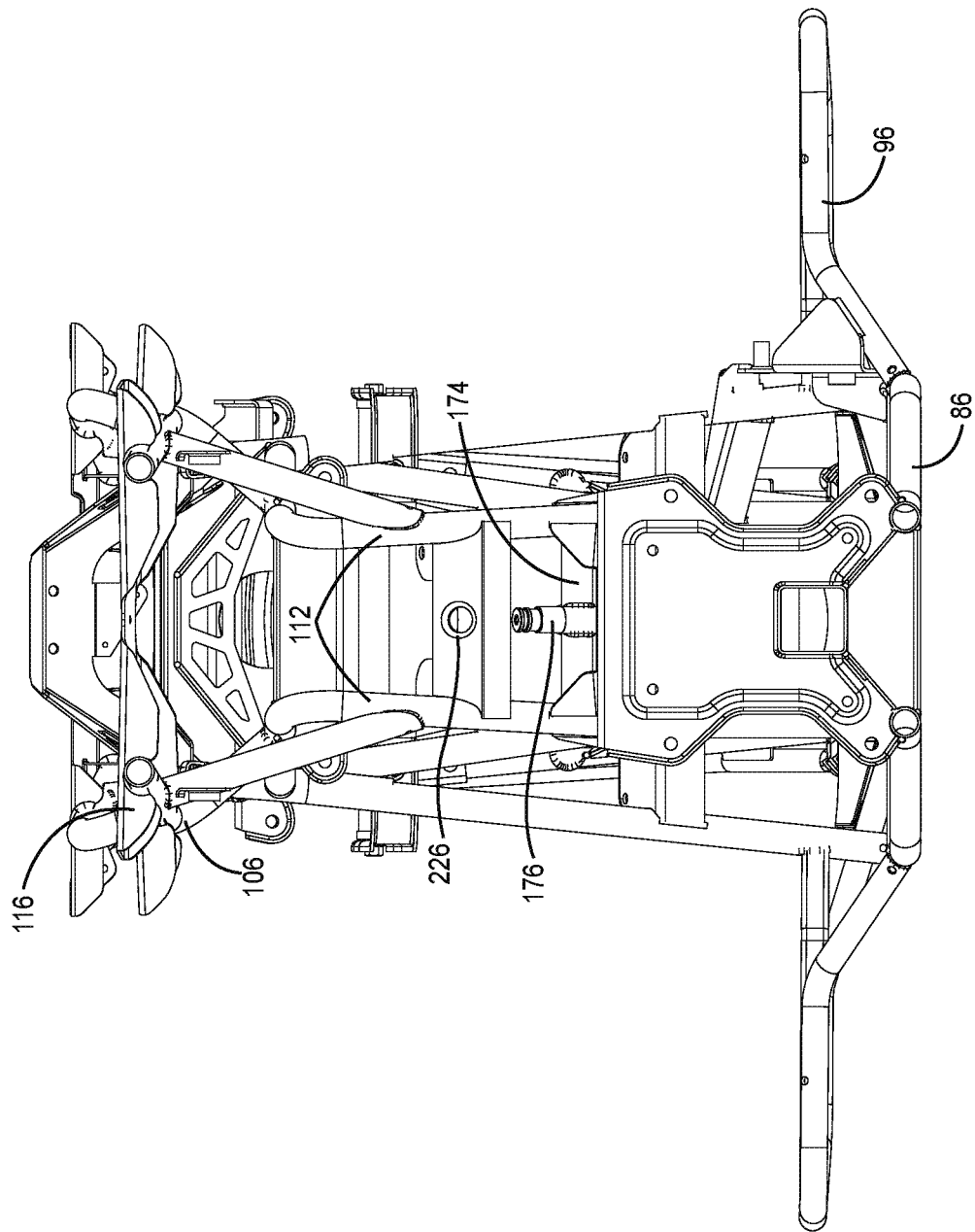
FIGS. 5A-F illustrate perspective views of a partial off-road vehicle showing frame components including removable rear frame assembly, according to some embodiments of the present disclosure.

In some embodiments, the frame 12 has lower longitudinal members 86 (FIG. 5D) extending along the length of the main frame 62. Further, in some embodiments, the frame 12 has upper longitudinal members 88 (FIGS. 4B, 5C). As shown in FIG. 4C, respective upper longitudinal members 88 are attached to respective lower longitudinal members 86 via one or more vertical members, such as first vertical member 90, second vertical member 92, and third vertical member 94. In some embodiments, a respective upper longitudinal member 88 is formed integrally with a first vertical member 90 and a third vertical member 94, for example by bending a tube. In some embodiments, second vertical member 92 is welded to an upper longitudinal member 88 at an upper portion of the second vertical member 92 and is further welded to lower longitudinal members 86 at a lower portion of the second vertical member 92. Such an arrangement is illustrative and other configurations for attachment and arrangement are permissible.

In some embodiments, foot perimeter members 96 extend outwardly from lower longitudinal members 86. Further, in some embodiments, a foot support member 98 is attached to the respective foot perimeter member 96 and a third vertical member 94.

Figure 5B:
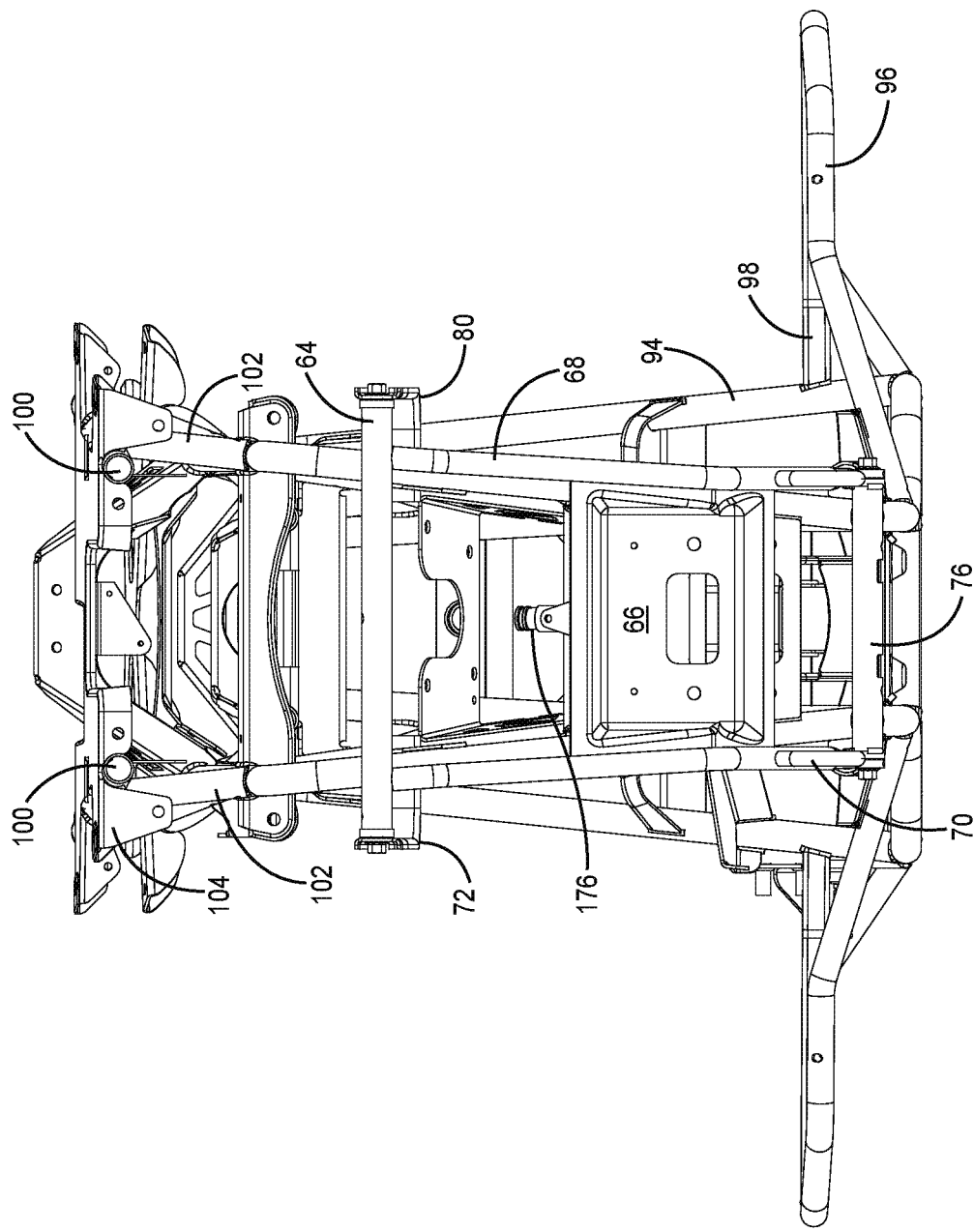
Figure 5C:
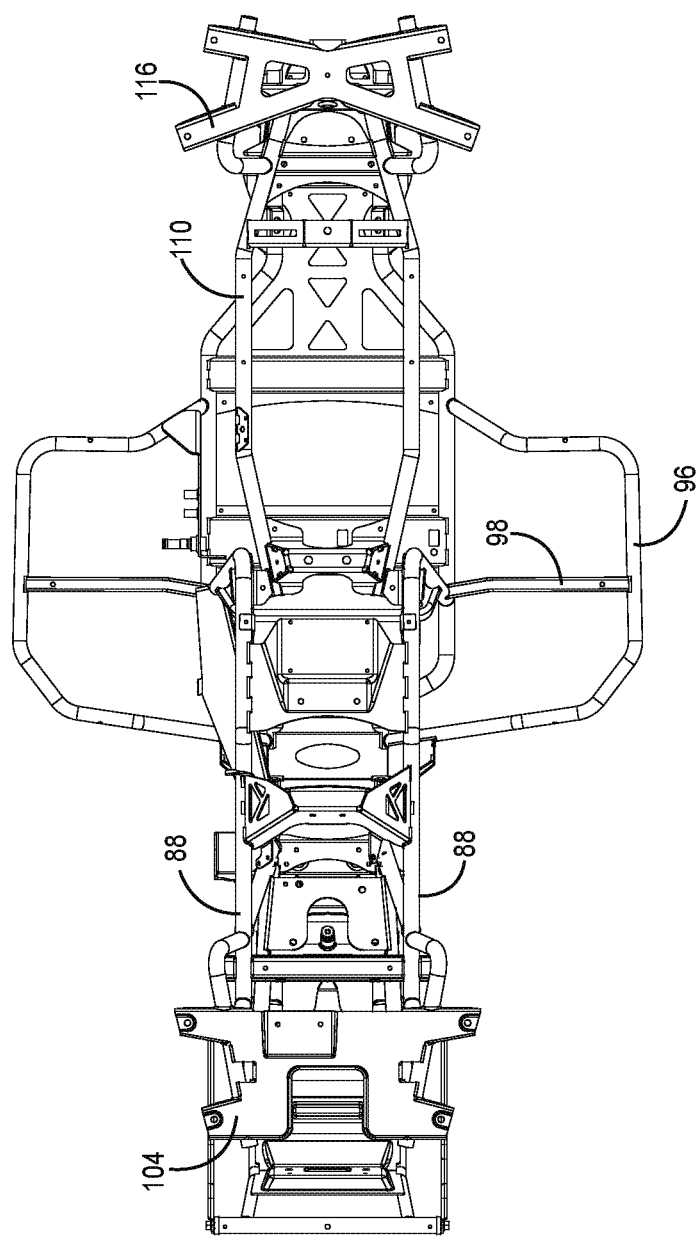
Figure 5D:
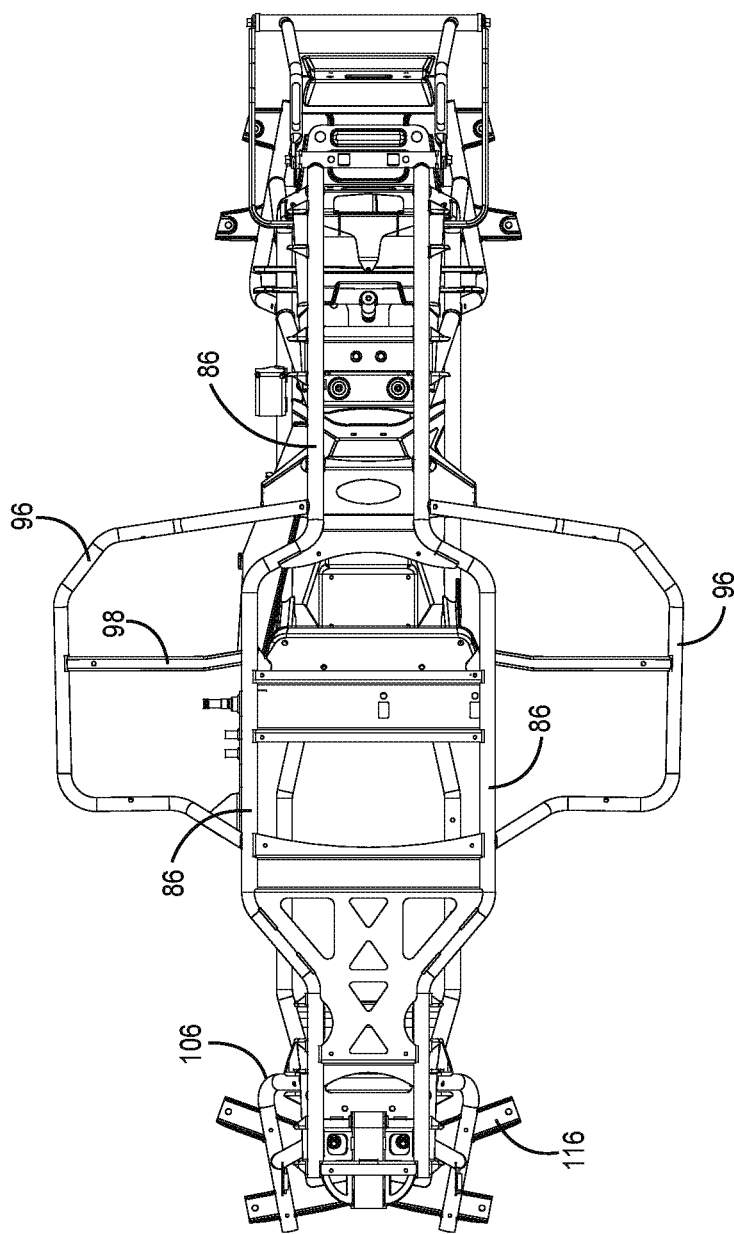

As shown in FIGS. 4B, 4C and 5B, in some embodiments, first front rack support tubes 100 are attached to upper longitudinal member 88. Further, second front rack support tubes 102 are, in some embodiments, attached to upper longitudinal member 88 and also to first front rack support tubes 100. In some embodiments, a front rack support bracket 104 is attached to first front rack support tubes 100. In some embodiments, the front rack 34 is coupled to the front rack support bracket 104, for example via one or more fasteners.

Front rack support bracket 104 provides structural support as part of the frame 12 to connect and secure front rack 34, but also provides attachment components and support for a radiator 28 as part of the cooling system, voltage regulator, and headlights 276. The front rack support bracket 104 connects to front rack 36 at connection components 402 (i.e., holes). The connection components 402 are spaced substantially similar to rear connection components 399 of rear support bracket 116 (see FIG. 3A), such that the same sized rack can be placed both in the front and the rear, reducing the overall part count and simplifying replacement of one of the racks. Connection components 402 can support any fastener, weldment, male/female securement system, such that the front rack 36 is secure and held fast to the front rack support bracket 104. The front rack support 104 can be manufactured of steel, or any material with enough strength and rigidity to support the various components connected to and supported by bracket 104.

Cutout section 412 allows for a user or service technician to easily access the radiator 28, without removal of the radiator 28, front rack support bracket 104, or front rack 36. Headlights 276 can be supported and attached at connection tabs 408. Connection brackets 404 hold and secure to radiator 28. Additionally, the front rack bracket 104 supports various electrical components, such as a voltage regulator at recess 406 and optional flasher relay at 414, for example. Recess or depression 406 is purposely tipped or angled back from the horizontal plane of the front rack support bracket, such that the depression is generally level with the ground or angled slightly towards the rear of the vehicle. This allows for water drainage and prevents pooling which can corrode electrical connections.

Figure 5E:
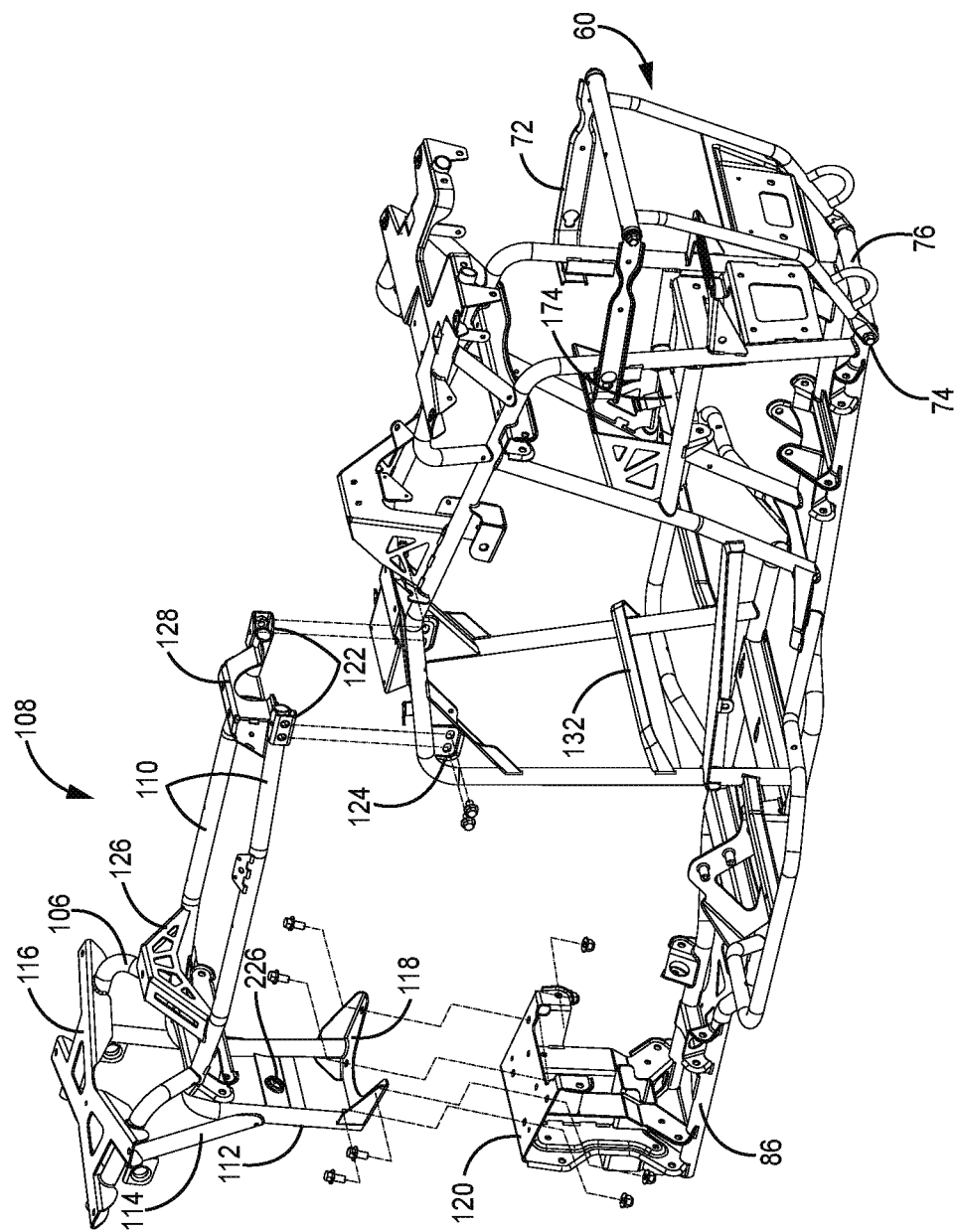

As shown in FIGS. 4C, 5A, and 5E, in some embodiments, the off-road vehicle 10 includes a removable rear frame assembly 108. In some embodiments, the removable rear frame assembly 108 is removably attached to the main frame 62, for example via a plurality of fasteners, as illustrated in FIG. 5E. As further shown in FIG. 5E, the removable rear frame assembly 108 includes longitudinal rear upper frame members 110 and fourth vertical members 112. In some embodiments, a respective longitudinal rear upper frame member 110 is formed integrally with a respective fourth vertical member 112. First rear rack support tubes 106 are attached to respective longitudinal rear upper frame members 110 and second rear rack support tubes 114. A rear rack support bracket 116 (see FIG. 3A) is, in turn, supported by the first rear rack support tubes 106 and the second rear rack support tubes 114. Rear rack support bracket 116 supports the rear rack 36 at connection components 399 (i.e., holes for fasteners).

Figure 5F:
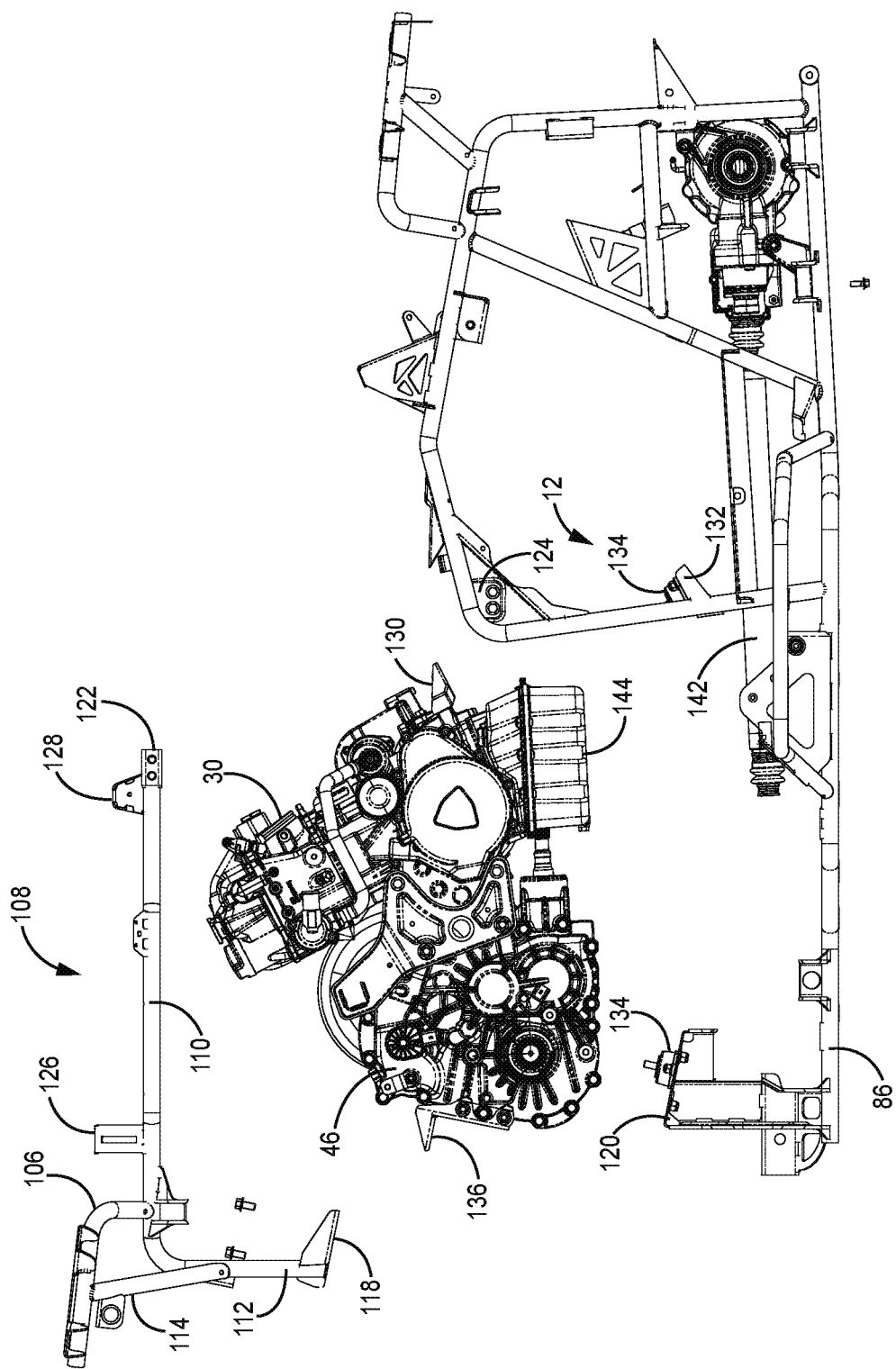
Figure 6A:
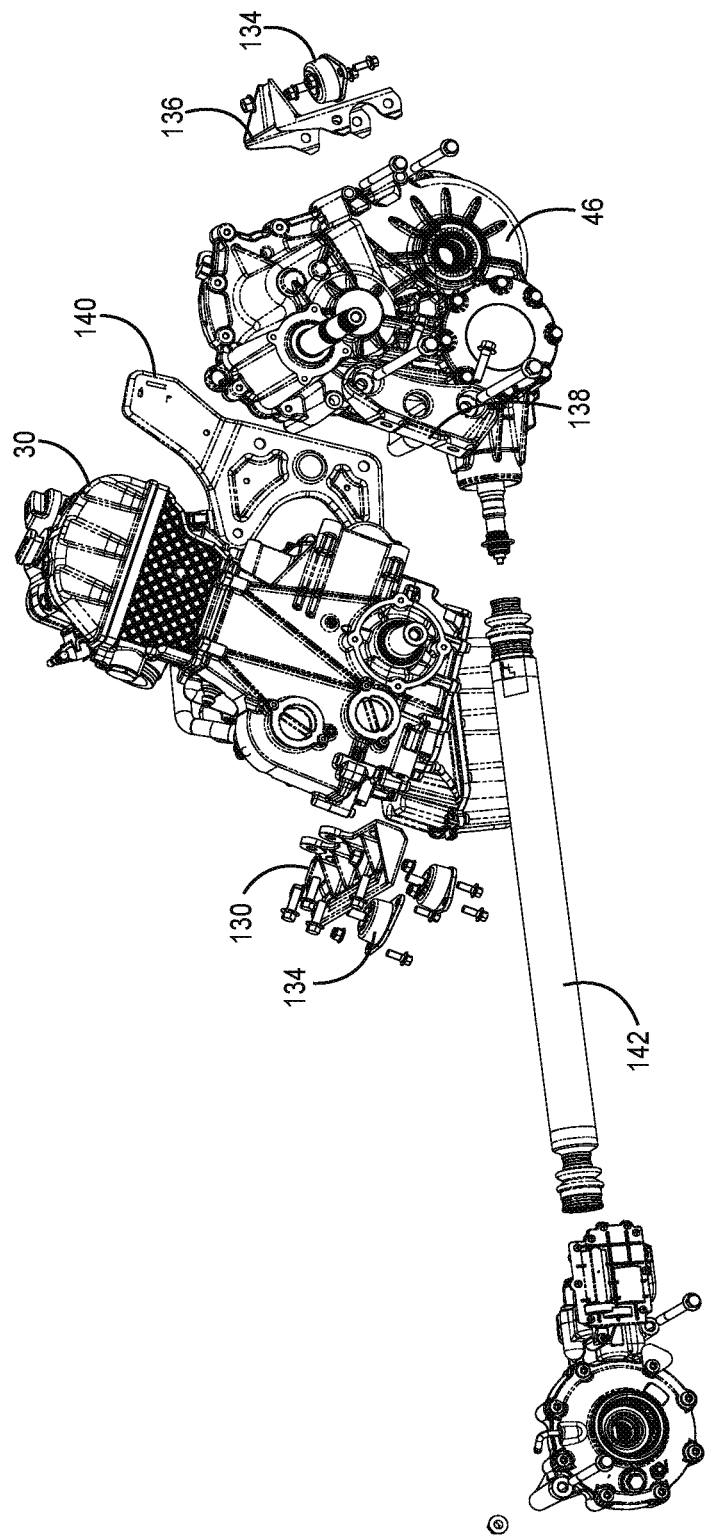
FIGS. 6A-H illustrate perspective views of a partial off-road vehicle showing frame components with engine, according to some embodiments of the present disclosure.
Figure 6B:
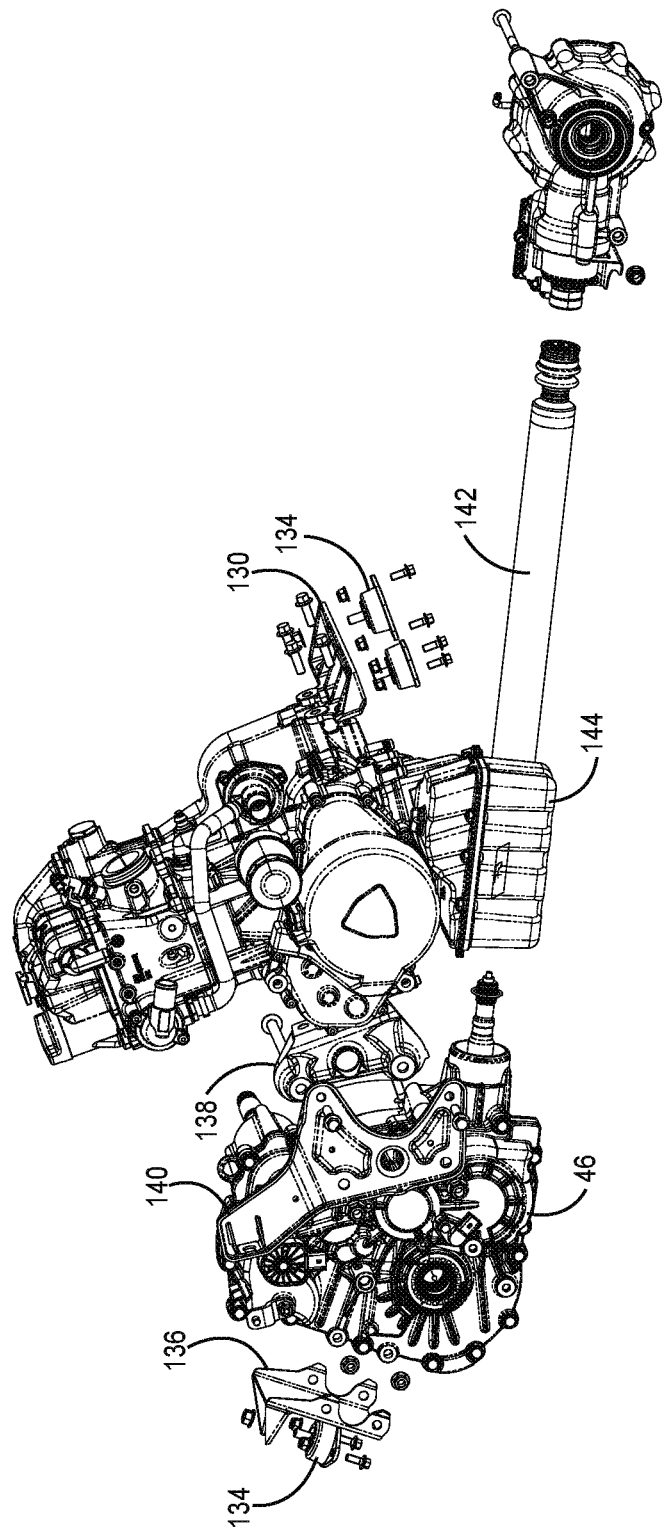
Figure 6D:
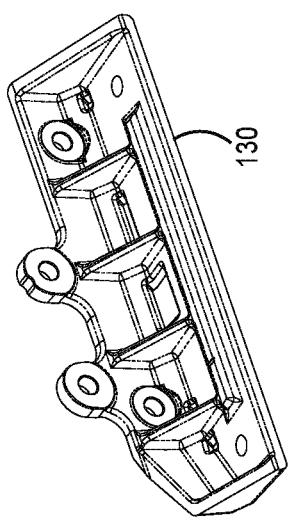
Figure 6H:
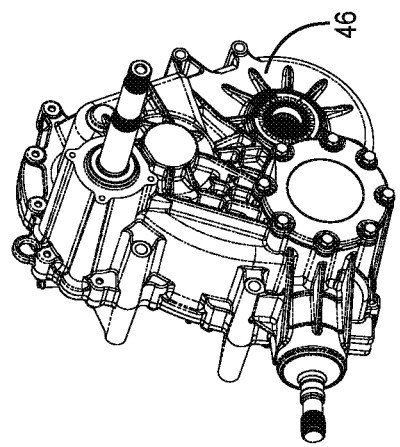
Figure 6E:
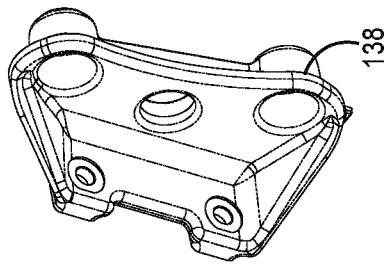
Figure 6G:
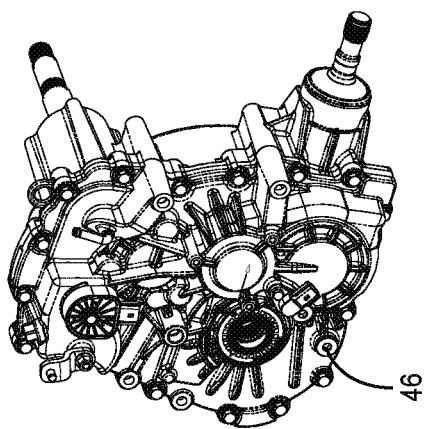
Figure 6C:
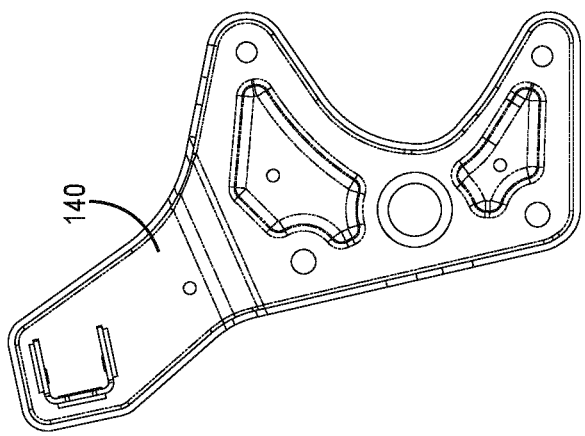
Figure 6F:
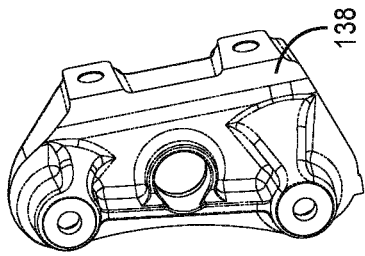

With additional reference to FIGS. 5E and 5F, in some embodiments, the removable rear frame assembly 108 includes a first coupling bracket 118 at lower end portions of the fourth vertical members 112. The first coupling bracket 118 is removably attached to second coupling bracket 120 which, in some embodiments, if fixedly attached to lower longitudinal members 86 and is formed from a bent and/or stamped piece of sheet metal. The first coupling bracket 118 can also support attachment positions for rearward accessories, such as a rear bumper. As further shown in FIG. 5F, removal of the rear frame assembly 108 permits removal of the prime mover 30 and/or transaxle 46. In some embodiments, the prime mover 30 and transaxle 46 can be installed or removed as an assembly.

In some embodiments, the removable rear frame assembly 108 further includes forward coupling members 122. As illustrated in FIG. 5E, the forward coupling members 122 are removably attached to main frame coupling brackets 124. In some embodiments, the forward coupling members 122 are threaded, thereby permitting fasteners to pass through apertures in the main frame coupling brackets 124 and be threaded into respective forward coupling members 122. In some embodiments, the removable rear frame assembly 108 includes one or more seat support brackets, such as rear seat support bracket 126 and front seat support bracket 128.

Referring to FIGS. 5F, 6A-H, in some embodiments, the prime mover 30 is removably coupled to the frame 12 via front mount 130. In some embodiments, the front mount 130 is removably coupled to the prime mover 30. Further, in some embodiments, the front mount 130 removably coupled to the motor mount bracket 132 via one or more vibration isolators 134. In one embodiment, the prime mover 30 is mounted a two forward points and single rearward mounting position, to allow for the A-arms 208, 210 of the suspension to be positioned closer to together. The prime mover 30 can be positioned along the length of the off-road vehicle and between the width of the upper A-arm mounting positions and lower A-arm mounting positions. The isolators 134 can be rubber pucks, for example, and can be different stiffnesses between front and rear engine mounts. For example, the rearward vibration isolator 134 is harder than the front mount isolators 134. The isolators 134 can be mounted at an angle to the ground or to a horizontal plane of the frame or vehicle, in one embodiment. Transaxle 46 is removably coupled to transaxle support bracket 136 which, in some embodiments, is removably coupled to second coupling bracket 120 via one or more vibration isolators 134. The second coupling bracket 120 also provides mounting points for the upper A-arm 208, a rear section of the frame, and rear bumper accessories. The transaxle 46 is removably coupled to the prime mover 30 via one or more bridging members, such as left side bridging member 138 and right side bridging member 140. As further shown in FIG. 6A, in some embodiments, a driveshaft 142 which extends forwardly from transaxle 46 to front gearcase 48. In some embodiments, the driveshaft 142 extends under a portion of the prime mover 30 and a portion of the oil pan 144 is laterally offset therefrom. In some embodiments, the oil pan 144 has a bottom that extends below the driveshaft 142.

By having the engine 30 and transaxle 46 rigidly mounted together, the center-to-center distance of the CVT clutches can be better maintained. Further, the clutch cover 234 or compartment can be better sealed due to the less movement imparted by the engine/transaxle assembly. Overall vibration of the system is lower due to the lower longitudinal member 86 being positioned adjacent the transaxle 46 and allow for a direct mounting to the frame 12. The engine 30/transaxle 46 can be utilized in this configuration in both ATVs and side-by-side off-road vehicle configurations.

Turning to FIGS. 7A-H, a steering assembly 146 is shown. Steering assembly includes, in some embodiments, handlebars 148, steering post 150, upper steering post collar 152, EPS unit 154 (electronic power steering), lower steering post collar 156, bellcrank 158, and tie-rods 160. Steering post 150 is rotatably coupled to upper steering fixture member 162 via steering post couplers 164 and strip member 166. Fasteners extend through apertures in the post couplers 164 and strip member 166 to affix the steering post 150 to the upper steering fixture member 162. EPS unit 154 is fixedly attached to EPS support fixture 168, for example via one or more fasteners. In some embodiments, the steering post 150 has steering stop member 170 affixed thereto. The steering stop member 170 limits rotation of the handlebars 148 when a portion of the steering stop member 170 bumps up against the upper steering fixture member 162. As shown in FIGS. 8A-D, in some embodiments, the lower steering post collar 156 and bellcrank 158 are formed integrally, for example as a single cast component.

Figure 7A:
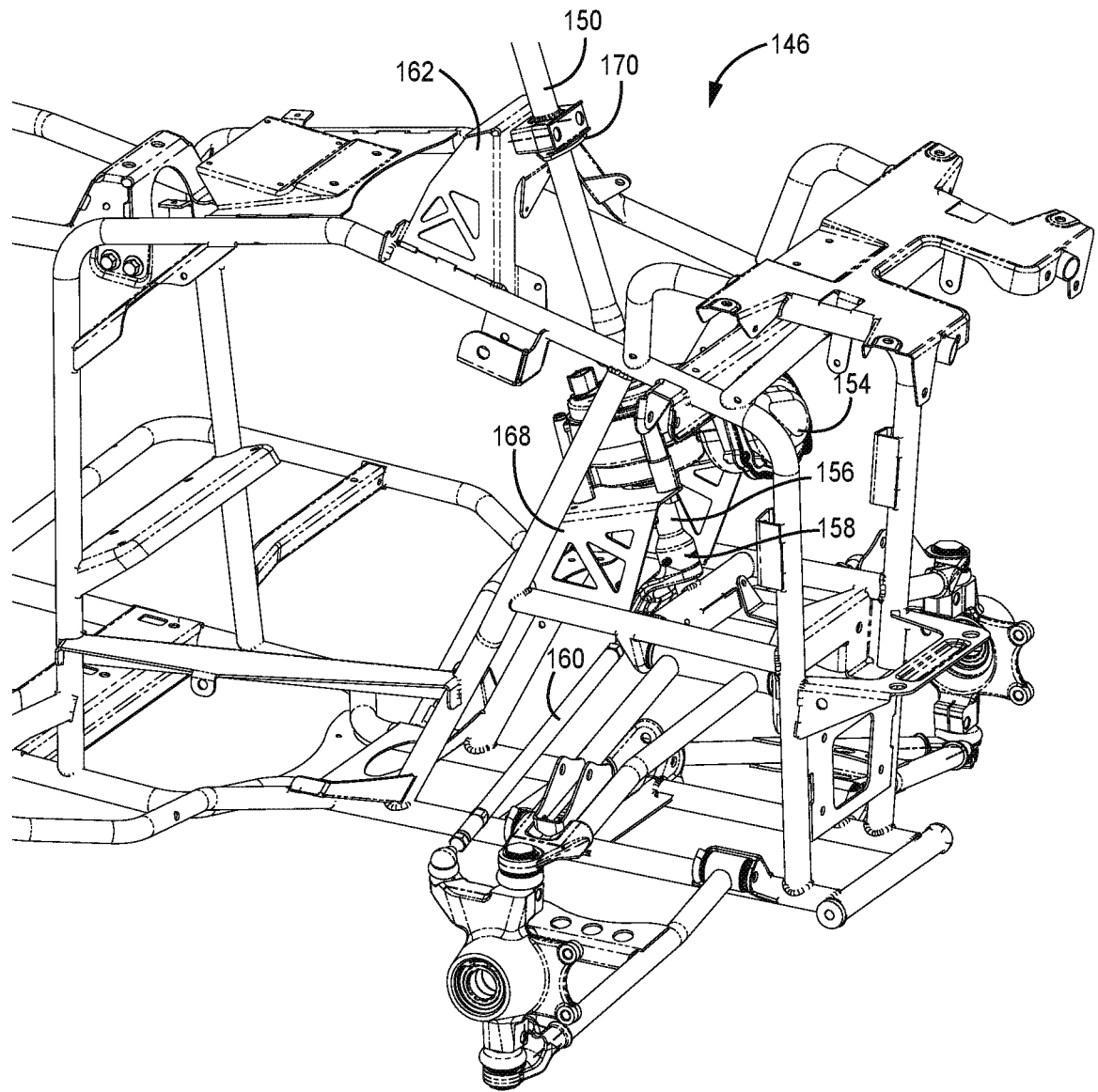
FIGS. 7A-H illustrate perspective and cross-sectional views of a partial off-road vehicle showing steering components, according to some embodiments of the present disclosure.
Figure 7B:
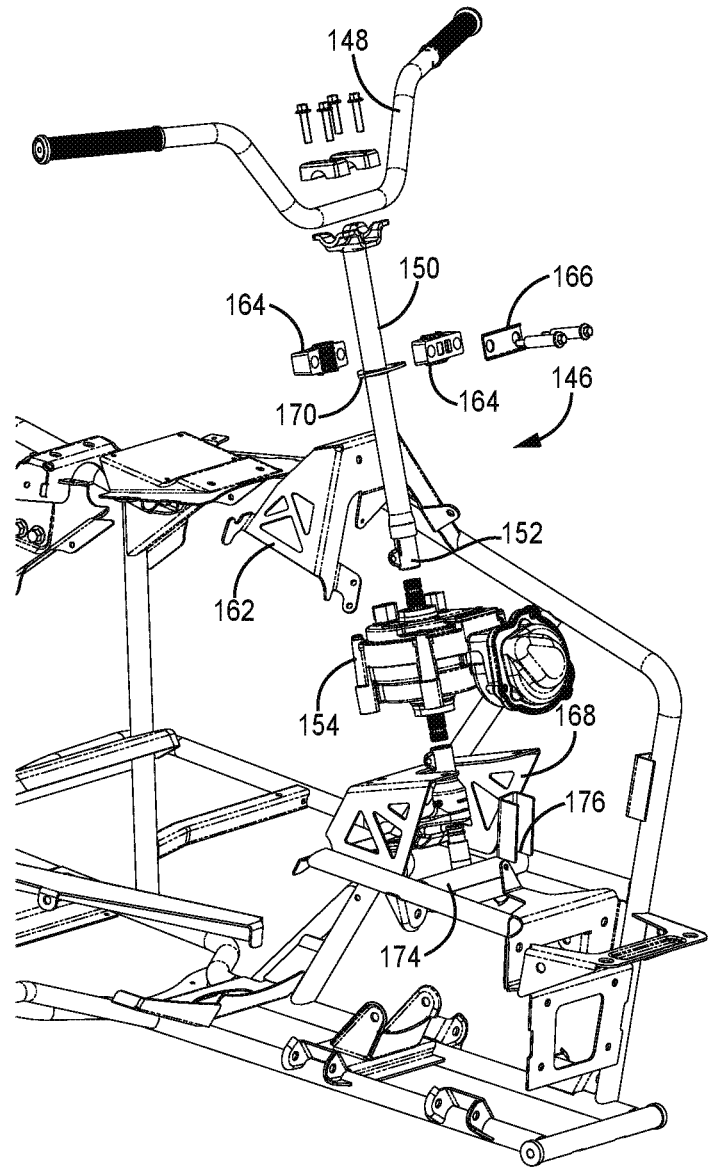
Figure 7C:
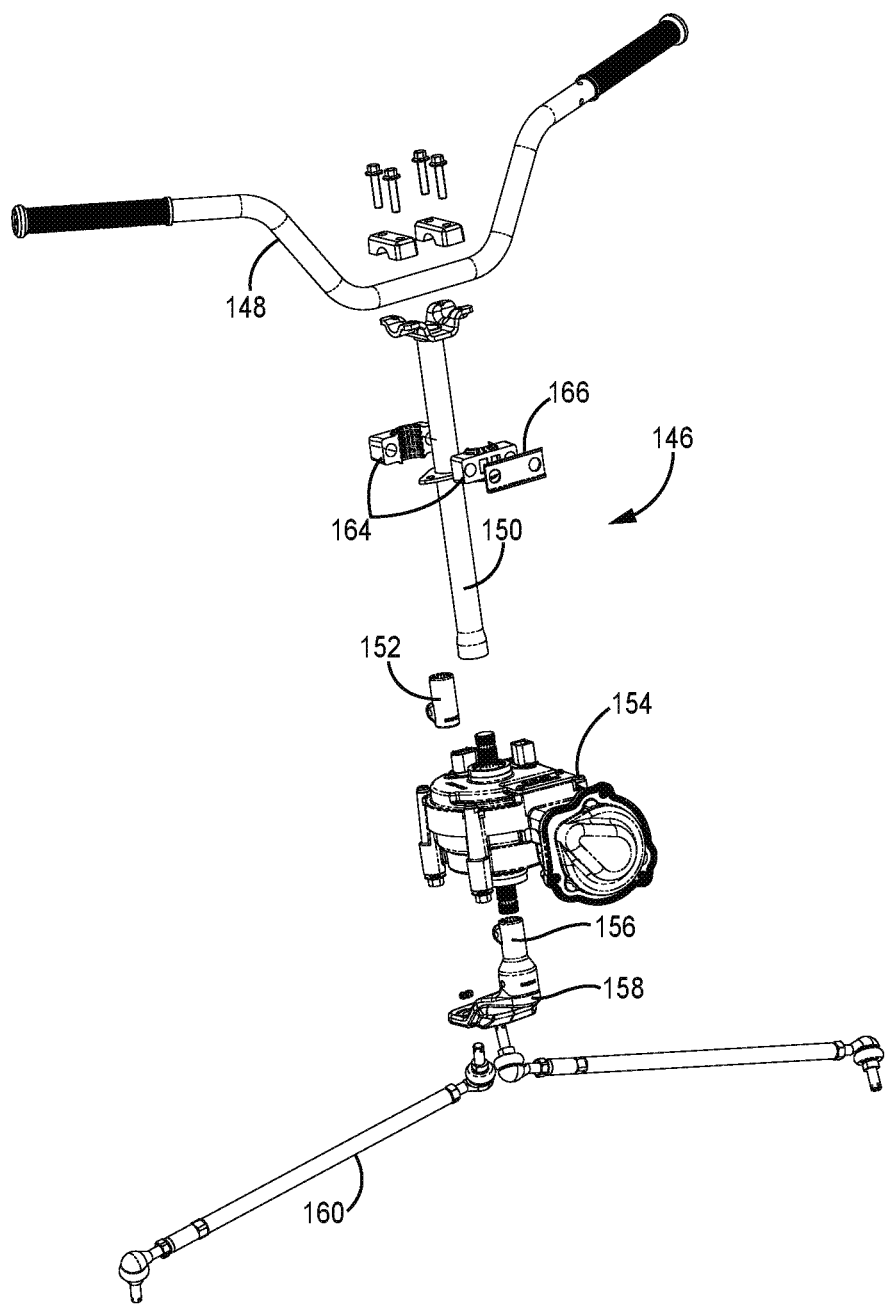
Figure 7D:
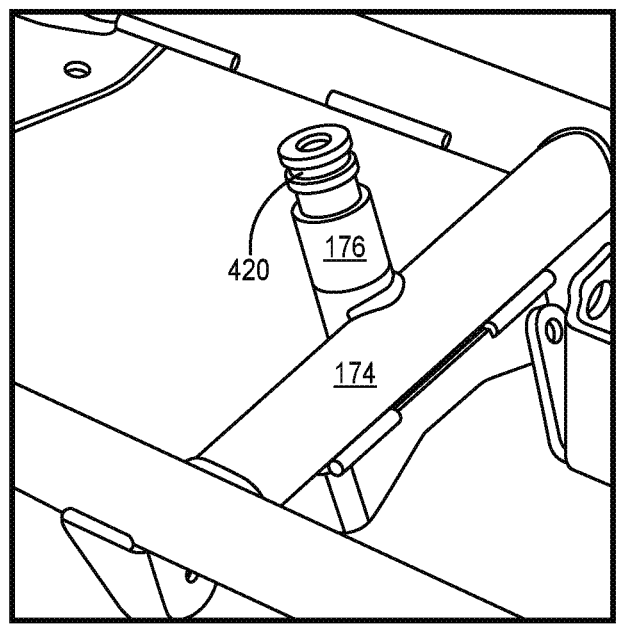
Figure 7E:
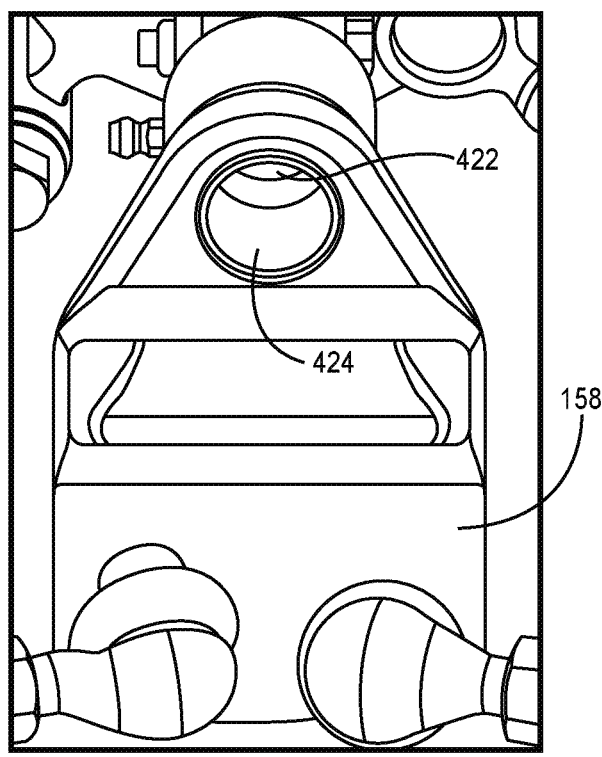
Figure 7F:
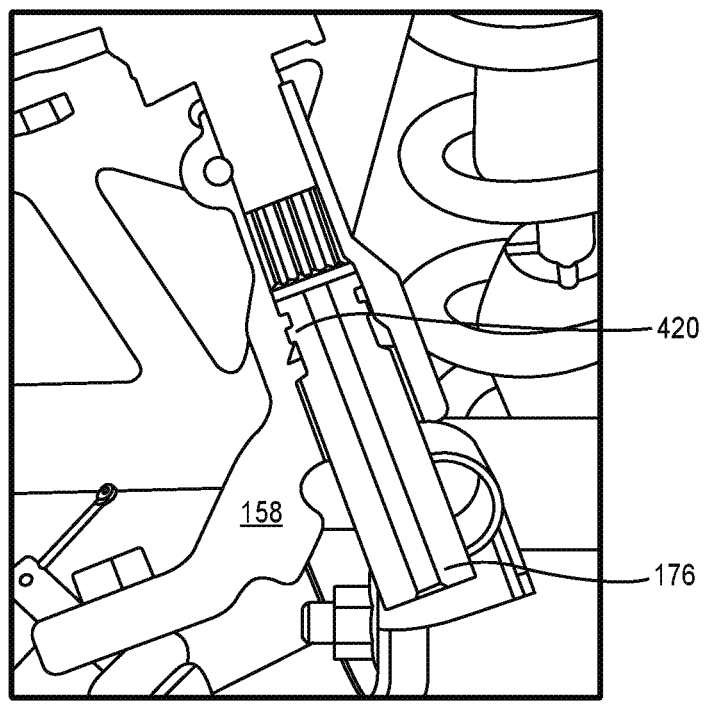
Figure 7G:
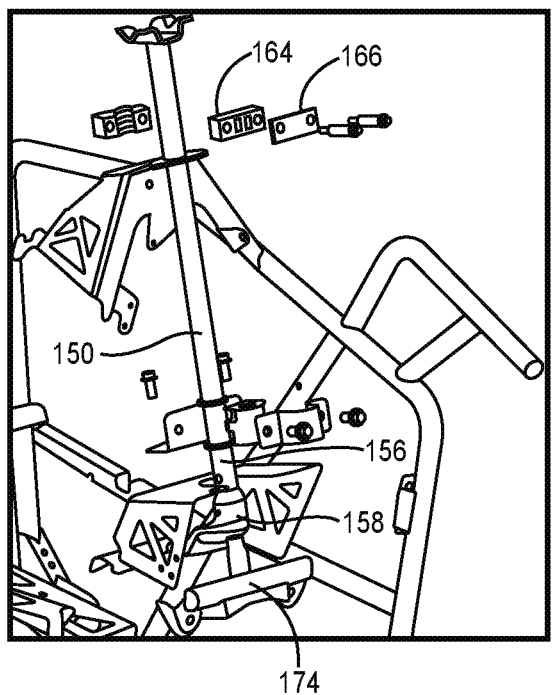

Upper steering post collar 152 includes a through-channel 422 in the forged component that mates with a flared steering post 150 at an upper portion of the collar 152 (see cross-sectional view in FIG. 7F). The lower steering post collar 156 can optionally connect with an EPS unit 154 or in a non-EPS model (see FIG. 7G), can connect directly with post 150. The lower steering post collar 156 can optionally include a polymeric bushing 424 at an upper portion, to reduce friction and stress. At a lower portion, the collar 156 includes a splined collar for connection with steering hub 176, eliminating the need for additional bearings. The steering hub 176 includes grooves 420 for retaining one or more O-rings, for sealing in fluid (i.e., lubricant). The hub 176 can be welded to the frame 12, or integrally formed with the frame 12 or frame components, such as steering cross tube 174.

In some embodiments, the bellcrank 158 (see FIGS. 8A-D) includes a protruding portion 172 which can act as a steering stop to prevent over-rotation. In some embodiments, the protruding portion 172 bumps into steering cross tube 174 (FIGS. 5A and 5E). In some embodiments, a portion of the lower steering post collar 156 and/or bellcrank 158 fits over steering hub 176. In some embodiments, the steering hub 176 extends upwardly and rearwardly from the steering cross tube and, in some embodiments, it extends along the axis of the steering post 150 to provide rigidity and support for the steering assembly.

Figure 7H:
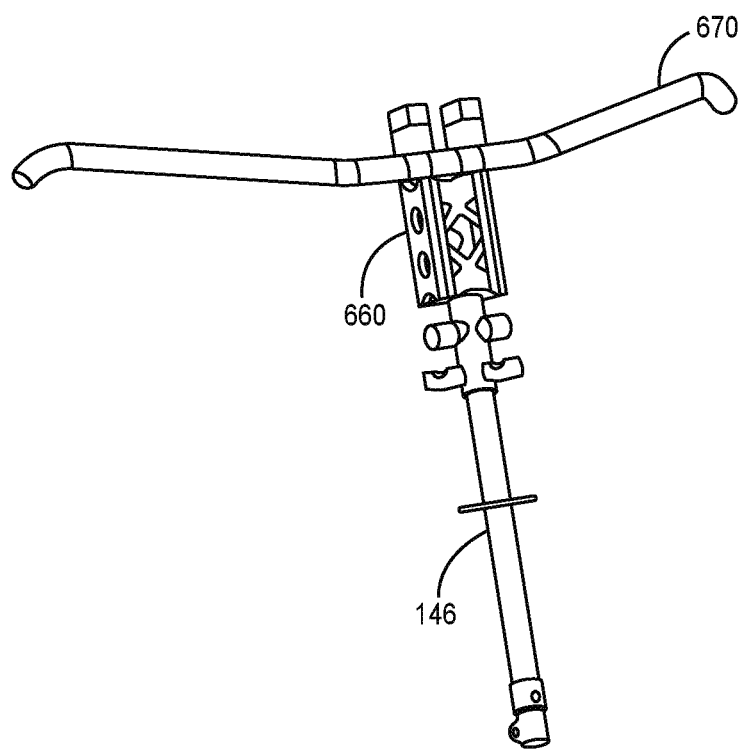
Figure 8A:
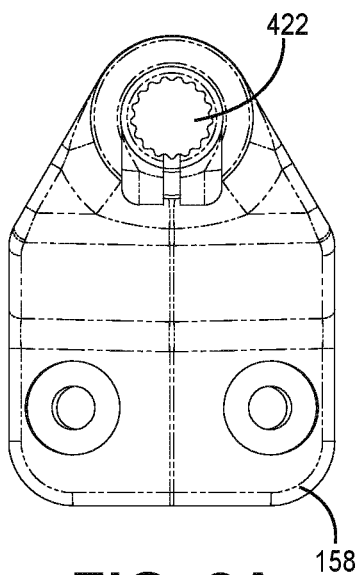
FIGS. 8A-D illustrate perspective views of a lower steering post collar and bellcrank, according to some embodiments of the present disclosure.
Figure 8B:
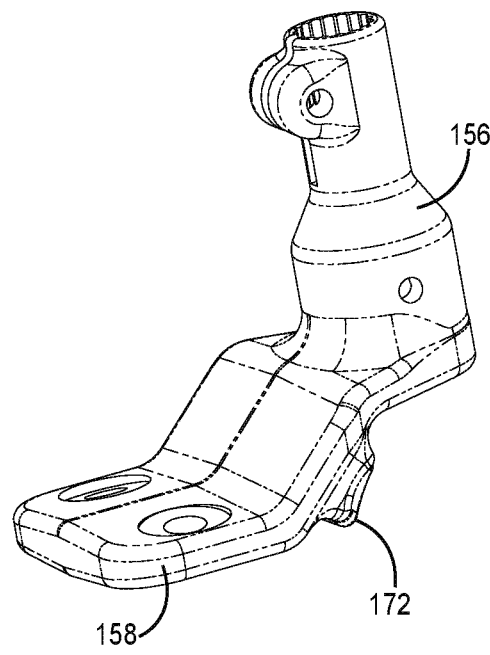
Figure 8C:
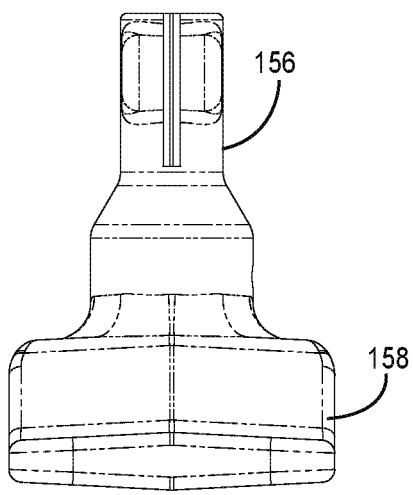
Figure 8D:
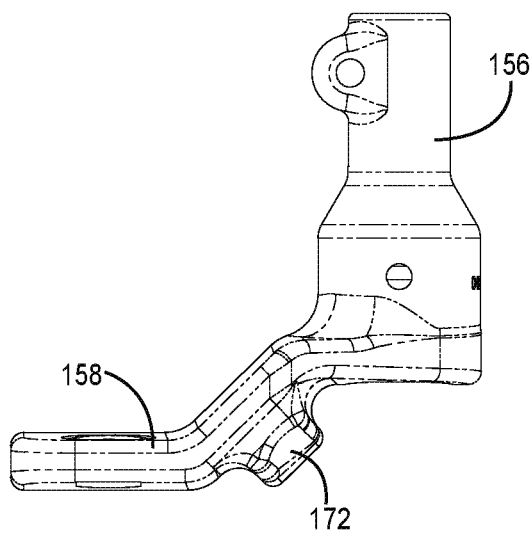

FIG. 7H shows an alternative steering assembly 146 including riser 660 that allows for varying heights of riders and user comfort. The riser 660 allows for two degrees of rotational freedom. Additionally, the handlebars include curved ends 670 for additional user gripping and control during use in an off-road environment.

Figure 9A:
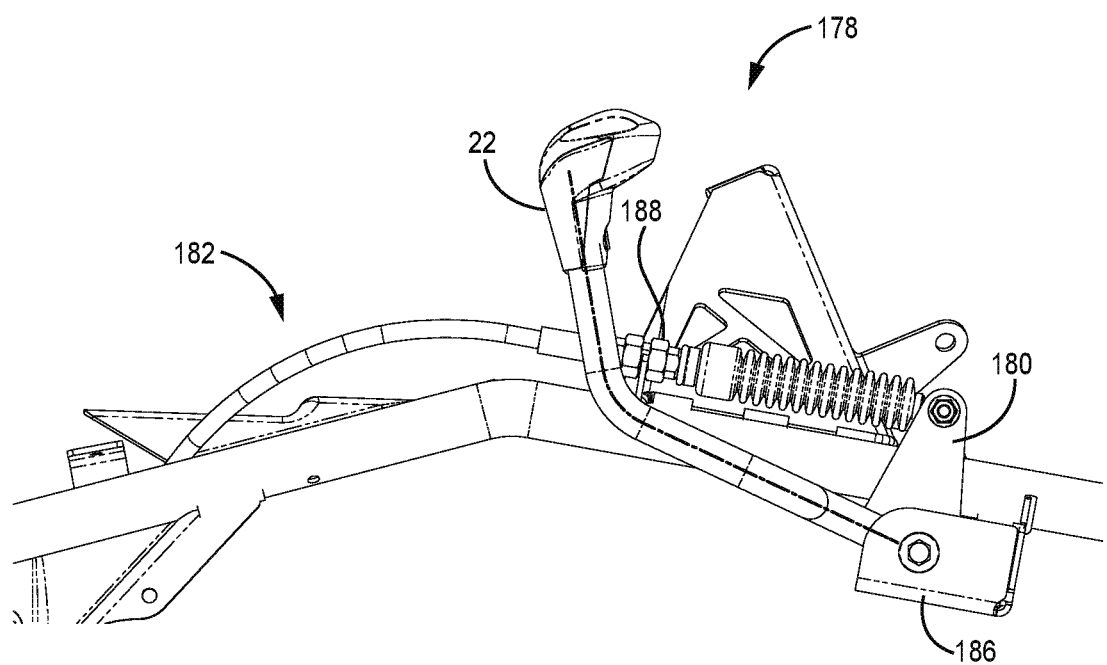
FIGS. 9A-B illustrate perspective views of a shifting assembly, according to some embodiments of the present disclosure.
Figure 9B:
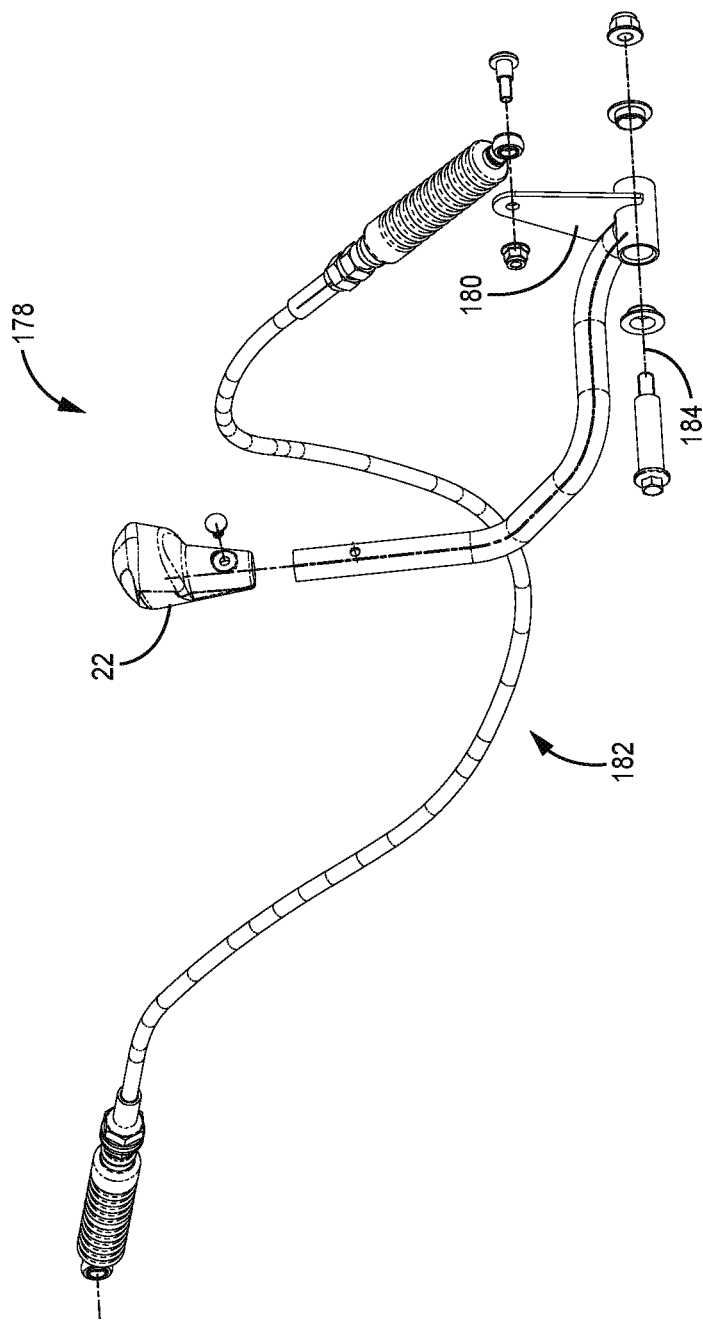

Turning to FIGS. 9A-B, a shifter assembly 178 includes a shifter 22, shifter bellcrank 180, and shifter cable assembly 182. In some embodiments, the shifter 22 includes a shifter handle and shifter bar, as shown in exploded view in FIG. 41. Shifter 22 is attached to shifter bellcrank 180 for example by welding. In some embodiments, the shifter 22 rotates, along with shifter bellcrank 180, about shifter axis 184. Shifter 22 and shifter bellcrank 180 are rotatably coupled to shifter bracket member 186. Further, shifter cable assembly 182 is held in place via cable assembly bracket 188. A first end of the shifter cable assembly 182 is coupled to shifter bellcrank 180, while a second end of the shifter cable assembly is coupled to a gear shift arm on the transaxle 46.

Figure 10A:
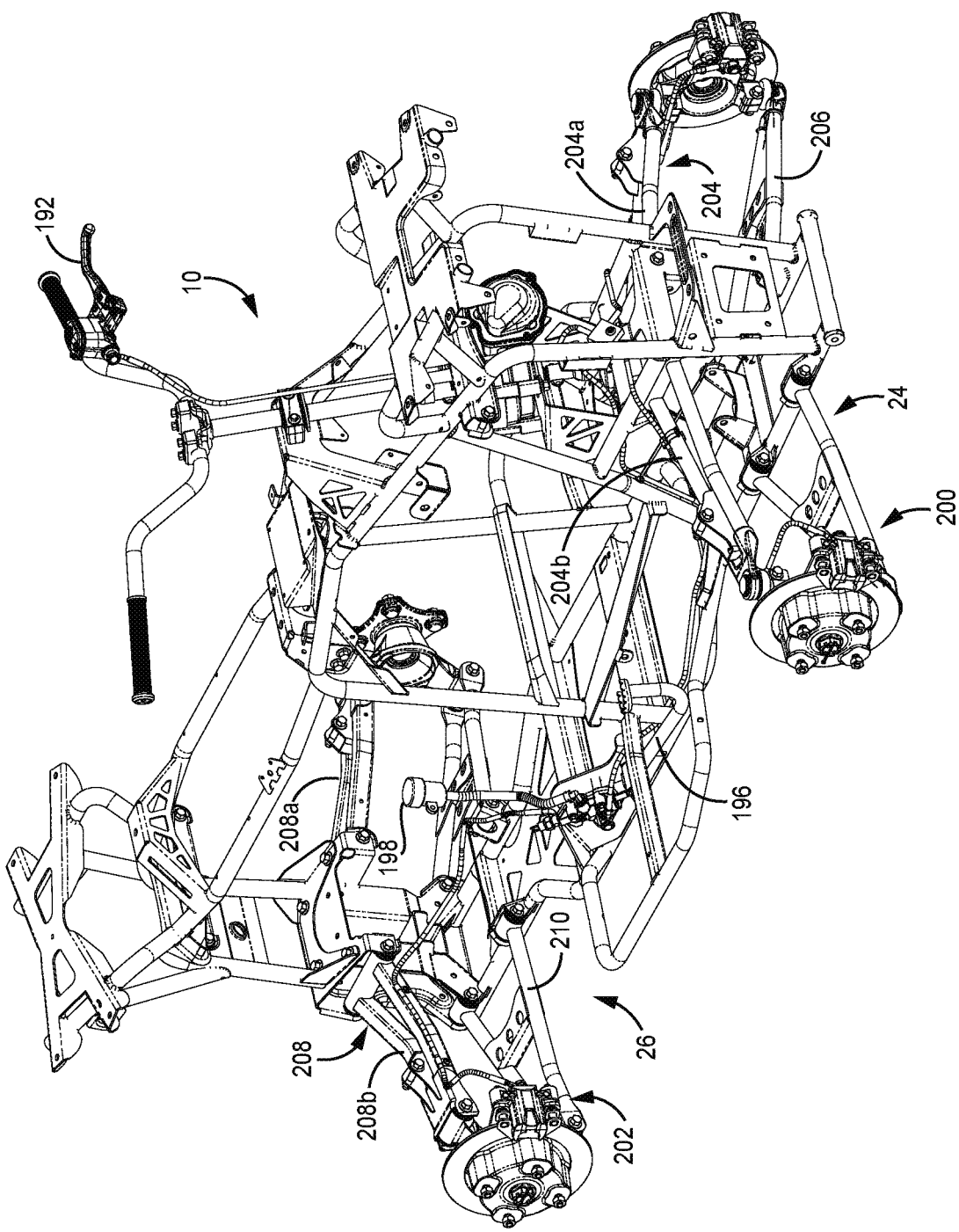
FIGS. 10A-B illustrate perspective views of a partial off-road vehicle including a brake assembly, according to some embodiments of the present disclosure.
Figure 10B:
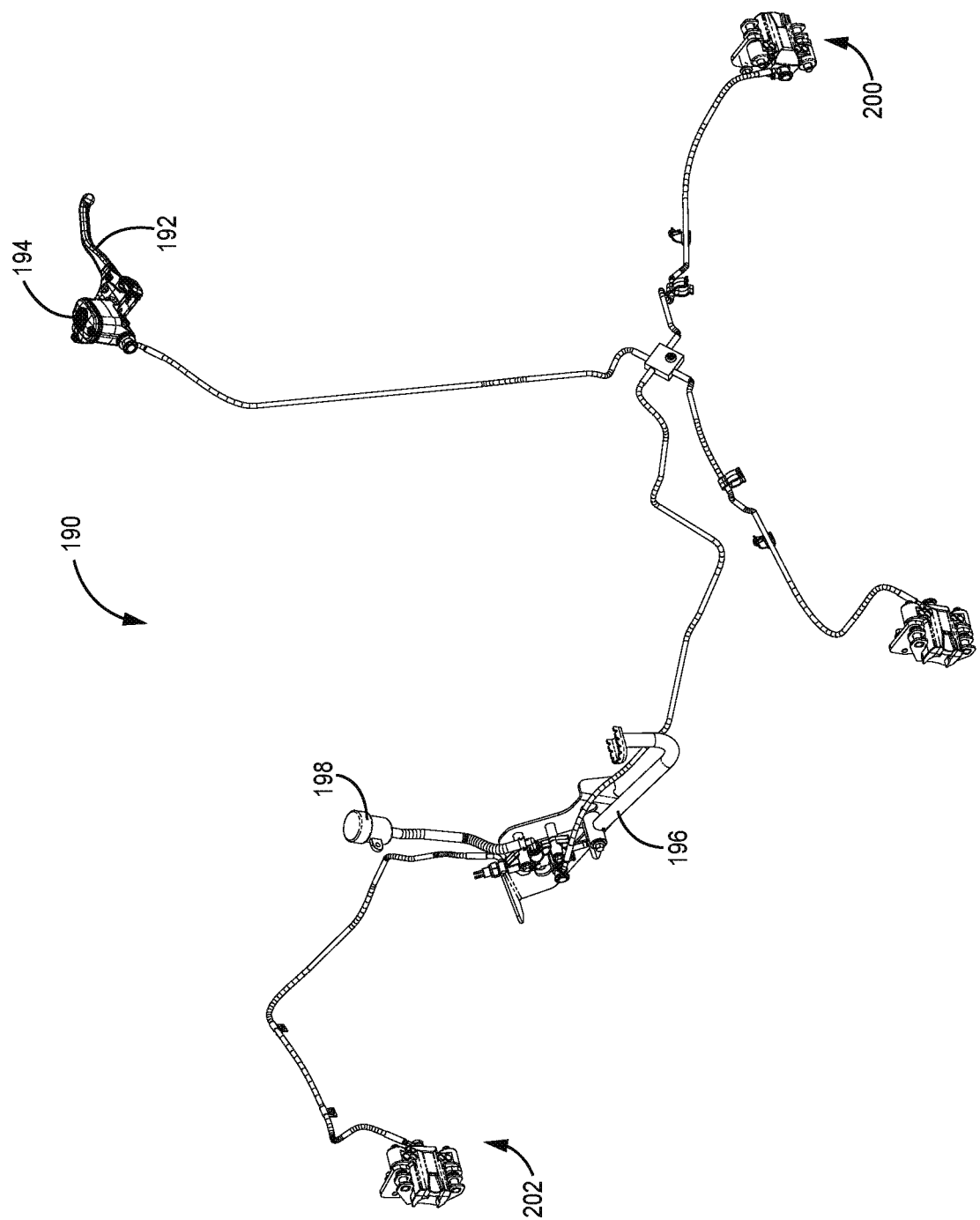

With regard to FIGS. 10A-B, a brake assembly 190 is shown. In some embodiments, the brake assembly 190 includes a hand brake lever 192 and hand brake master cylinder 194, a foot brake lever 196 and foot brake master cylinder 198, front caliper assemblies 200, and rear caliper assembly 202.

As further shown in FIG. 10A, the front suspension 24 includes front upper A-arms 204 and front lower A-arms 206. In some embodiments, the front upper A-arms 204 are universal such that the front upper left A-arm 204*a* is the same as the front upper right A-arm 204*b*. In some embodiments, the rear suspension 26 includes rear upper A-arms 208 and rear lower A-arms 210. In some embodiments, the rear upper A-arms 208 are universal such that the rear upper left A-arm 208*a* is the same as the rear upper right A-arm 208*b*.

Figure 11A:
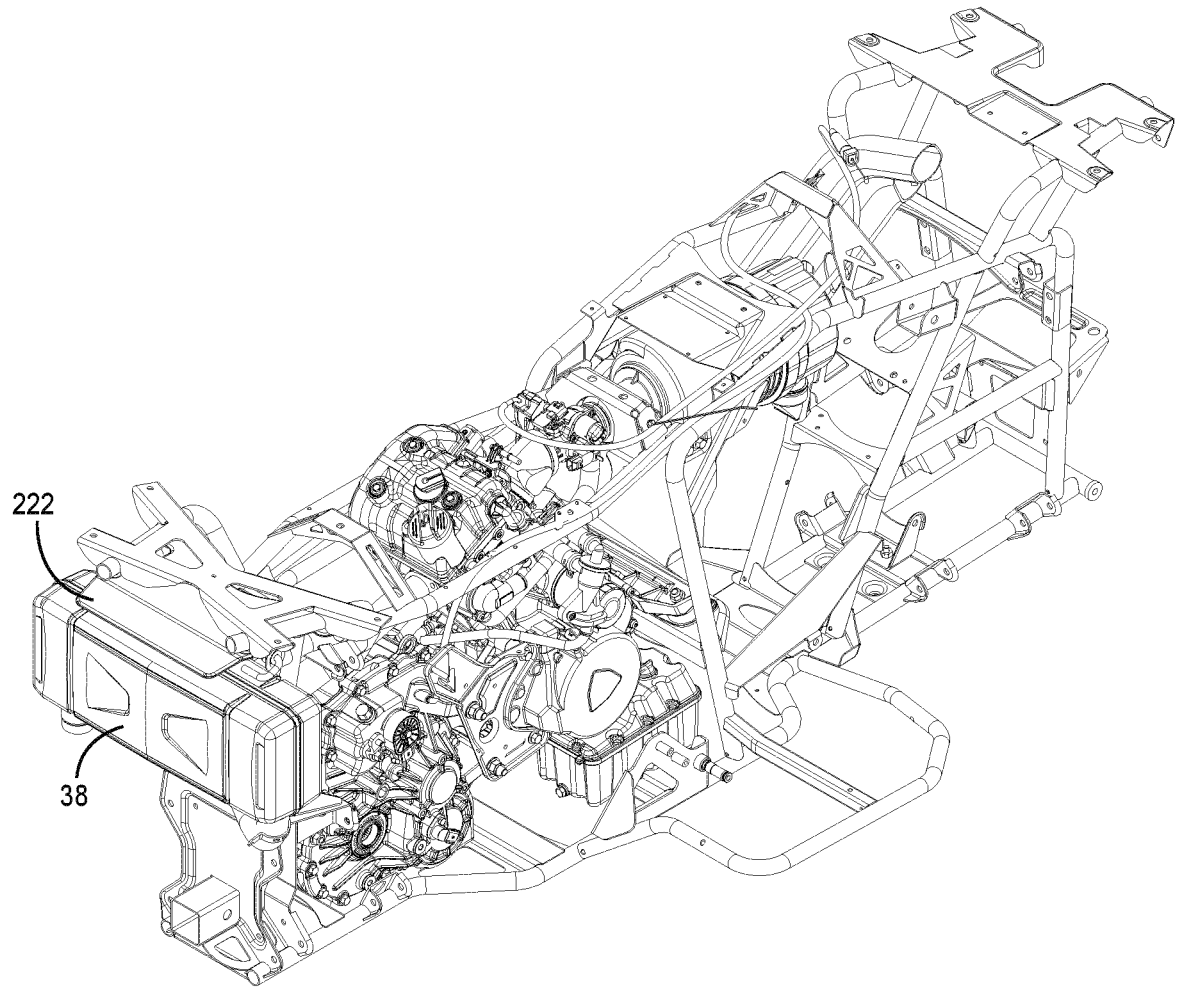
FIGS. 11A-X illustrate perspective views of an exhaust and air handling system, according to some embodiments of the present disclosure.
Figure 11B:
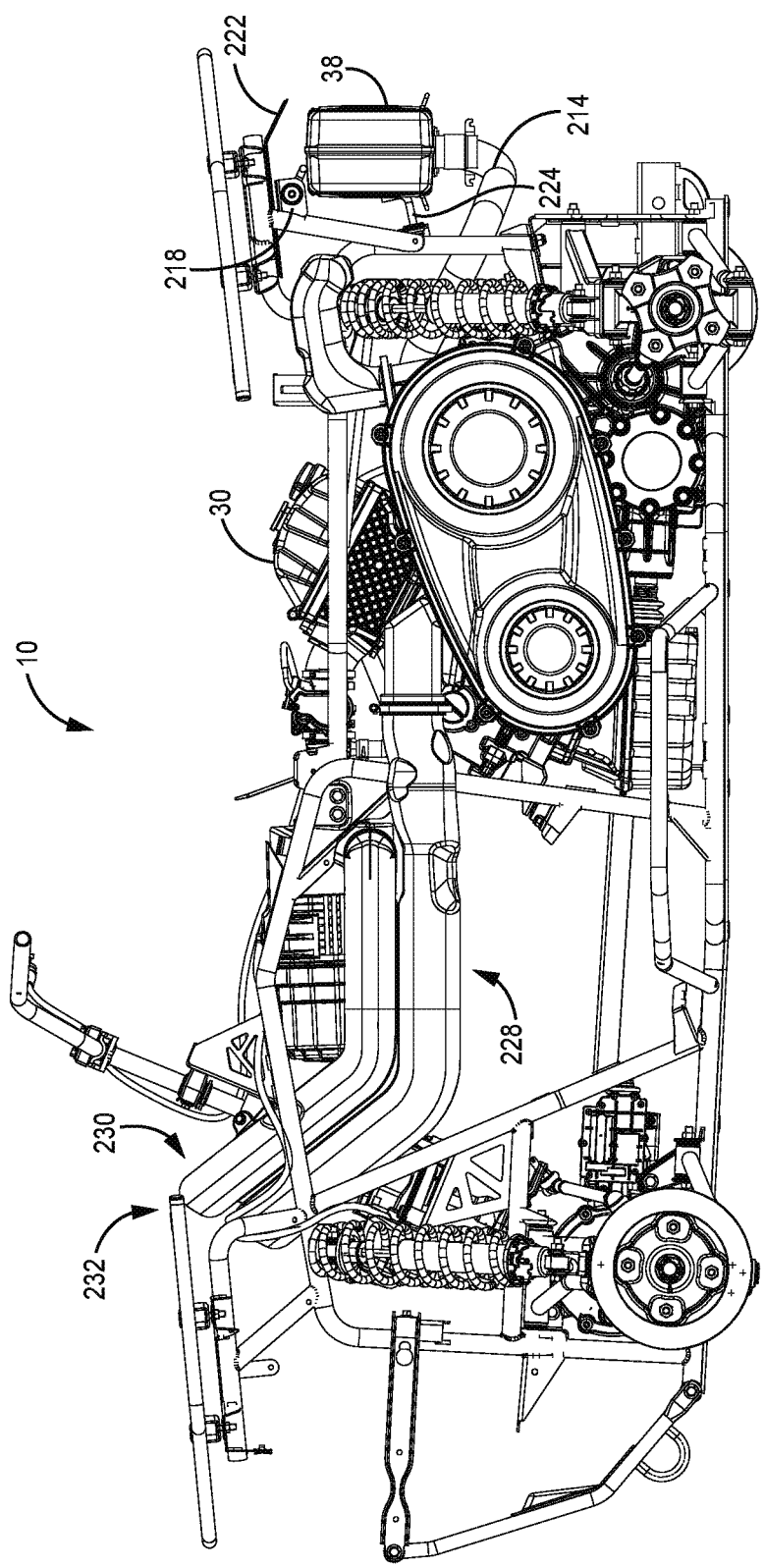
Figure 11C:
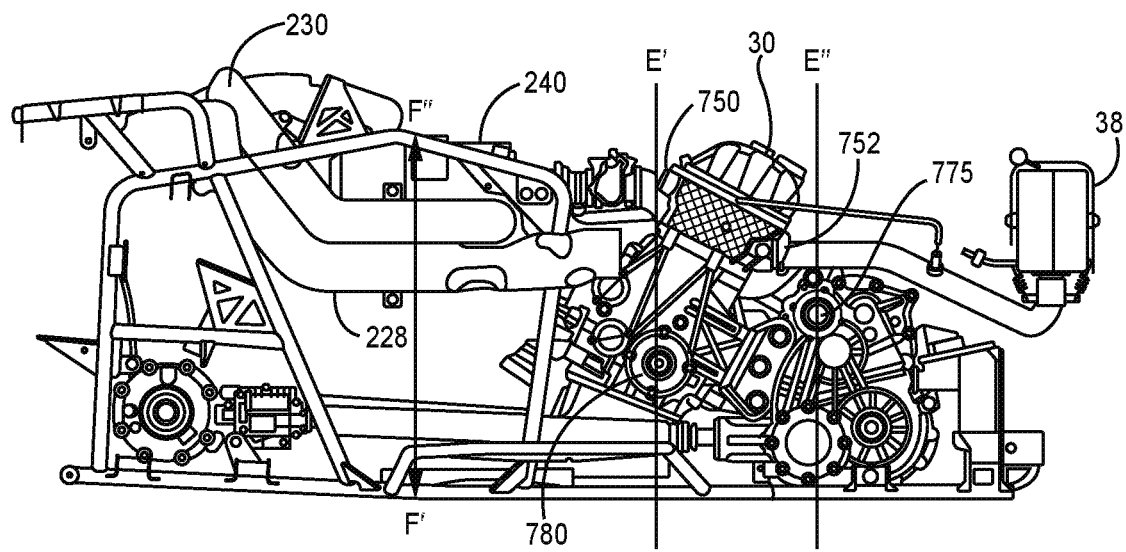
Figure 11D:
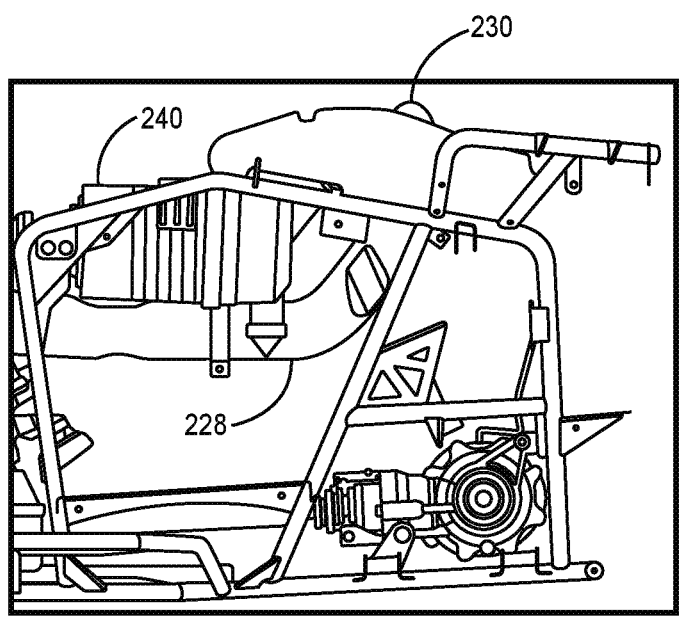
Figure 11E:
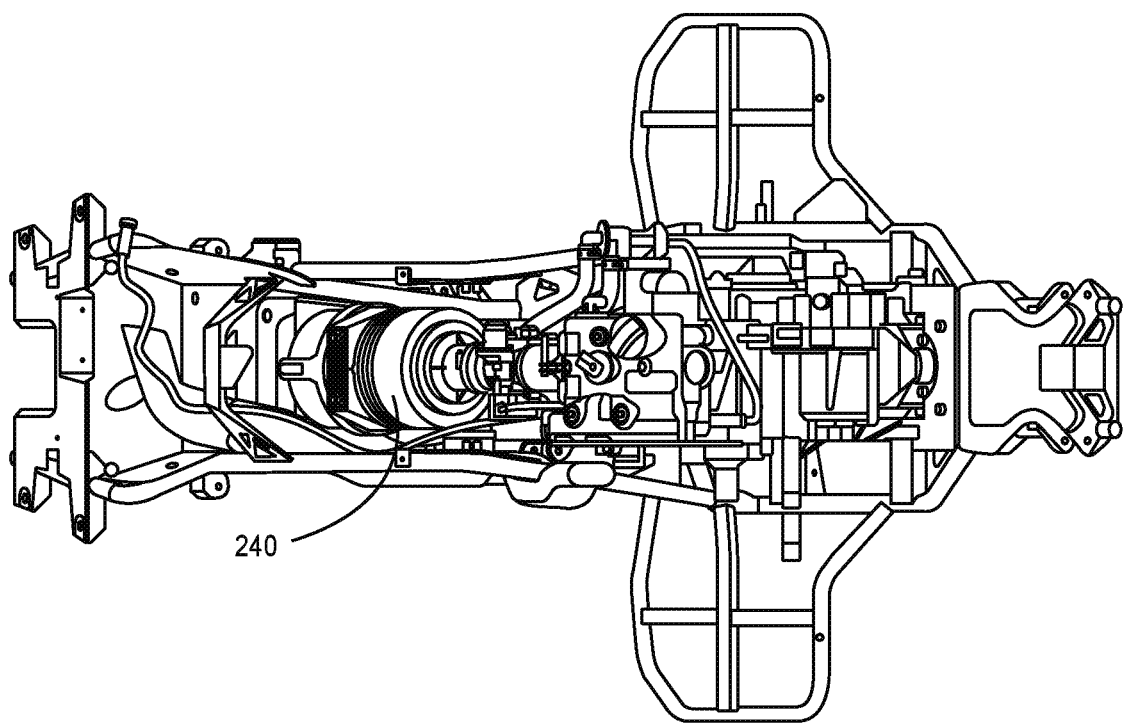
Figure 11F:
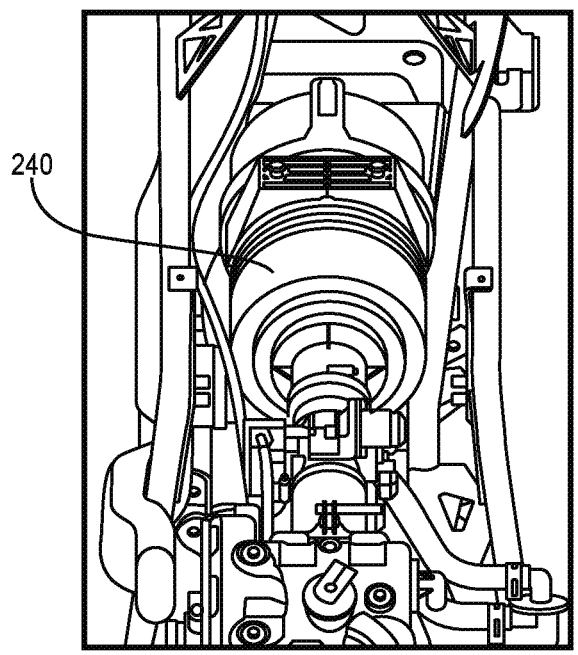
Figure 11G:
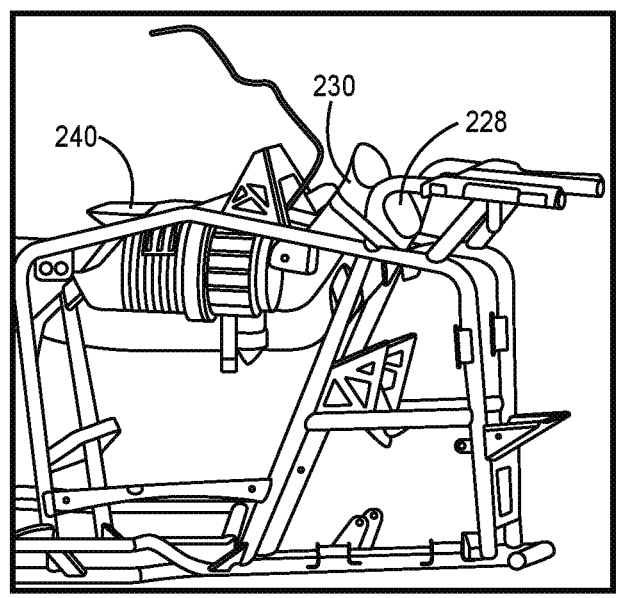
Figure 11H:
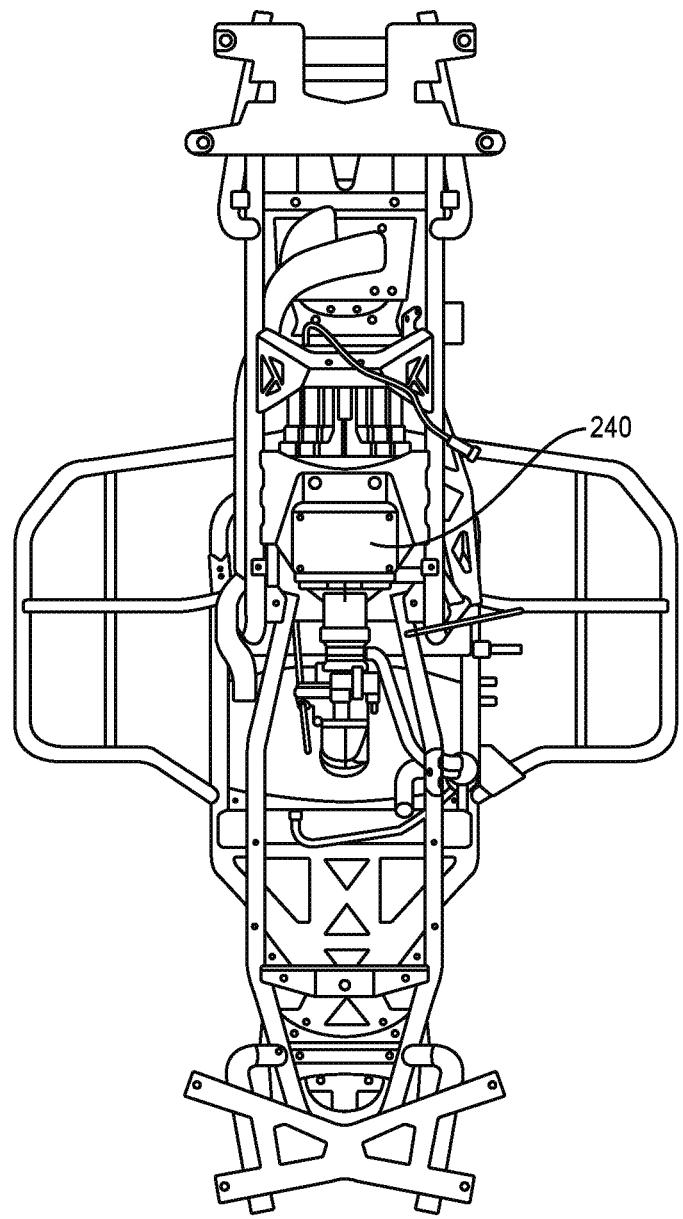
Figure 11I:
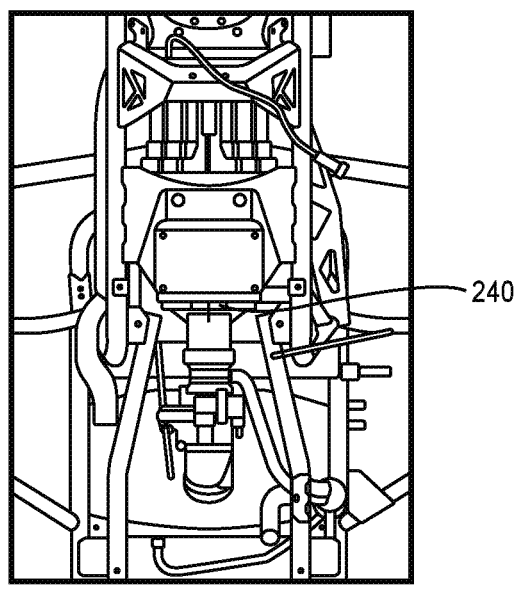
Figure 11J:
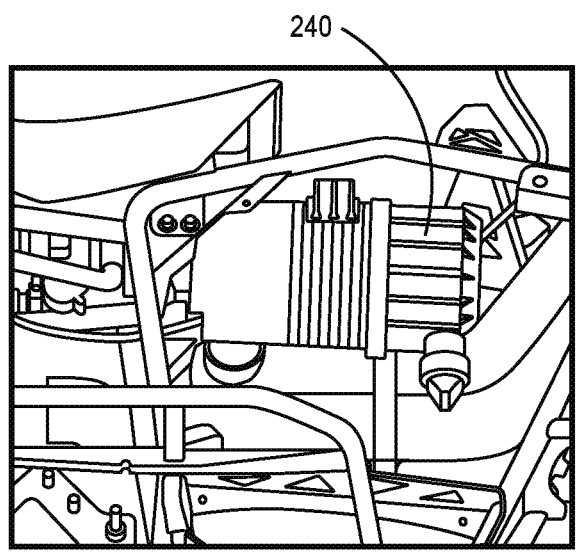
Figure 11K:
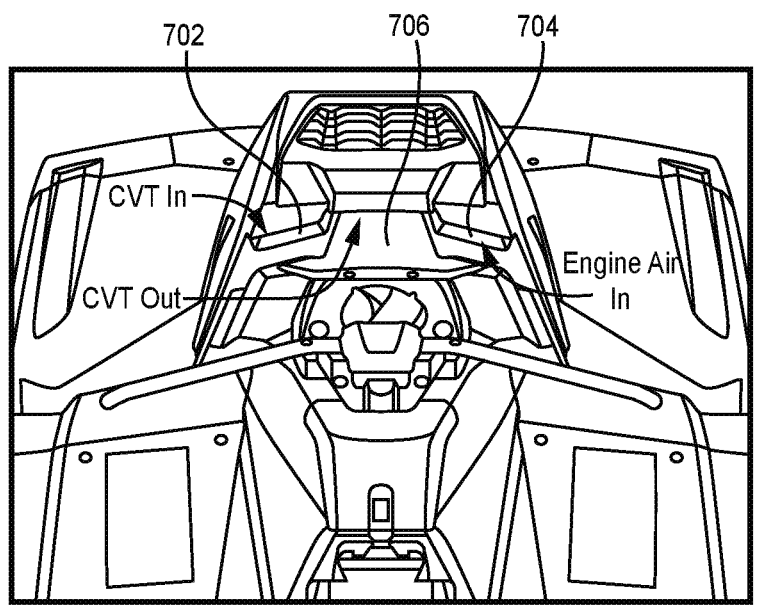
Figure 11L:
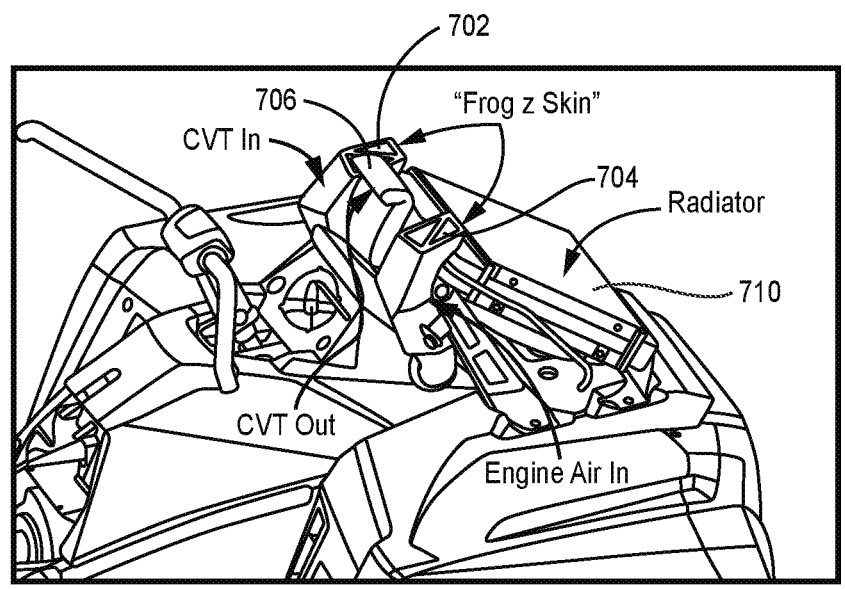
Figure 11M:
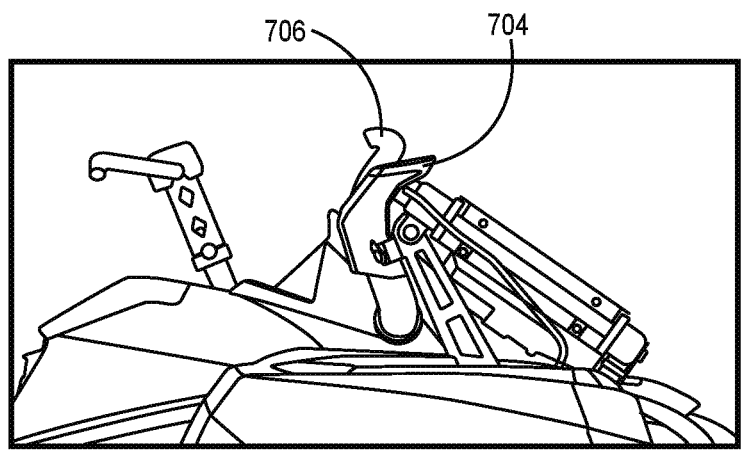
Figure 11N:
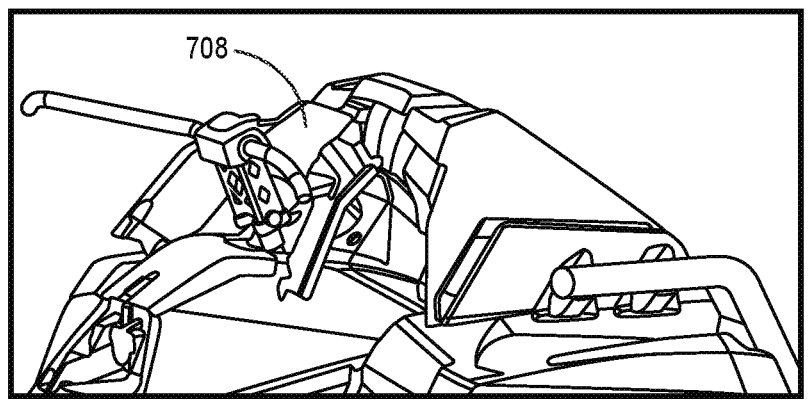
Figure 11O:
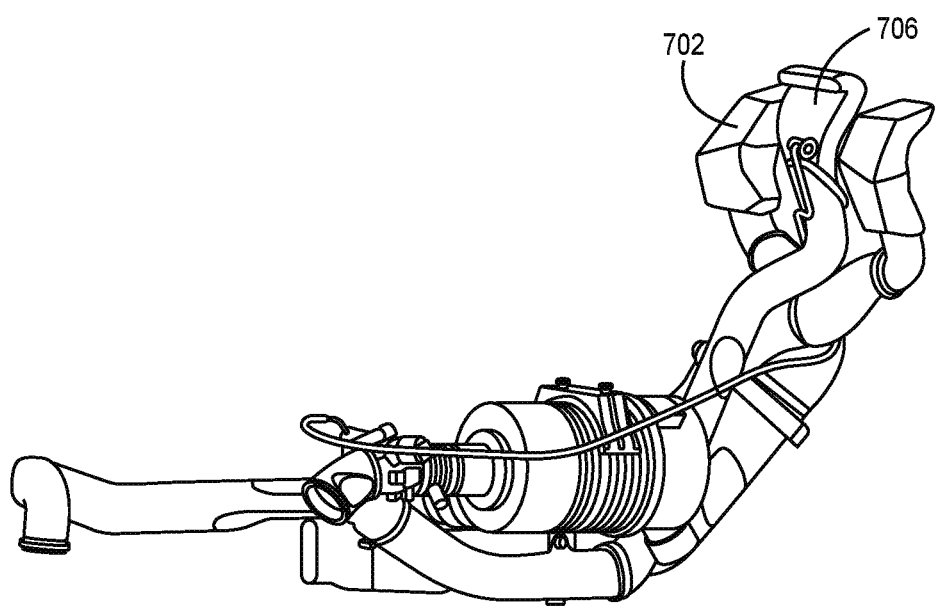
Figure 11P:
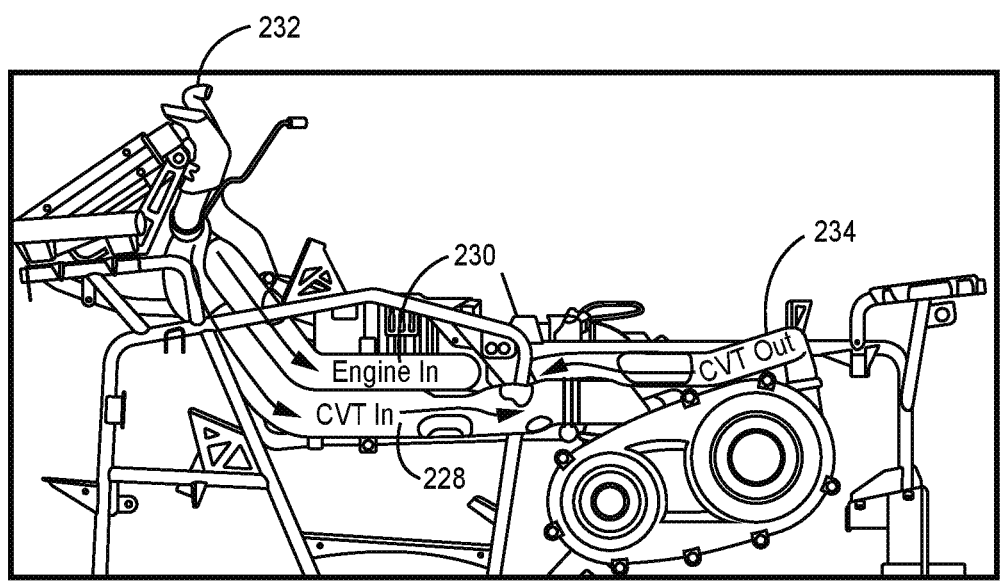
Figure 11Q:
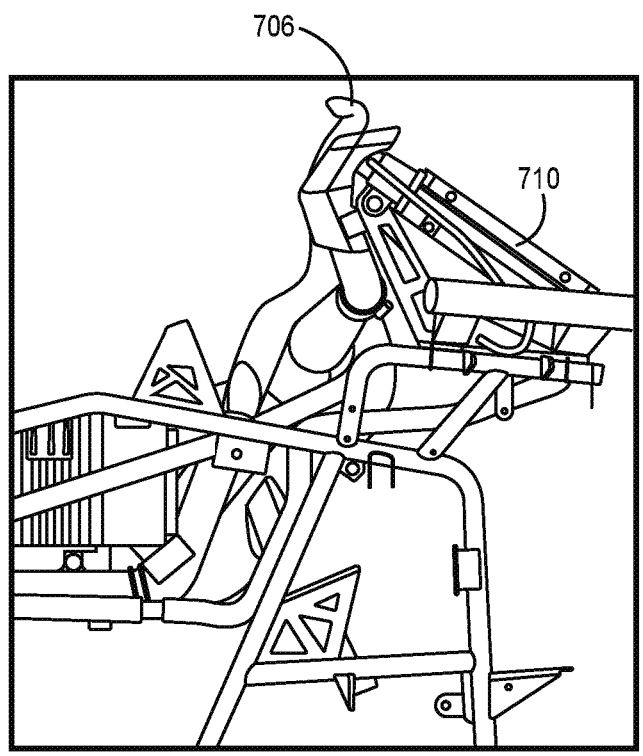
Figure 11R:
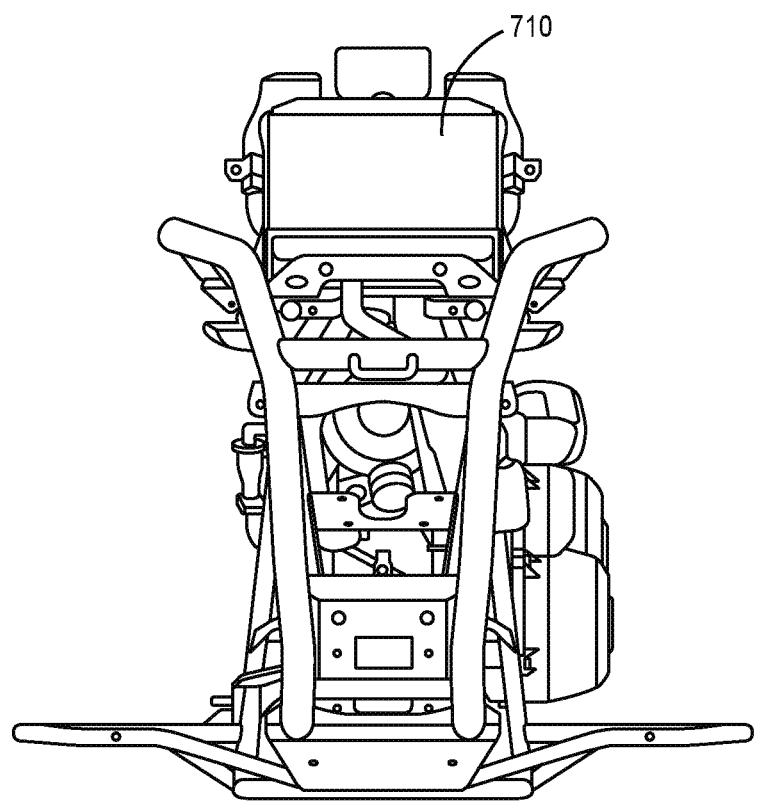
Figure 11S:
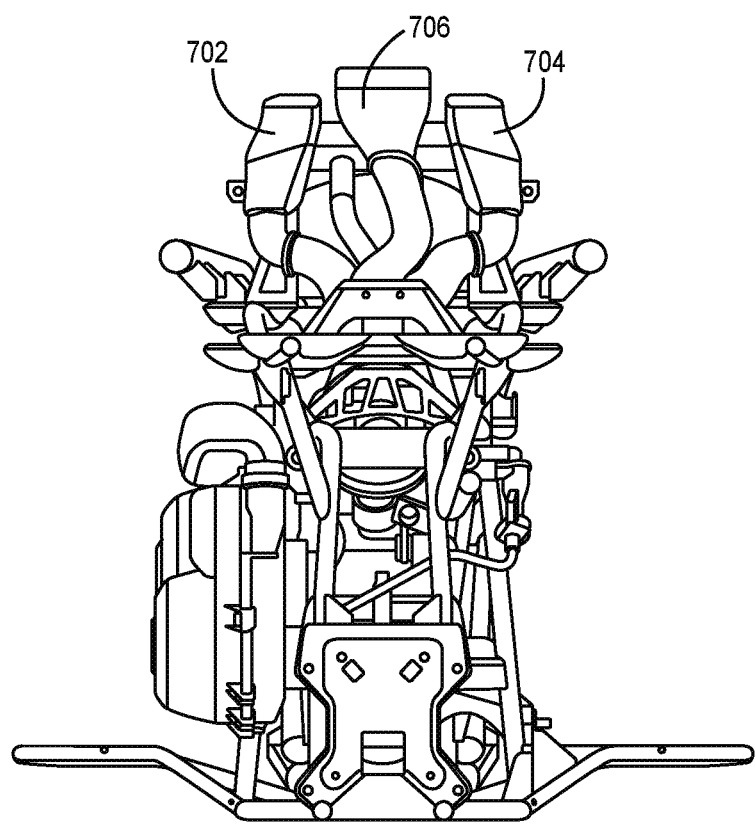
Figure 11T:
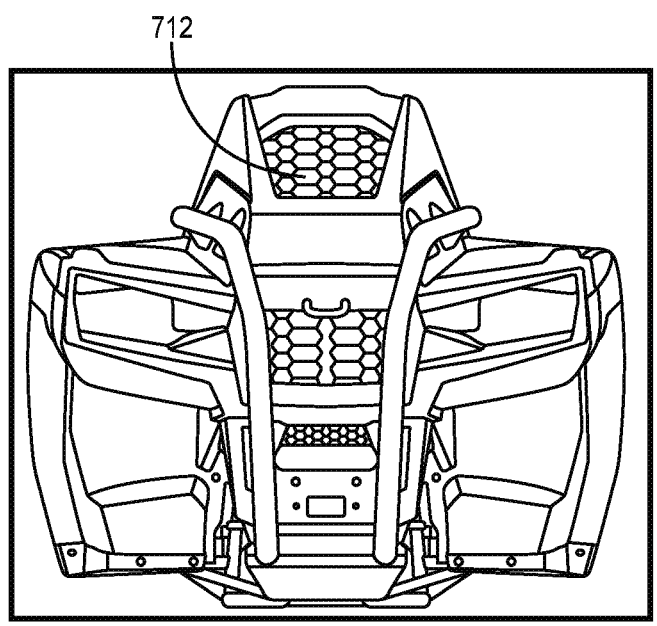
Figure 11U:
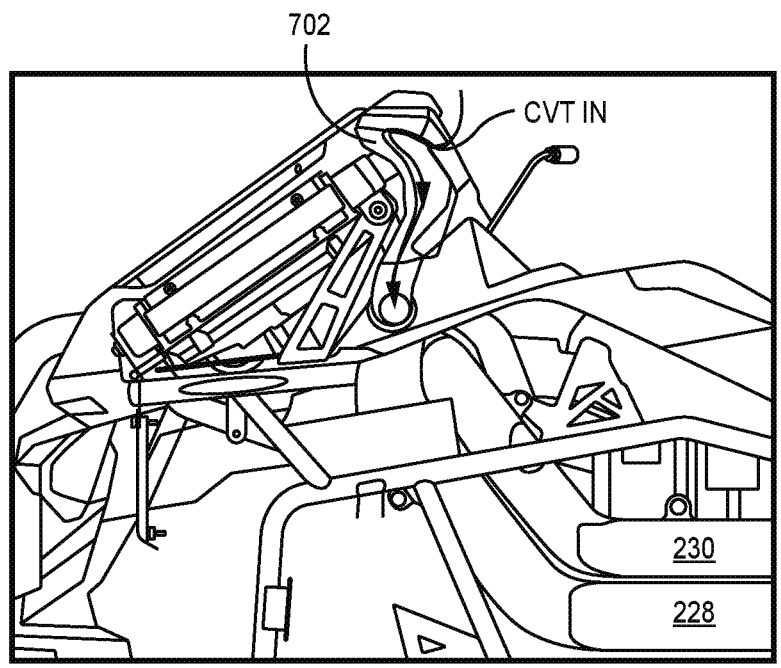
Figure 11V:
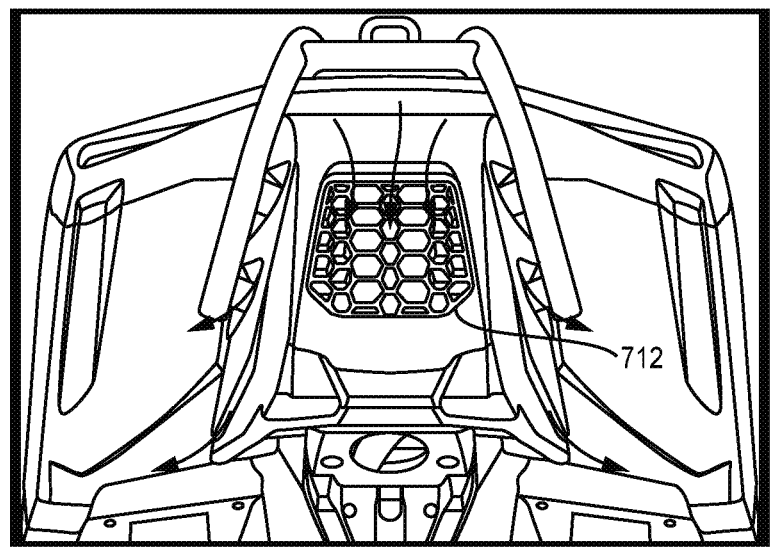
Figure 11W:
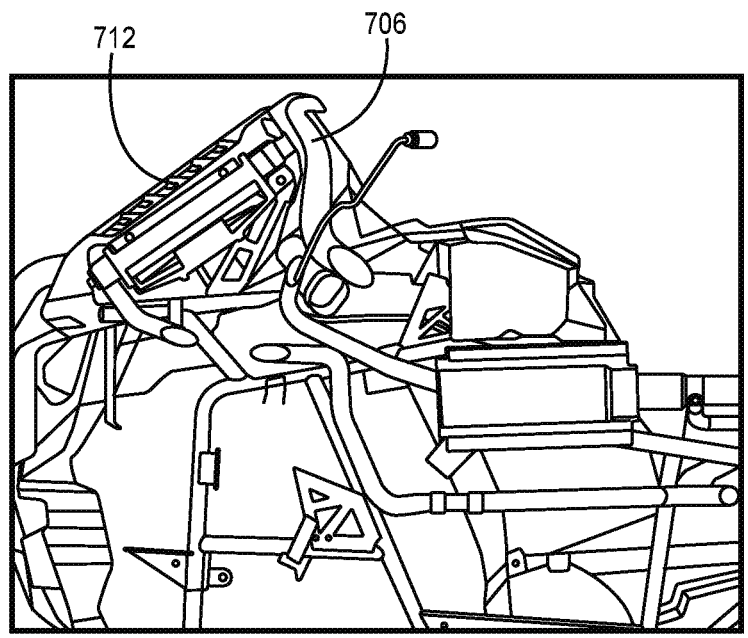
Figure 11X:
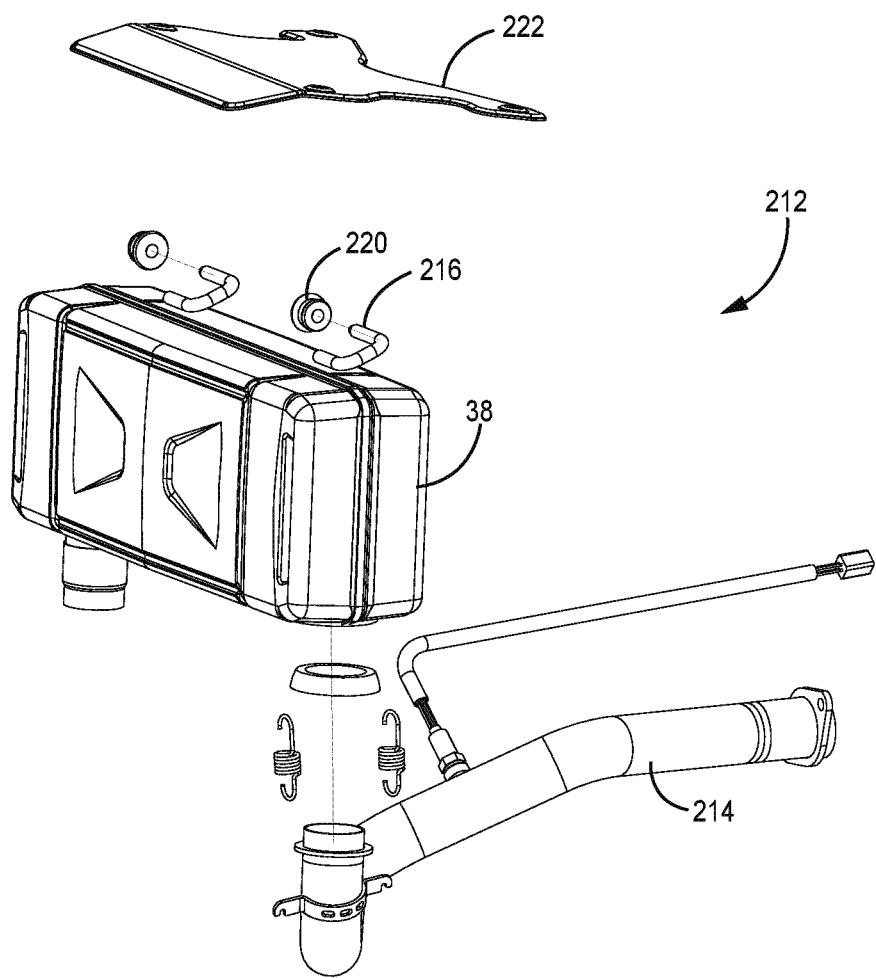

Turning to FIGS. 11A-X, in some embodiments, an exhaust system 212 includes an exhaust tube 214 and a muffler 38. As shown in FIG. 2E, the exhaust tube 214 extends between the prime mover 30 and the muffler 38. In some embodiments, the exhaust system 212 includes muffler hangars 216 which hang muffler 38 from muffler hangar brackets 218 (FIGS. 2E and 11B) via isolator members 220. Further, in some embodiments, the exhaust system 212 includes muffler standoff member 224 (FIG. 11B,11X), which couples the muffler 38 to the frame 12 via an additional isolator member 220 via muffler support aperture 226 (FIG. 5A). In addition, in some embodiments, a shield member 222 is utilized. As will be appreciated, in some embodiments, the exhaust tube 214 extends rearwardly out of the prime mover 30 and does not need to wrap around the prime mover 30. Such an arrangement advantageously allows for more compact packaging.

Now referencing FIGS. 11B-W, 12A, and 12B, in some embodiments, the off-road vehicle 10 includes an CVT air system 228 and a prime mover intake system 230. In some embodiments, the CVT air system 228 includes an intake duct 232, CVT housing 234, and CVT exhaust duct 236. In some embodiments, the prime mover intake system 230 is configured to intake combustion air for the prime mover 30. In some embodiments, the prime mover intake system 230 includes a prime mover intake duct 238 and air filter assembly 240, and a prime mover supply duct 242. Air moves from the atmosphere through the prime mover intake duct 238 before entering the air filter assembly 240. From there, the air is filtered with a filter element (not shown) and is then routed through the prime mover supply duct 242 to the throttle body and into the prime mover 30. In one embodiment, the air system 228 utilizes a cyclonic or cylindrical air filter assembly 240.

In some embodiments, the air system 228 and prime mover intake system 230 are positioned higher in the frame than traditional ATV designs, which protects against water or mud interference in the systems. For example, the systems 228 and 230 can be positioned above the plane of the transaxle input 775 (see FIG. 11C). In another example, the systems 228 and 230 can be positioned more than 50% the distance between the lower frame components and tallest frame components (see line F'-F" in FIG. 11C). The systems 228, 230 can be positioned about 50% the distance, about 60% the distance, or anywhere between 40% and 80% the distance between lower frame components and tallest frame components. Additionally, the radiator 28 is positioned at a high point in the vehicle and CVT air intake 702, engine air intake 704, and CVT air outputs 706 are located similarly near or at a high point in the vehicle to help prevent water and mud from interfering with the air handling systems (see FIG. 11K for one embodiment and FIG. 11L for an alternative embodiment). A radiator cover or skin 710 can be utilized to further prevent water and mud infiltration, without significantly affecting air flow. A removable cover 708 can be used to protect and access the cooling system, for example.

Also shown in FIG. 11C is a shortened air path between the filter assembly 240 and cylinder head input ports 750. Reducing this distance improves engine performance. The filter assembly 240 can be positioned between the steering column and forward half of the rear frame assembly 108, in order to achieve this shortened distance. Alternatively, the filter assembly 240 is positioned above the fuel tank 246. In one embodiment, one or more of the cylinder head input ports 750 and exhaust ports 752 can be positioned between the engine output 780 and transaxle input 775 (see lines E' and E" in FIG. 11C). In another embodiment, all of the cylinder head input ports 750 and exhaust ports 752 can be positioned between the engine output 780 and transaxle input 775.

With regard to FIGS. 13A-I, a fuel system 244 includes a fuel tank 246, fuel filler neck 248, fuel cap 250, fuel lines 252, and evaporative emissions system 254. In some embodiments, the fuel tank 246 is located forwardly of the prime mover 30 and a top of the fuel tank 246 is located below a top of the prime mover 30. In some embodiments, the top of the fuel tank 246 is located below the top of the driven clutch 56 and, in some embodiments, below the top of the drive clutch 54. With further regard to FIG. 13B, in some embodiments, a portion of the fuel tank 246 extends below the driveshaft 142, while a portion of the fuel tank 246 extends above the drive shaft 141 and portions of the fuel tank 246 extend both to the left and right hand sides of the drive shaft 142. Because the fuel tank 246 is positioned substantially forward of the exhaust system 212, prime mover 30, and rear frame assembly 108, the need for a heat shield is eliminated, reducing parts and ultimately saving time and money in the assembly.

Figure 13A:
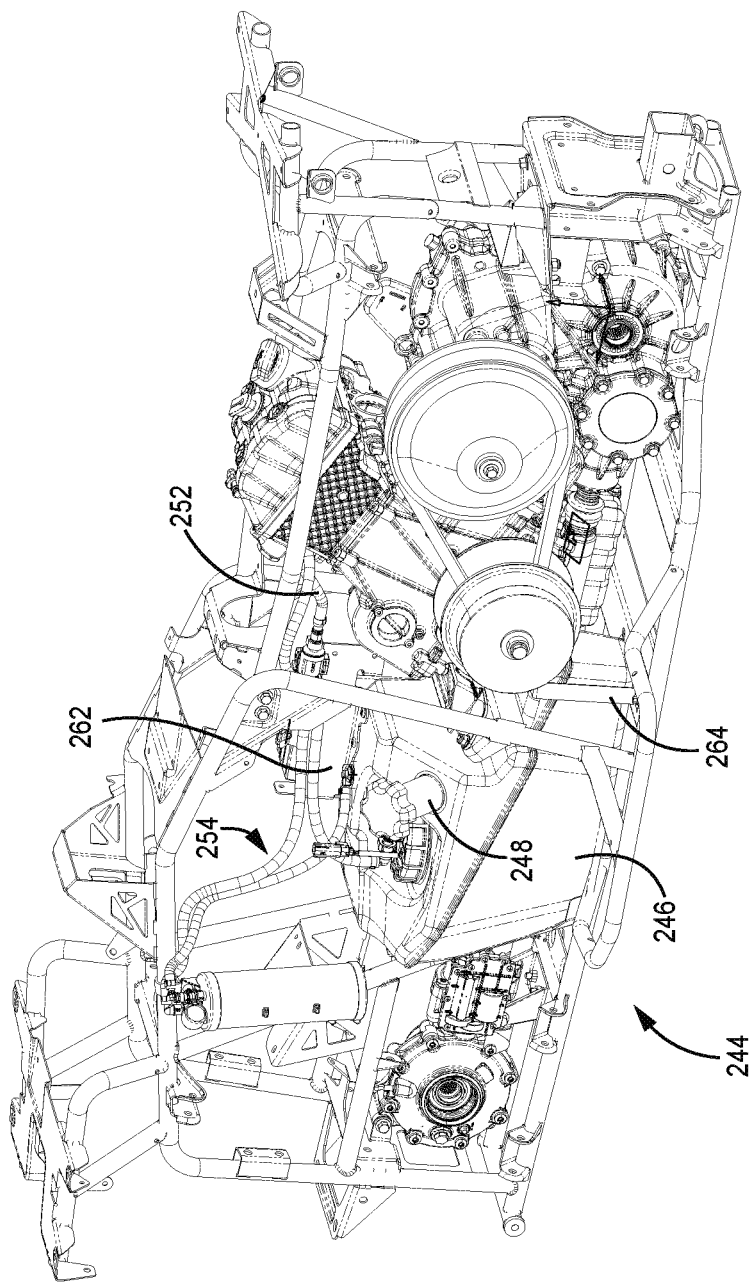
FIGS. 13A-I illustrate perspective views of a fuel system, according to some embodiments of the present disclosure.
Figure 13B:
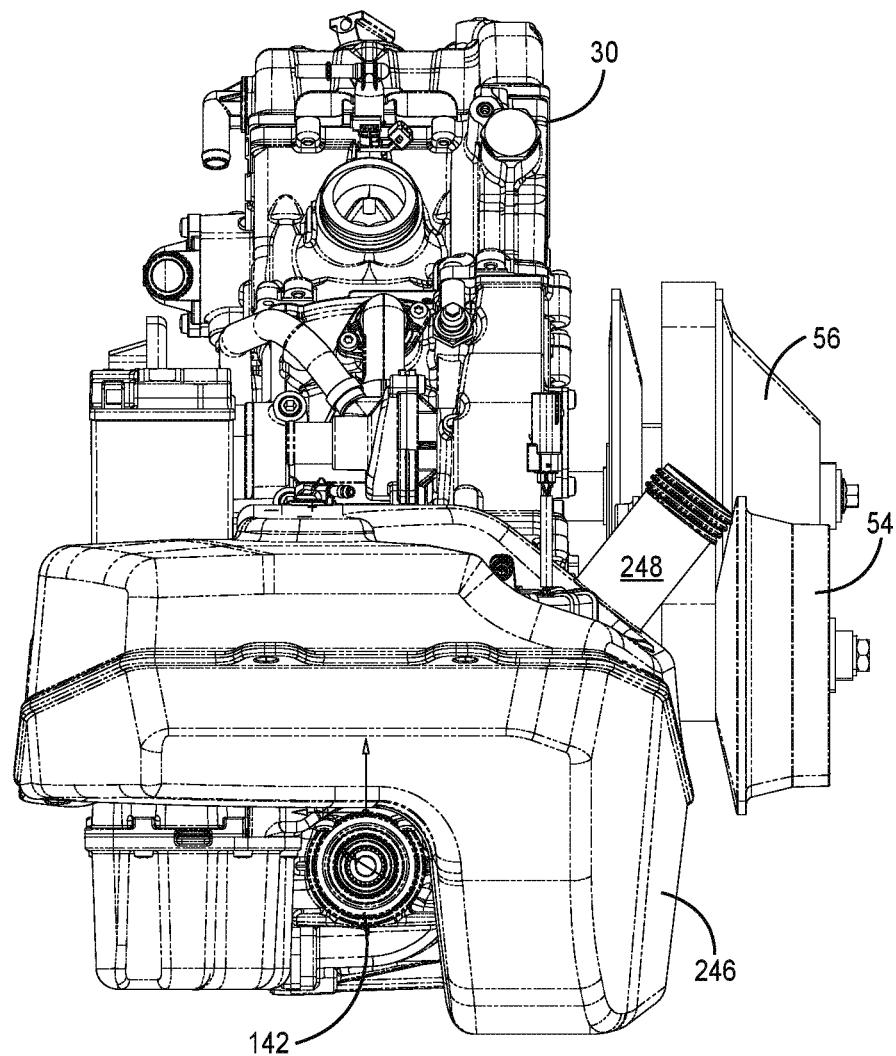
Figure 13C:
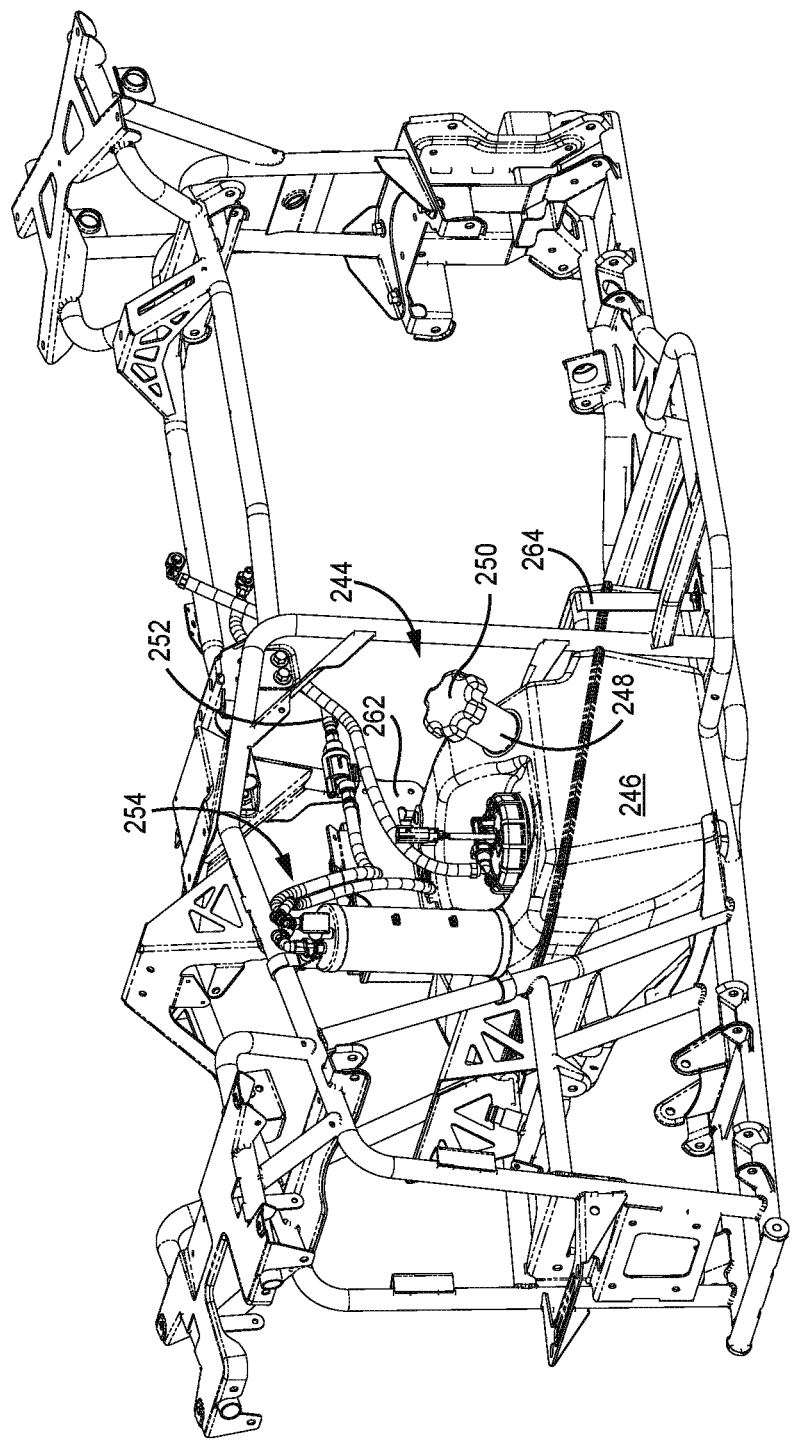
Figure 13D:
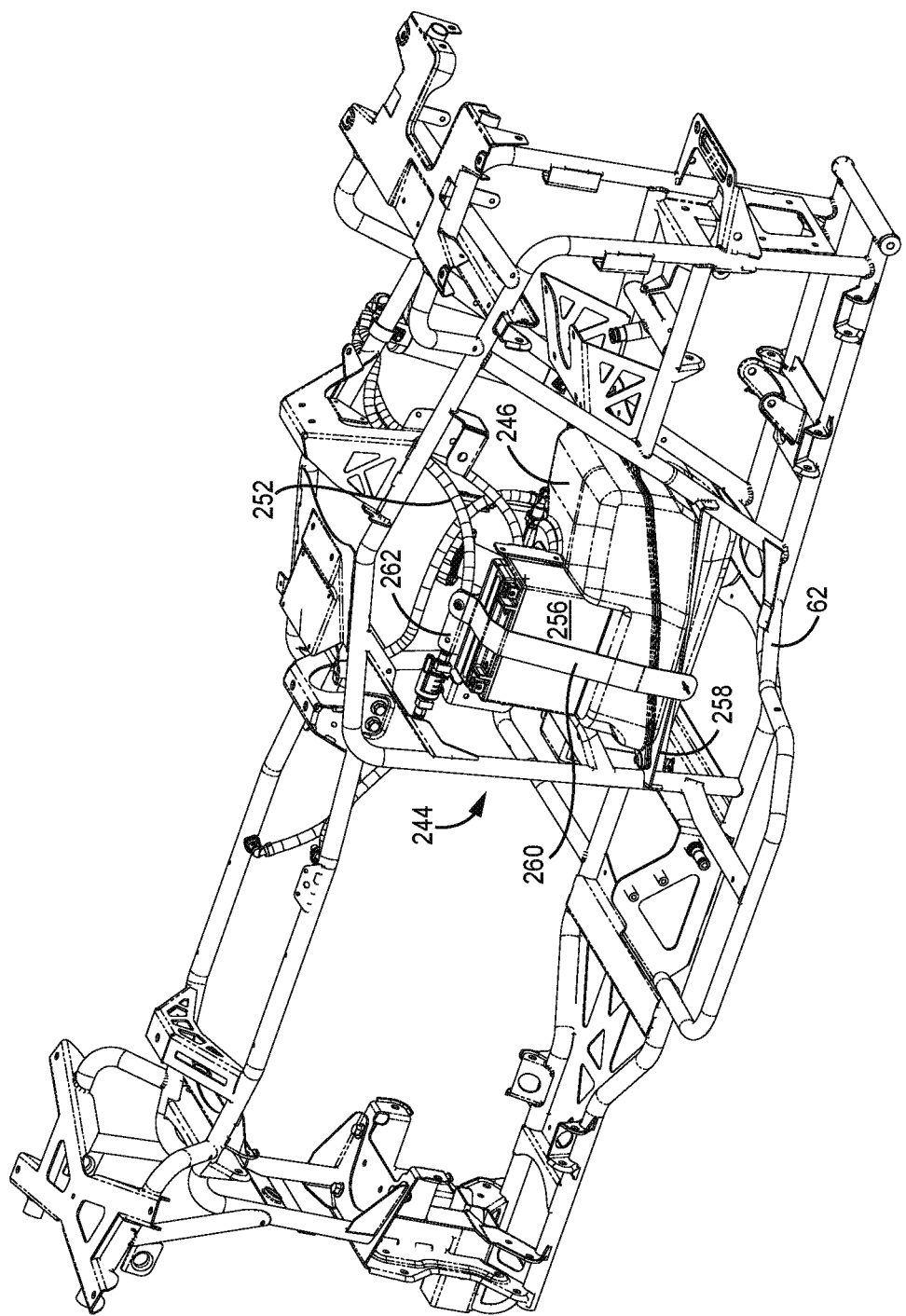

As shown in FIG. 13D, in some embodiments, a battery 256 rests on a portion of the fuel tank 246. The combined battery 256 and fuel tank 246 configuration saves space and positions the battery 256 at a higher position than traditional ATVs, which protects the battery 256 in more circumstances that involve driving through mud or water.

Figure 13E:
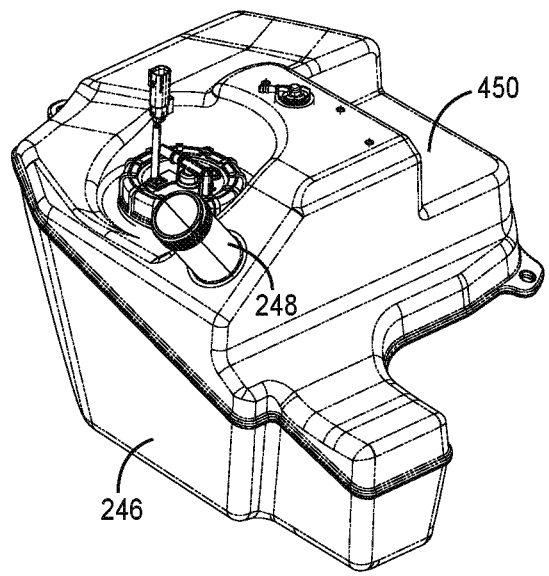
Figure 13F:
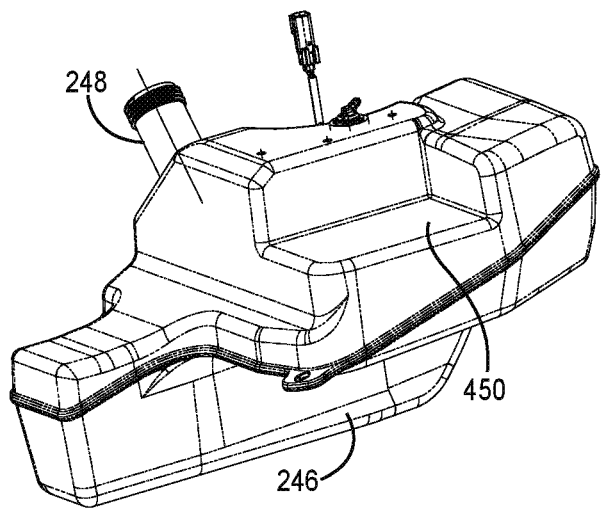
Figure 13G:
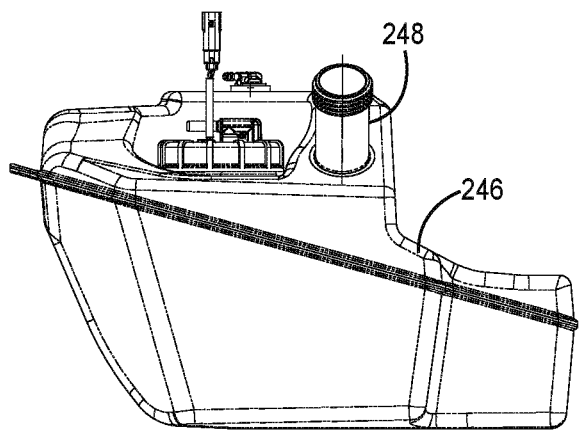
Figure 13H:
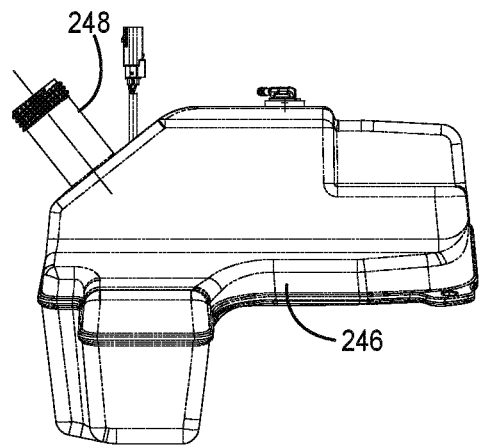
Figure 13I:
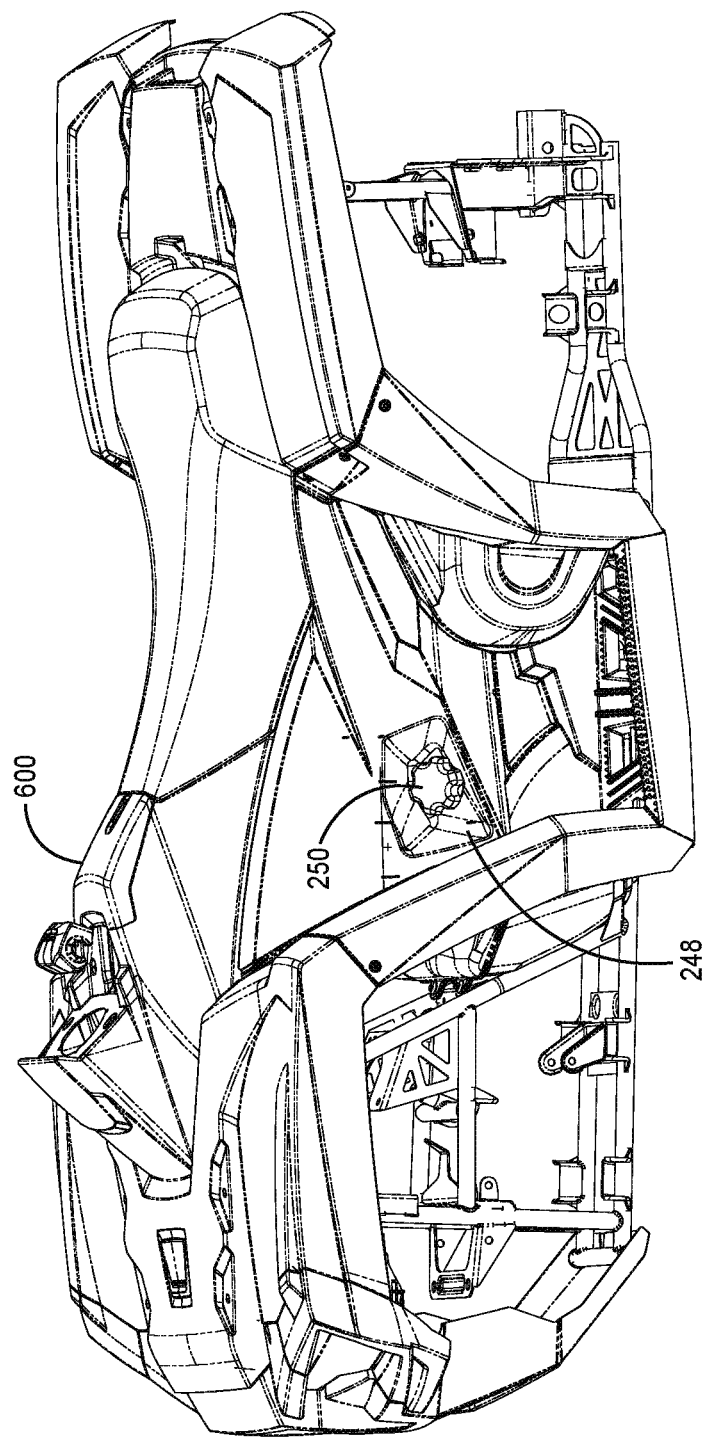

Further, in some embodiments, a portion of the fuel tank 246 is at least partially supported by fuel tank support member 258. Further, in some embodiments, band 260 extends from fuel tank support member 258 over the top of battery 256 to secure battery 256 and fuel tank 246 to main frame 62. In some embodiments, band 260 is coupled to battery bracket 262. Battery bracket 262 is, in some embodiments, coupled to a portion of the fuel tank 246, for example with one or more fasteners. At the rear of the fuel tank 246, in some embodiments, a fuel tank retainer 264 further secures the fuel tank 246 to the frame 12. Referring to FIG. 13I, in some embodiments, the fuel filler neck 248 protrudes through an opening in a body panel such that a fuel cap 250 is accessible to put fuel in the fuel tank 246. As shown in FIGS. 13E-F, the battery supporting recess 450 is shaped to receive and secure one or more batteries 246. The recess 450 can accommodate multiple sizes (varying height and width) of batteries 246 and also allows for direct access by the user or technician to the battery from the side of the vehicle.

Figure 14:
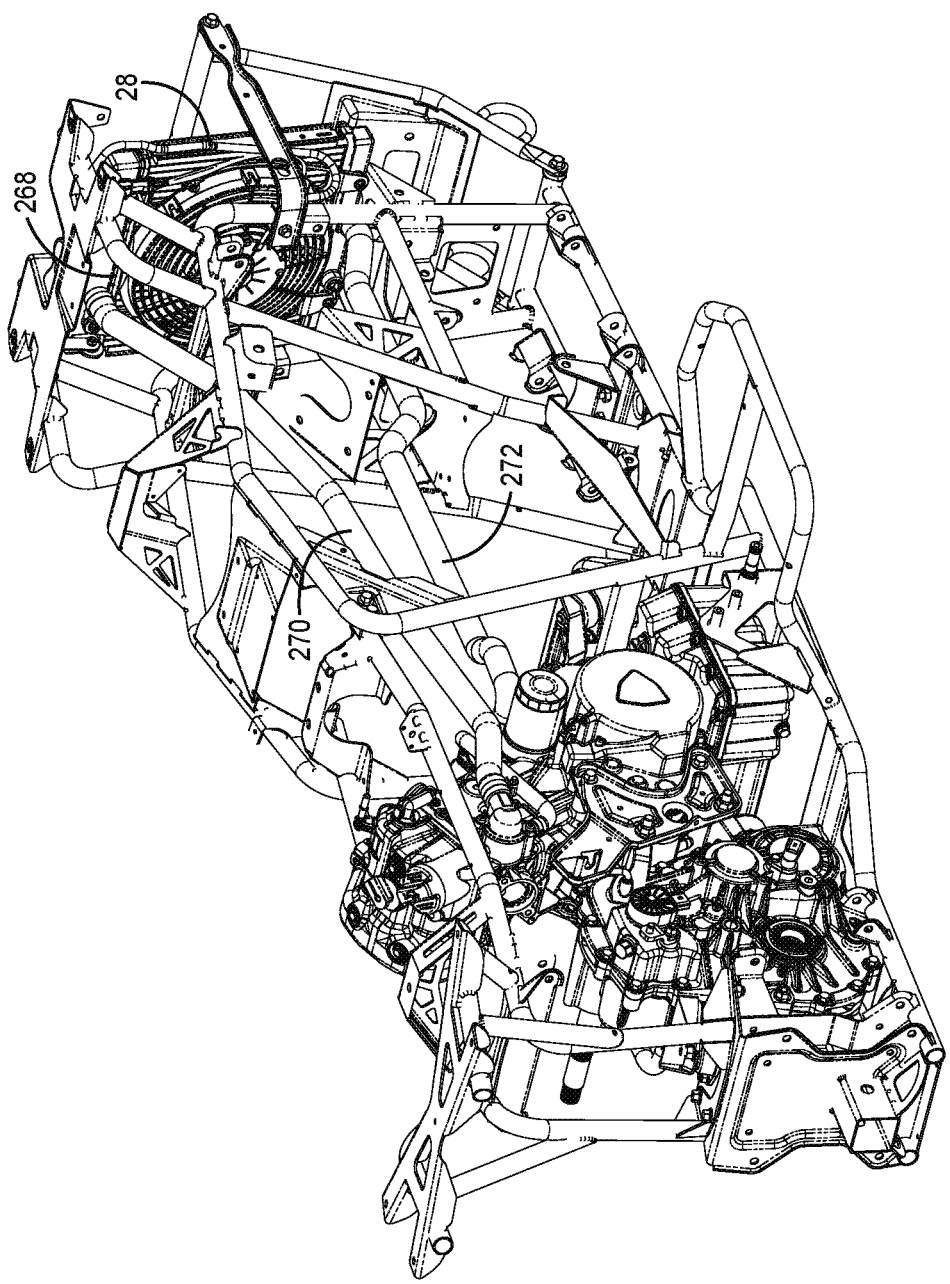
FIG. 14 illustrates a perspective view of a cooling system, according to some embodiments of the present disclosure.

FIG. 14 shows an embodiment of an off-road vehicle cooling system 266. In some embodiments, the cooling system 266 includes a radiator 28, cooling fan 268, return line 270 (flow from the prime mover 30 to the radiator 28), and cooling line 272 (flow from the radiator 28 to the prime mover 30). In some embodiments, one or both of the return line 270 and cooling line 272 extend over the fuel tank 246.

Figure 15A:
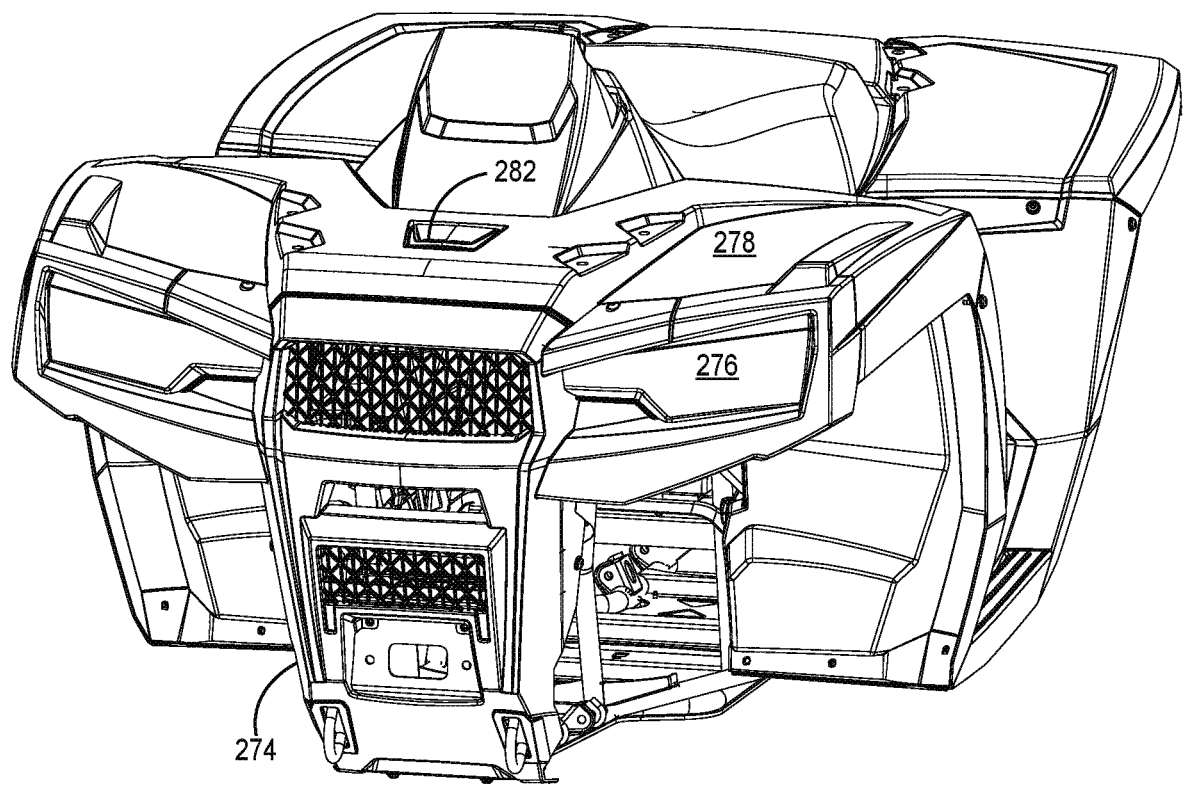
FIGS. 15A-T illustrate perspective views of body panels and footwells of an off-road vehicle, according to some embodiments of the present disclosure.
Figure 15B:
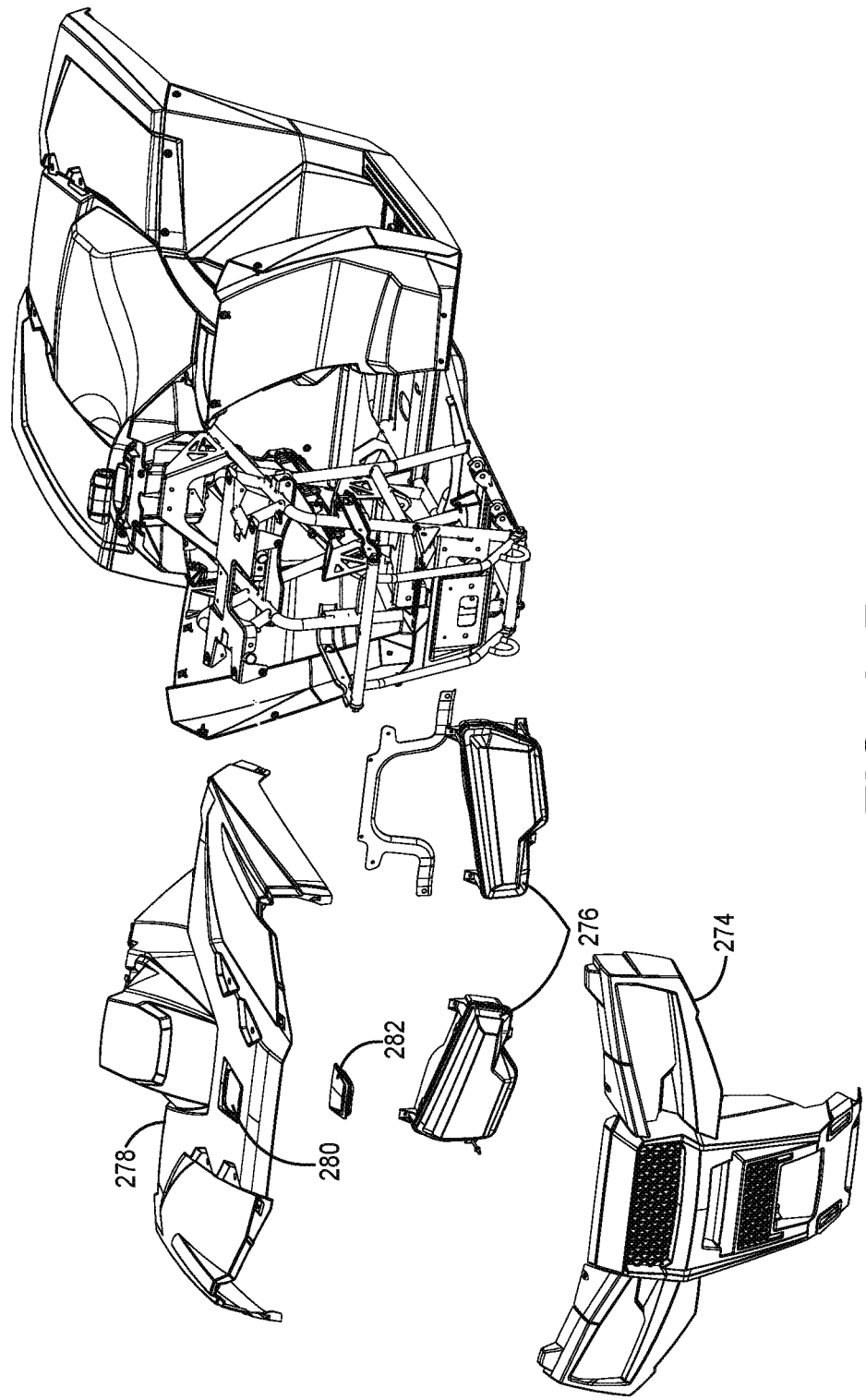
Figure 15C:
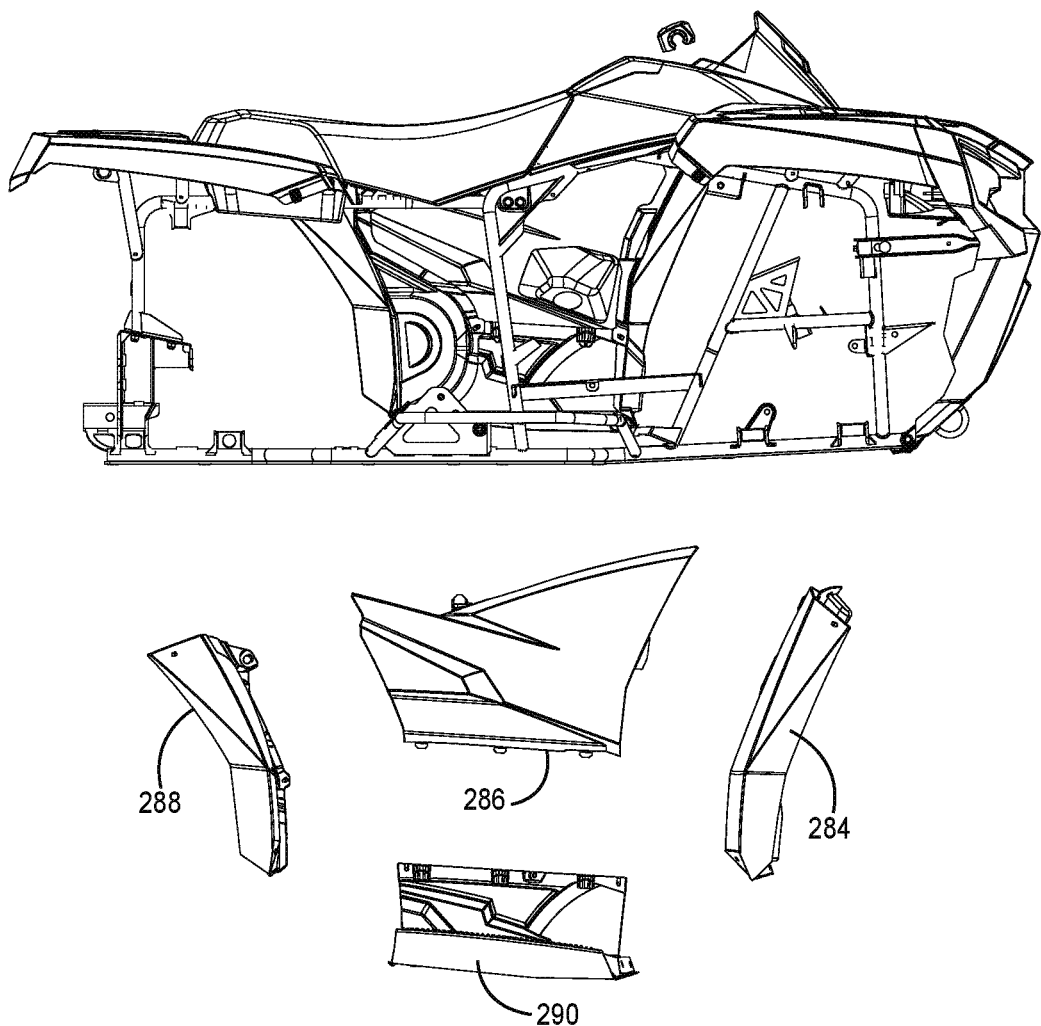
Figure 15D:
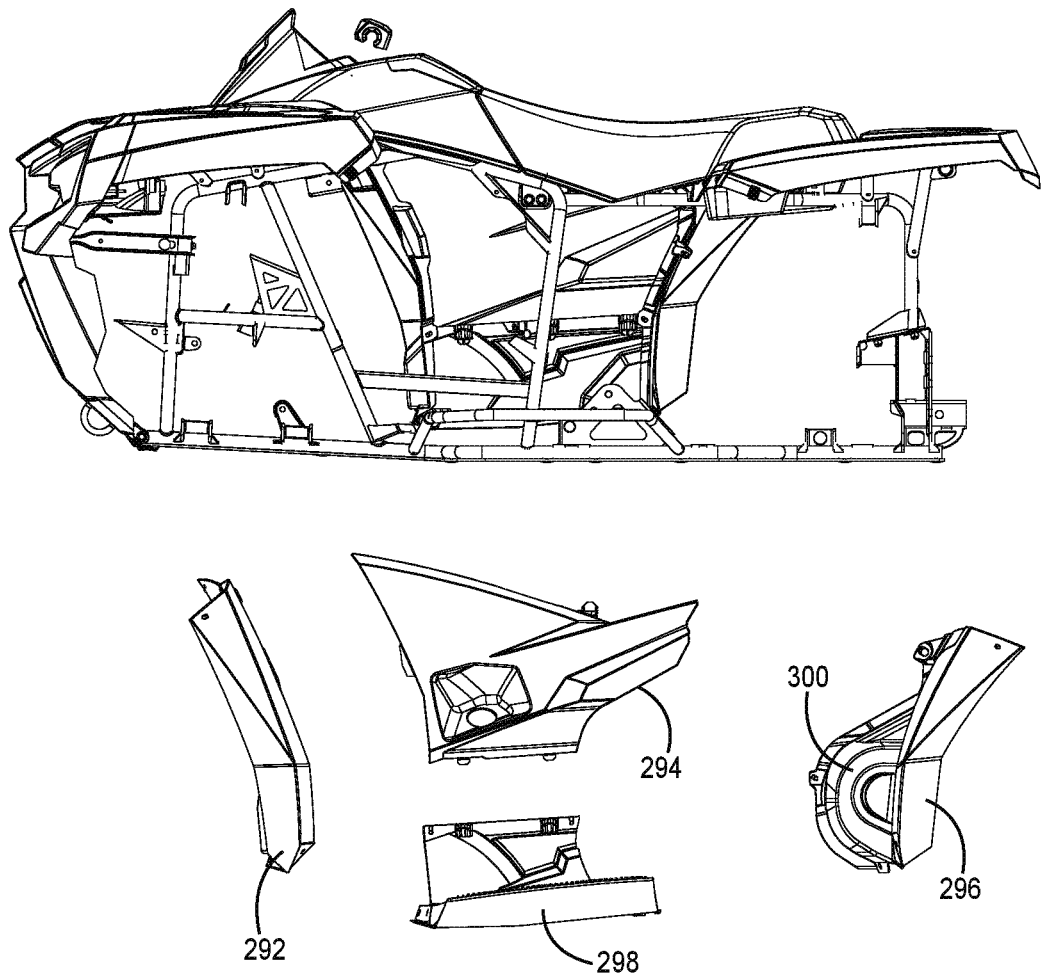
Figure 15E:
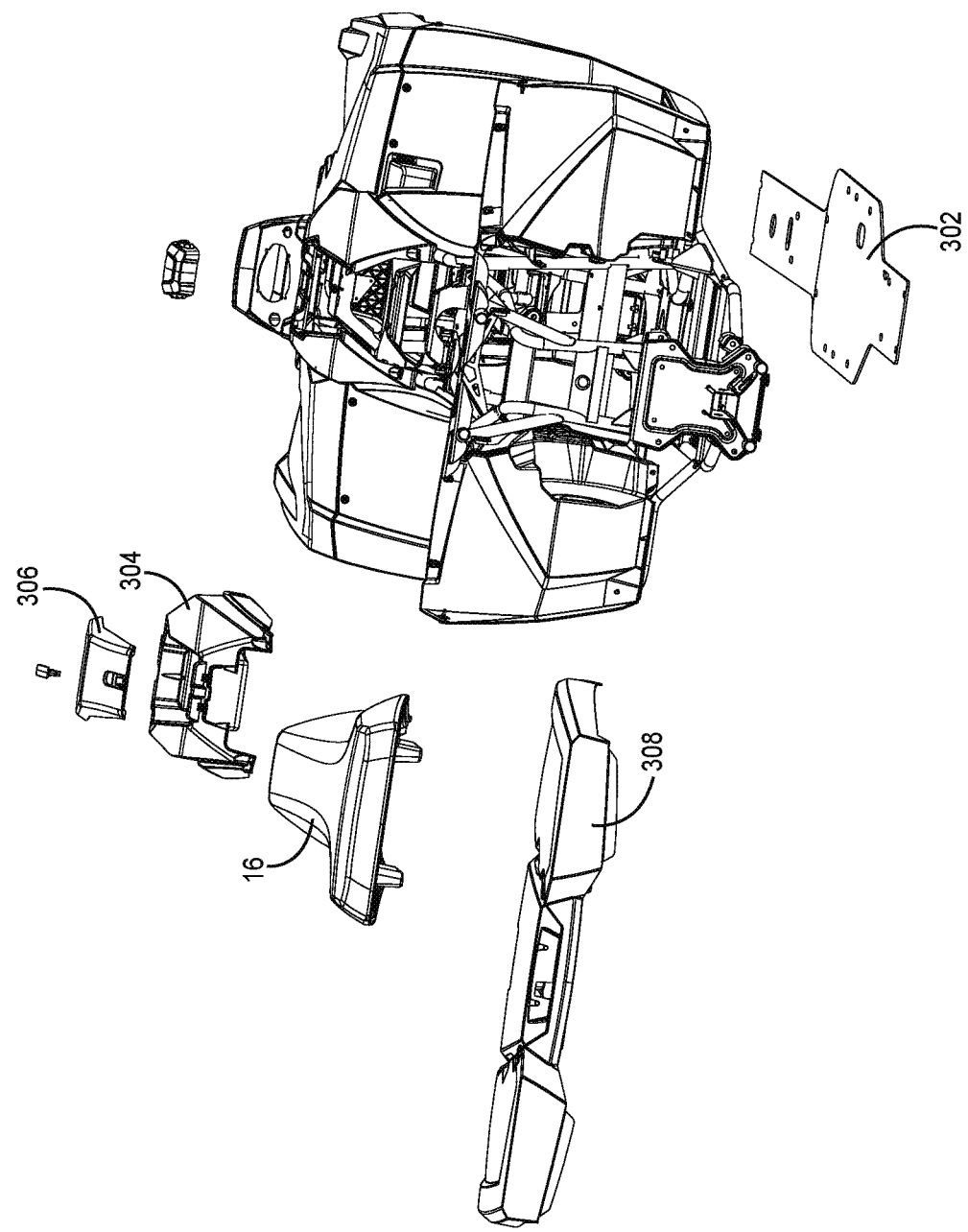
Figure 15F:
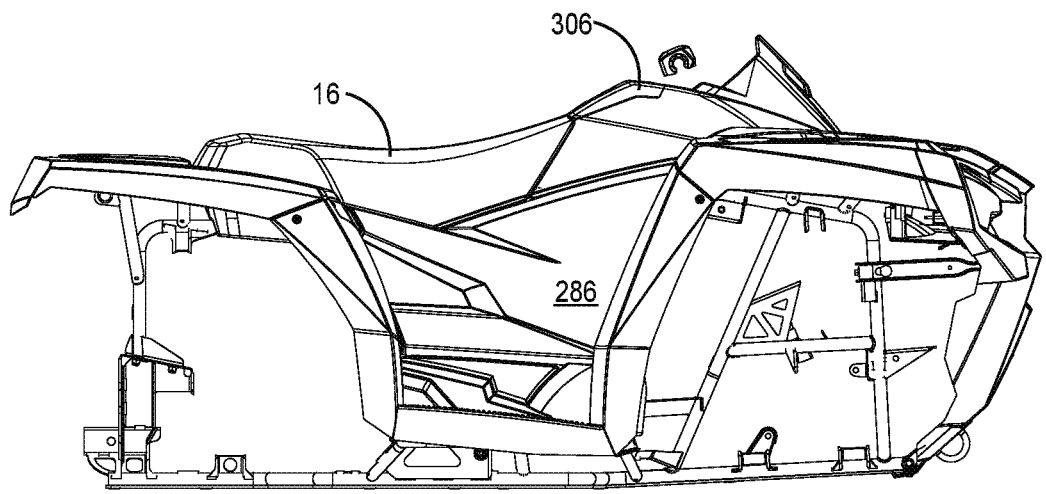
Figure 15G:
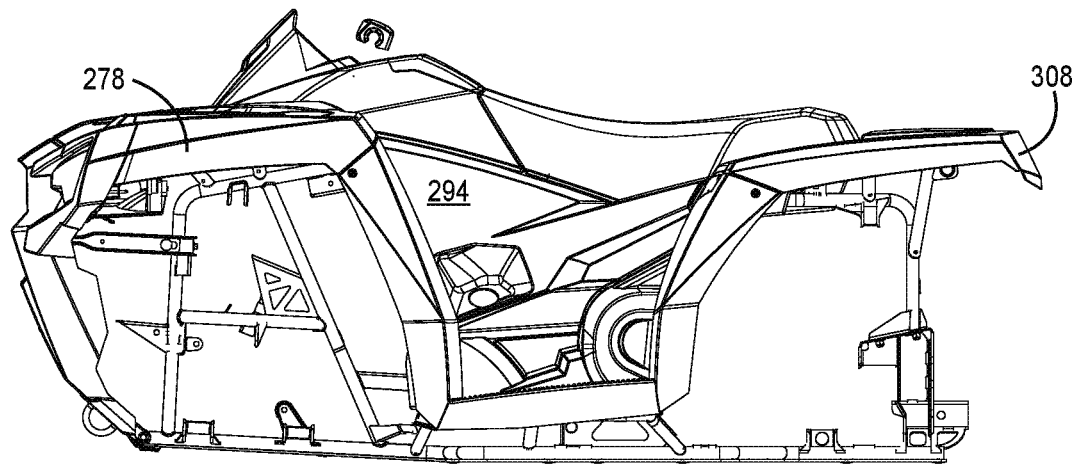
Figure 15J:
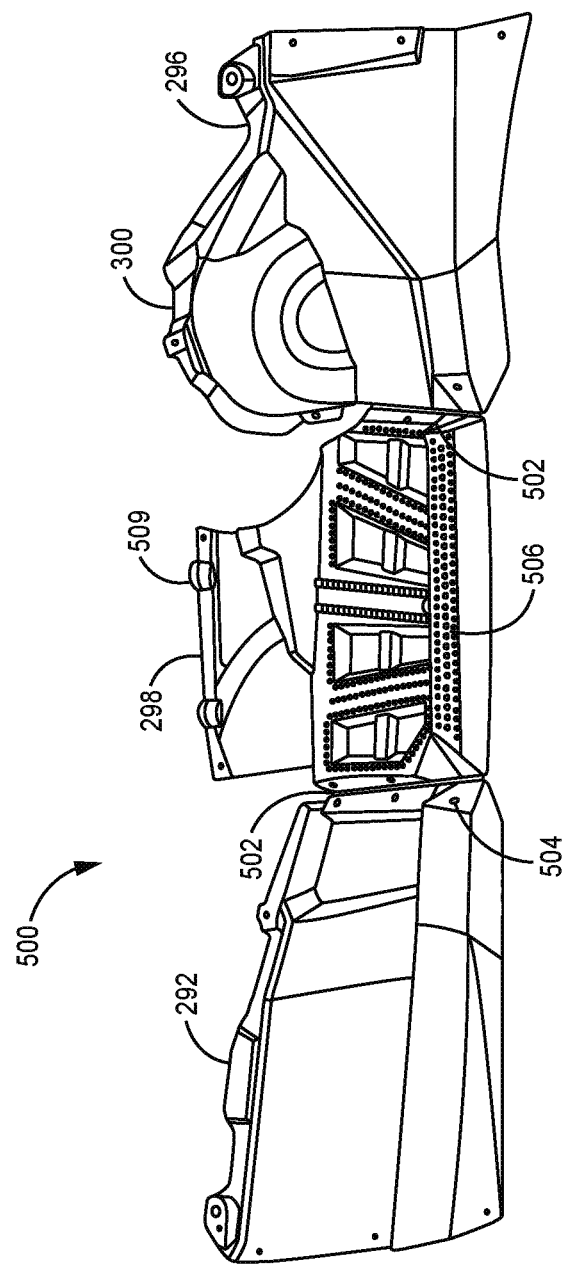
Figure 15K:
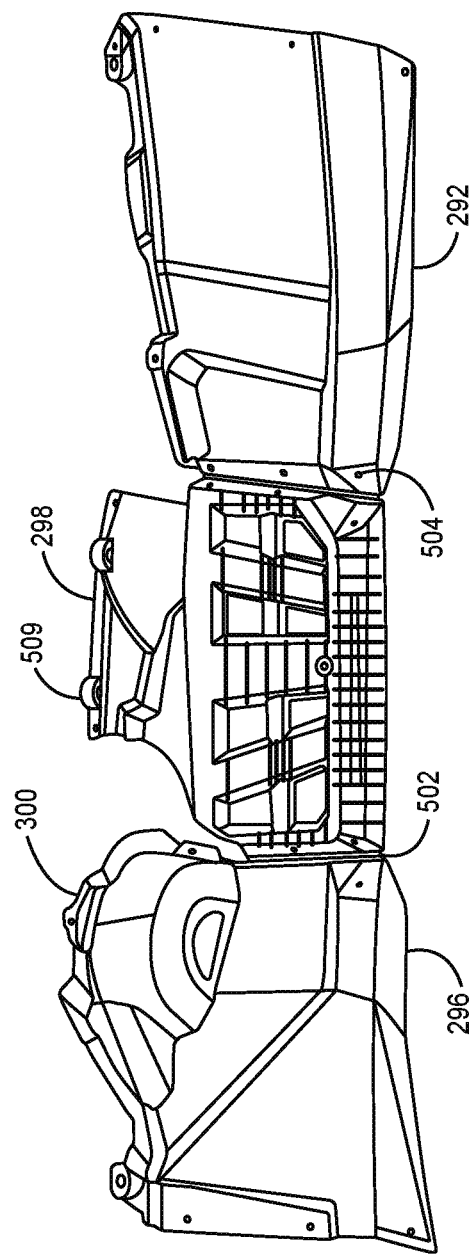
Figure 15L:
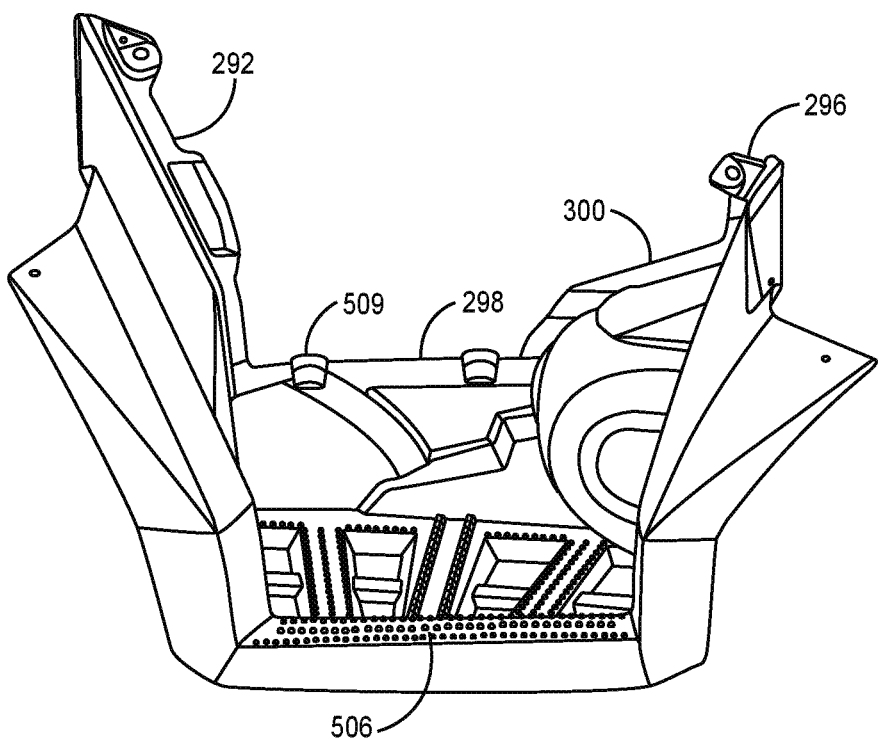
Figure 15M:
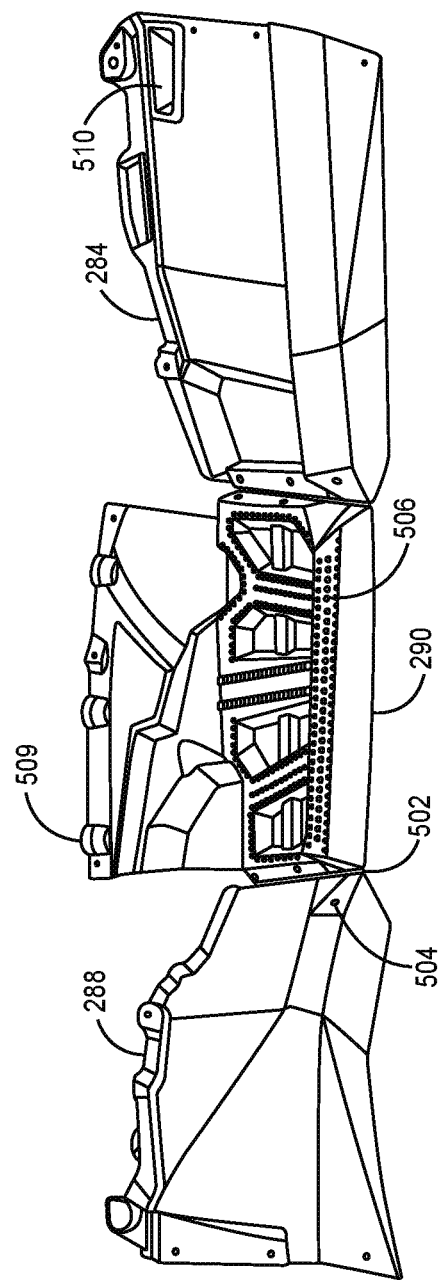
Figure 15N:
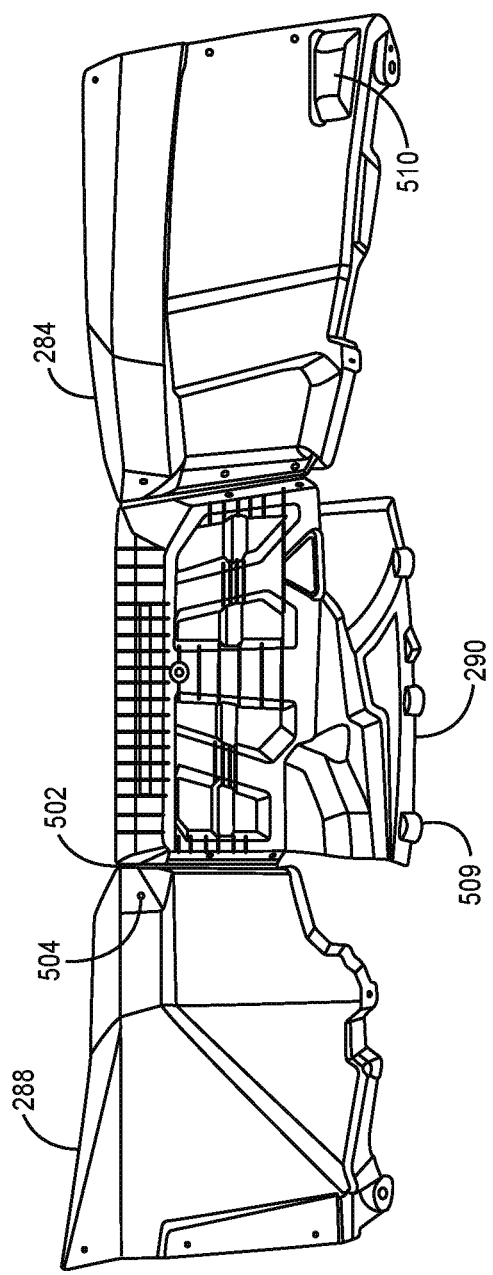
Figure 15O:
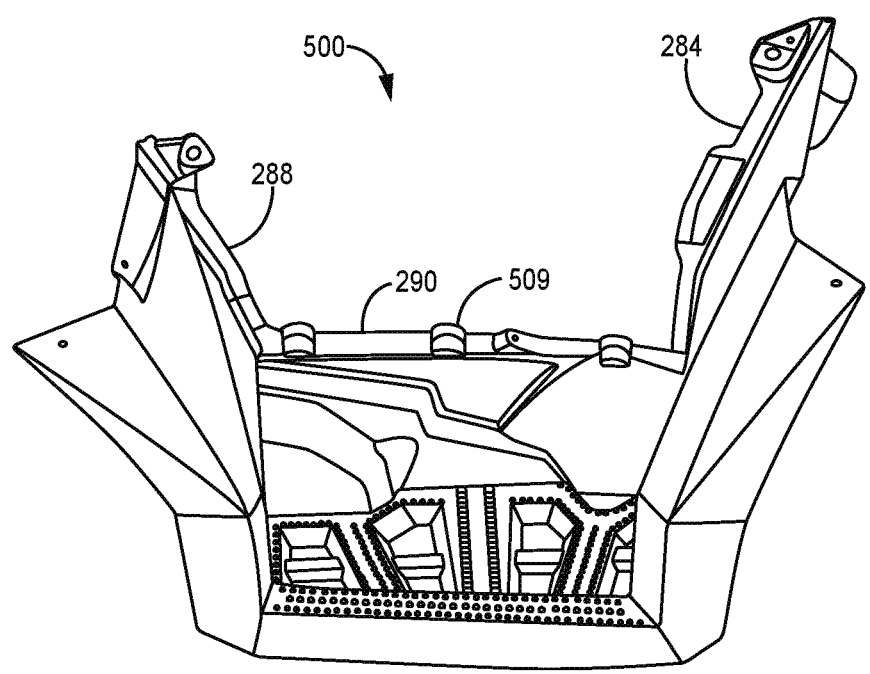

FIGS. 15A-O show illustrative examples of the body panels and footwells of the off-road vehicle 10. In some embodiments, the off-road vehicle 10 has a front fascia 274, which extends forwardly beyond at least a portion of headlights 276, and an upper front panel 278. In some embodiments, the upper front panel 278 has an opening 280 and an access tab panel 282 to permit access to the radiator cap. Regarding FIG. 15C, in some embodiments, a right side of the vehicle includes right front splash panel 284, right closeout panel 286, right rear splash panel 288, and right foot rest panel 290. Regarding FIG. 15D, in some embodiments, a left side of the vehicle includes a left front splash panel 292, left closeout panel 294, left rear splash panel 296, and left foot rest panel 298. In some embodiments, the left rear splash panel 296 includes a clutch recess portion 300 to provide clearance for the CVT housing 234 (FIG. 12B). As shown in FIGS. 15C and 15D, portions of the right foot rest panel 290 and left foot rest panel 298 extend upwardly to meet the respective closeout panels 286, 294 and also extend outwardly in the lateral direction of the vehicle to support the operator's foot. In some embodiments, the right foot rest panel 290 and left foot rest panel 298 are supported by respective foot support members 98 (FIG. 4B).

Referring to FIGS. 15J-O, perspective views of a single-piece, molded foot well system 500 is shown, according to some embodiments. Fully molded foot well systems have been used in the past, but suffer from extremely deep and costly molds and also do not stack or ship efficiently. Additionally, the size of a single molded foot well piece makes it difficult to form complex shapes due to tooling cost and mold limitations. As shown in FIGS. 15J-O, a foot well system 500 can utilize living hinges 502 to connect individual components in a mold, but have all components lay flat for storage and shipping. A living hinge 502 includes a thinner section of material between components to connect them, but be thin enough to fold them into a second or subsequent position for attachment. In this example (see FIG. 15J), left front splash panel 292 is connected to left foot rest panel 298 by living hinge 502. Similarly, left rear splash panel 296 is connected by a second living hinge 502 to left foot rest panel 298. FIGS. 15J and K show a flat configuration for storing or shipping. When folded into place and secured via securement holes 504, the foot well system 500 forms a complete unit (see configuration in FIG. 15L). FIGS. 15L-O show similar configurations on the right side of the vehicle. Clips 509 help secure the panels 298, 290 to additional engine panels, such as panel 286 or 294. The living hinge 502 can be contiguous material, or include windows between connection material or include any shape of material that connects components in a mold, but allows for bending into a second configuration when in an installation position. The system 500 can optionally include one hinge or two hinges, on either the right or left side of the vehicle.

Figure 1B:
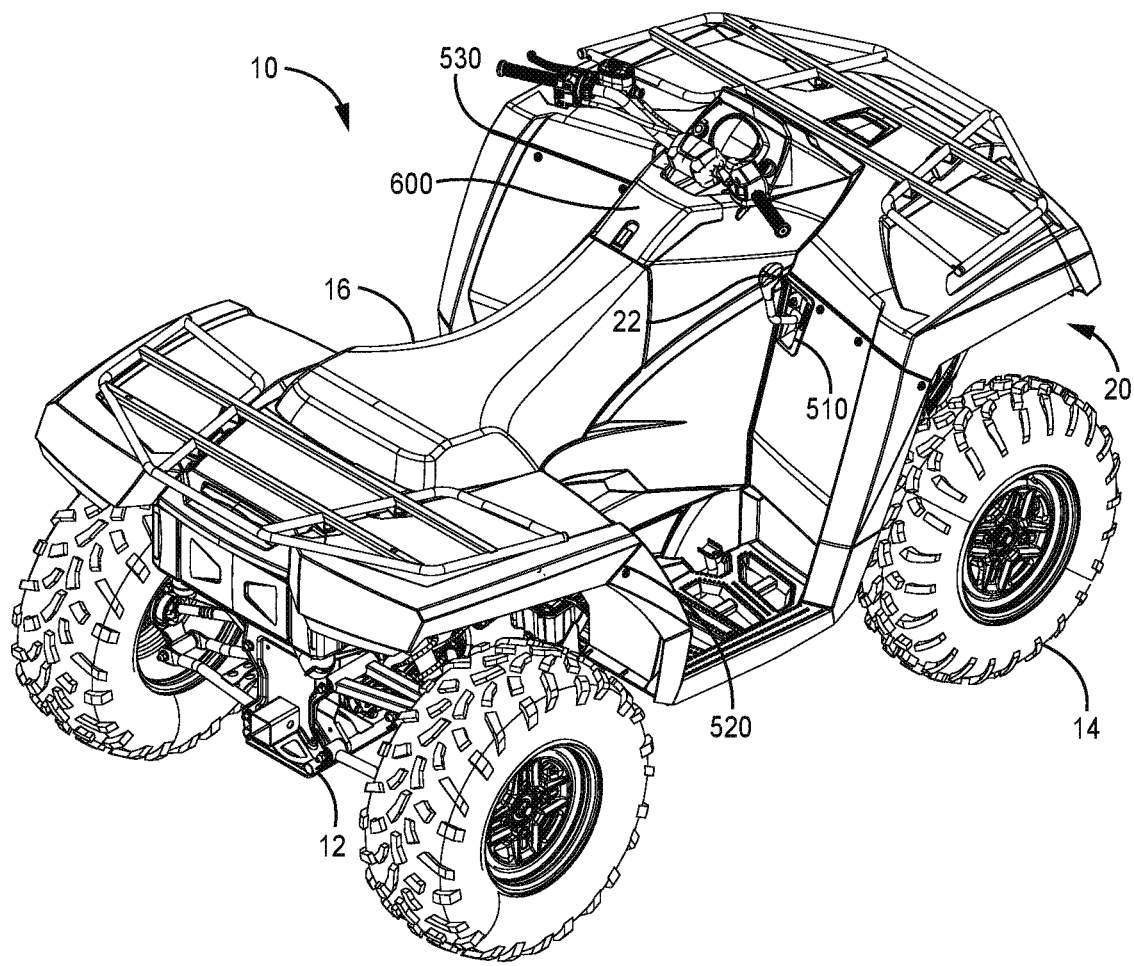
Figure 1C:
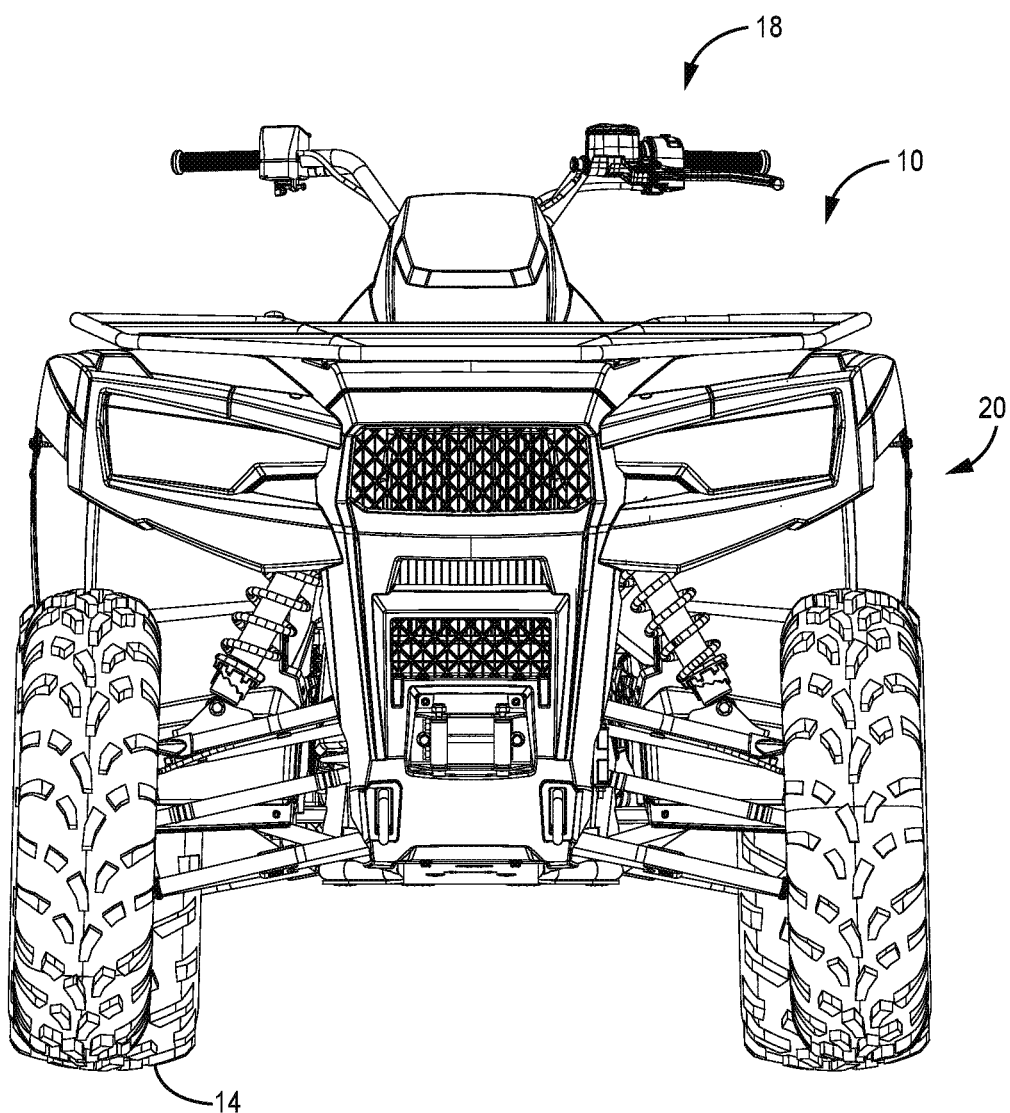
Figure 1D:
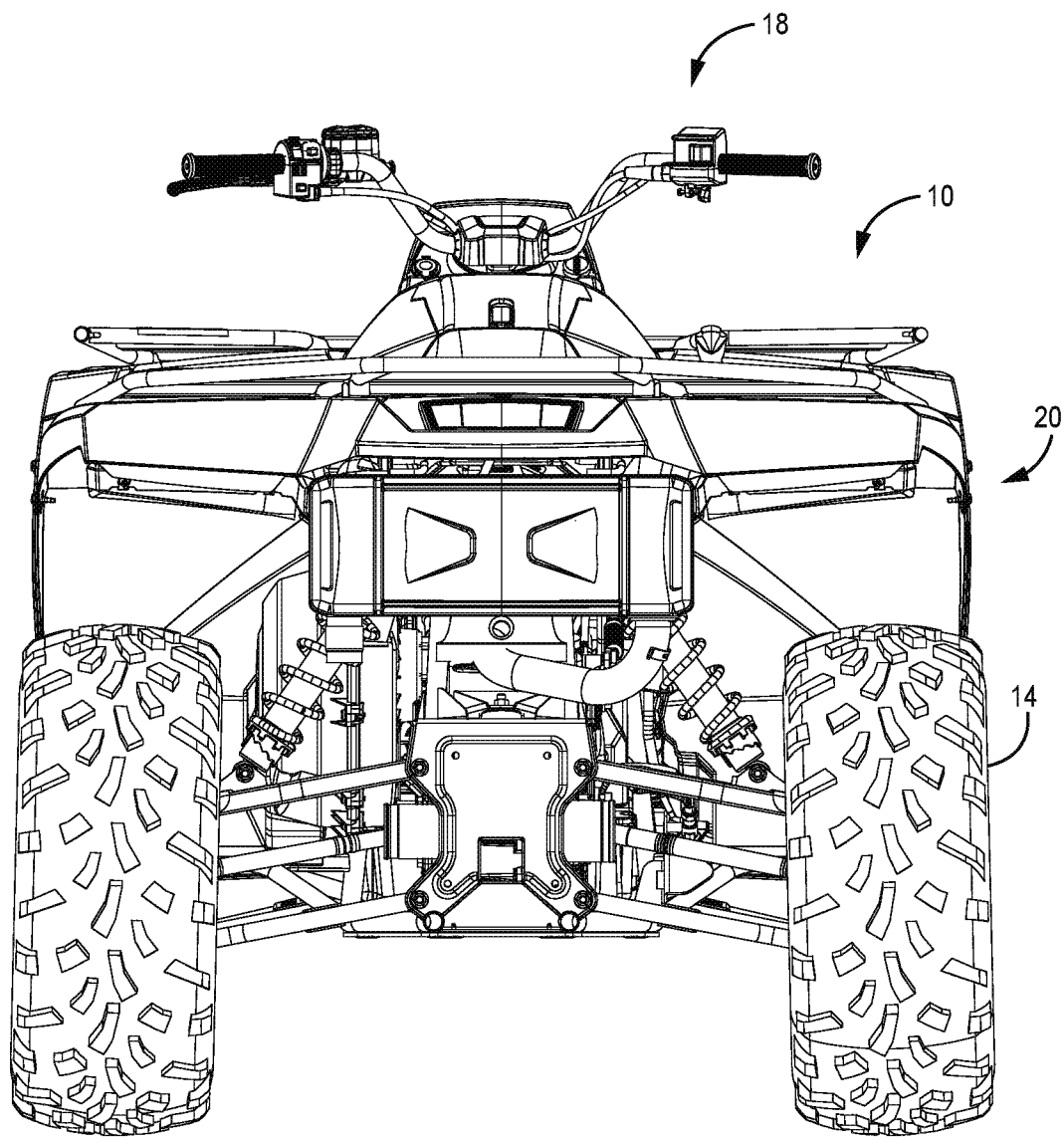
Figure 1E:
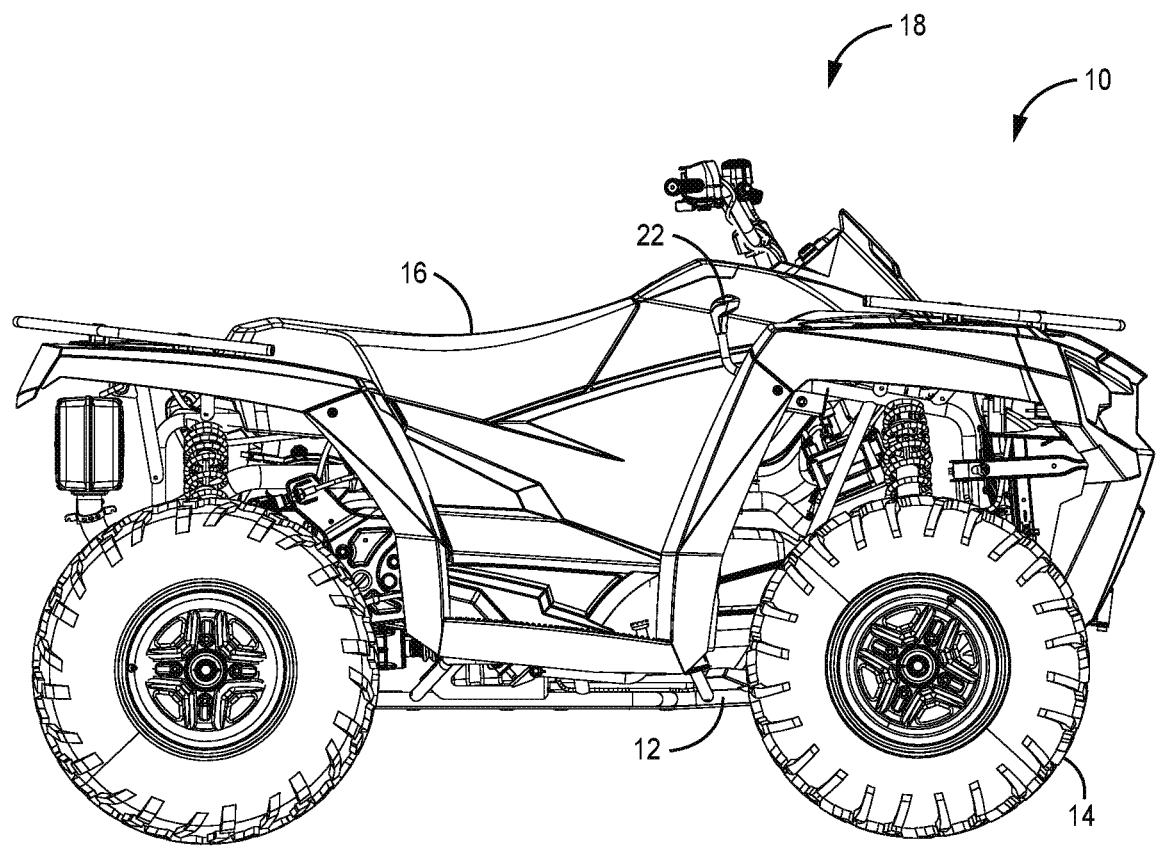
Figure 1F:
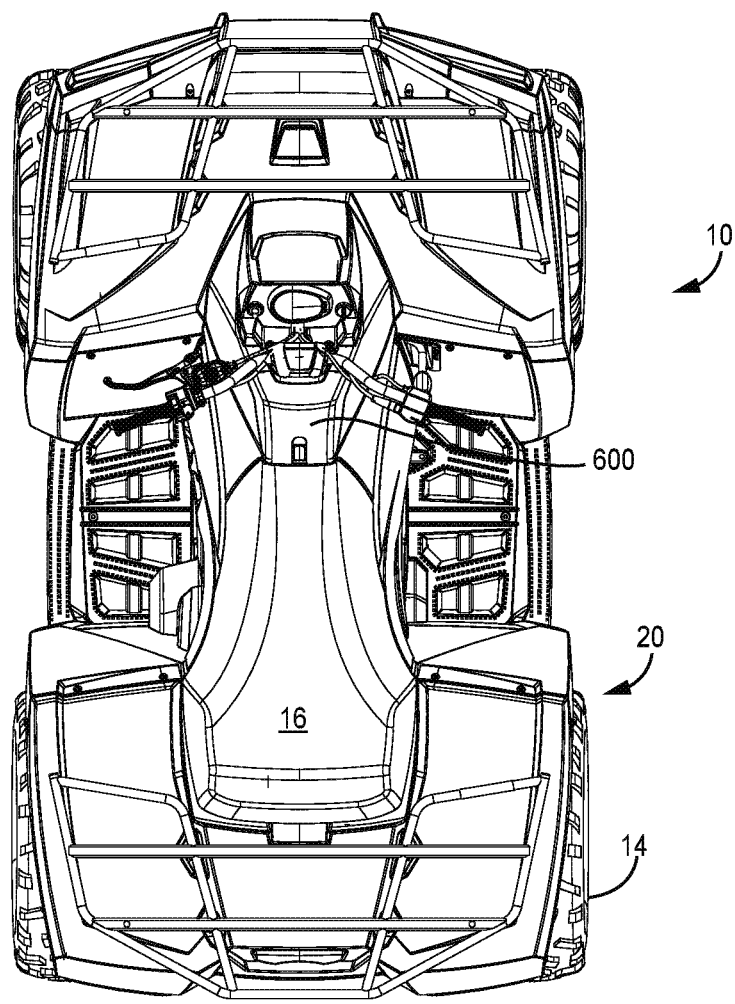

Because the system 500 can be formed in a single mold, the front panels 292, 284 and rear panels 288, 296 can be a longer, higher panel and connect with vehicle fender paneling at higher points (see seams 520 and 530 in FIGS. 1A-B, for example). The higher seam with front and rear fender allows for the fender to also be manufactured in a shallow or flat configuration, which saves on tooling and shipping costs. The seams 520, 530 can be positioned such that the fender panels they connect with allow for a substantially flat fender panel (see panel 278 for example). The rear seam 520 can be positioned in a horizontal plane with or adjacent to frame portion 110 (see FIG. 4C). The seam 520 may be higher in one example. The front seam 530 can be positioned in a horizontal plane with or adjacent to upper longitudinal frame member 88 (see FIG. 4C). The seam 530 may be higher in one example.

Additionally, the upper fenders are usually made with pigments and coatings (high gloss) that are more expensive than the textured/wear resistant material of the foot well system 500. Extending the wear resistant material up higher protects the appearance of the vehicle when used (this area is a relatively high wear/contact area for passengers). In one embodiment, any panels that connect via the living hinge 502 create an overlap of material when in an installation configuration and that overlap connection point is used to connect to the frame 12, such creates a stronger foot well system 500.

Figure 15P:
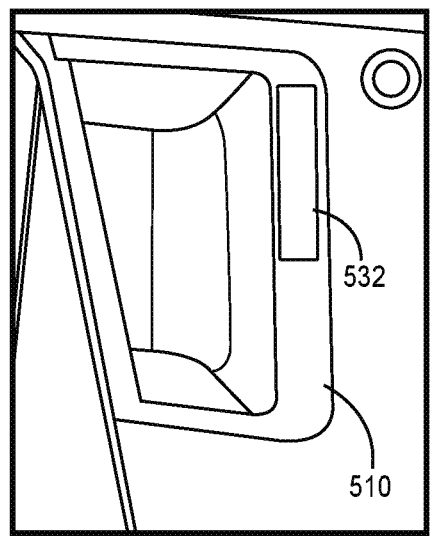
Figure 15Q:
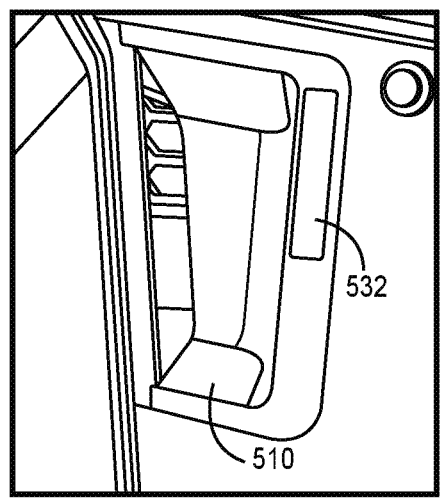

Shifter pass-through feature 510 (i.e., shift gate or recessed cavity) removes parts as it is integral to right front splash panel 284 (see FIGS. 15P-Q). The feature 510 allows for the shifter 22 to pass through and also includes molded shifter position indicators 532 (i.e., Park, Neutral, Drive, Reverse, etc.). This can be accomplished in the injection mold without the use of actions, due to the pull direction in the mold-ultimately reducing parts and producing a more aesthetically pleasing feature without witness lines.

Figure 15R:
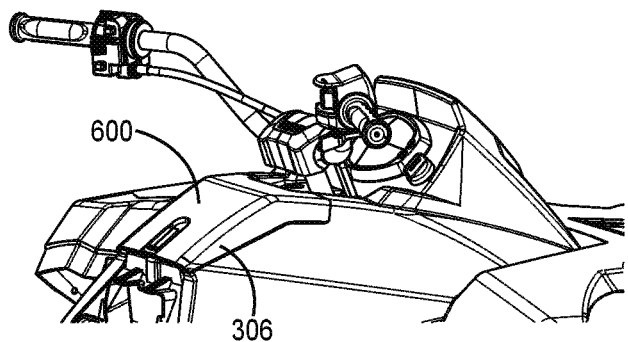
Figure 15S:
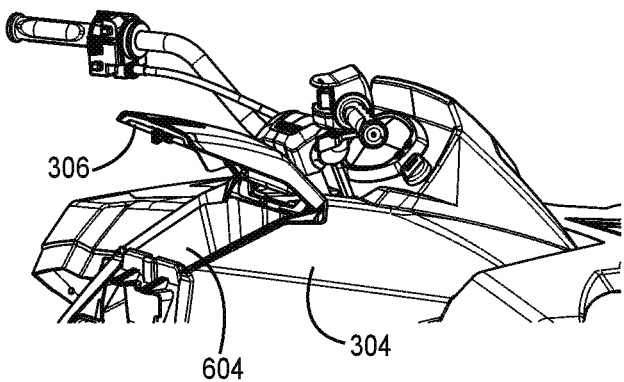
Figure 15T:
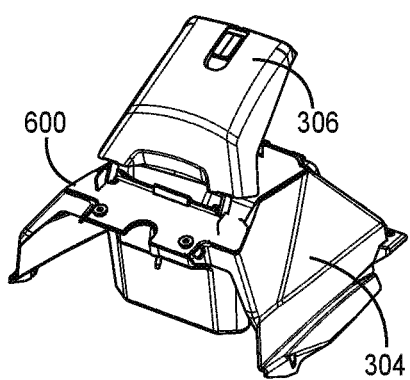

With regard to FIGS. 15E-I, in some embodiments, the off-road vehicle 10 includes a skid plate 302. Additionally in FIGS. 15R-T, in some embodiments, a console panel 304 and console panel cover 306 provide a storage area 600 forward of the straddle seat 16. An upper rear panel 308 extends over the rear ground engaging members.

Figure 16A:
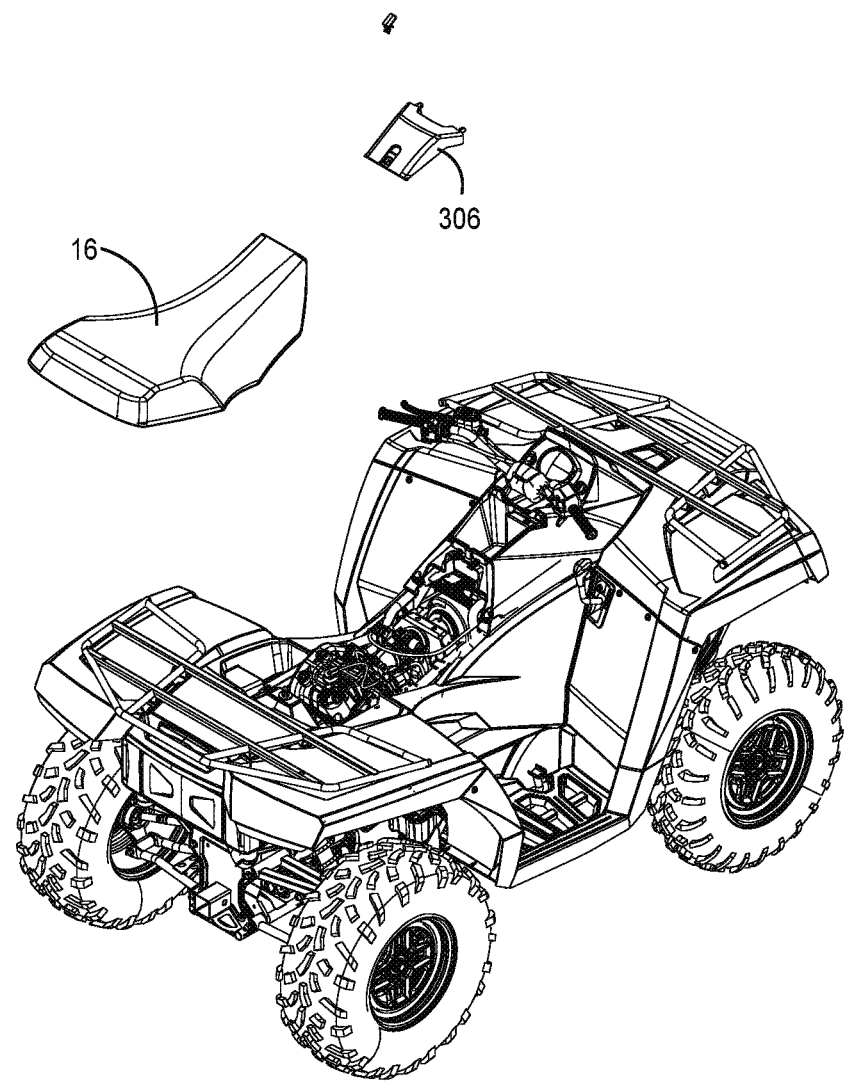
FIGS. 16A-B illustrate perspective views of seat supports of an off-road vehicle, according to some embodiments of the present disclosure.
Figure 16B:
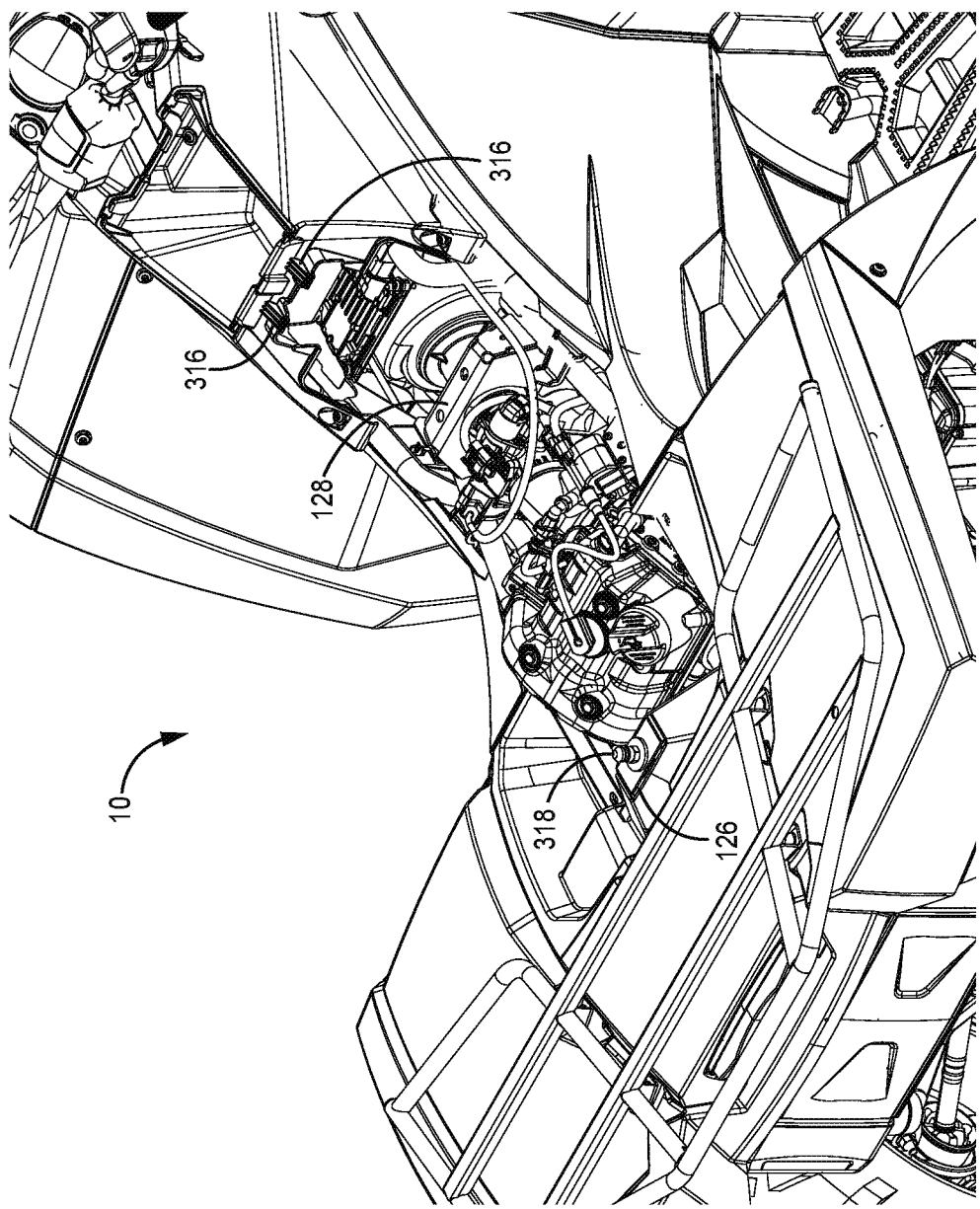

FIGS. 16A and 16B show views of the seat supports, such as rear seat support bracket 126 and front seat support bracket 128. In some embodiments, the straddle seat 16 is positioned on the off-road vehicle 10 via seat locating tabs 316. The seat locating tabs 316 fit into corresponding openings in a front portion of the straddle seat 16. Then, the straddle seat 16 can be rotated downwardly in the rear of the straddle seat 16 until a retaining feature on the bottom of the straddle seat 16 interfaces with retaining hub 318.

Figure 17:
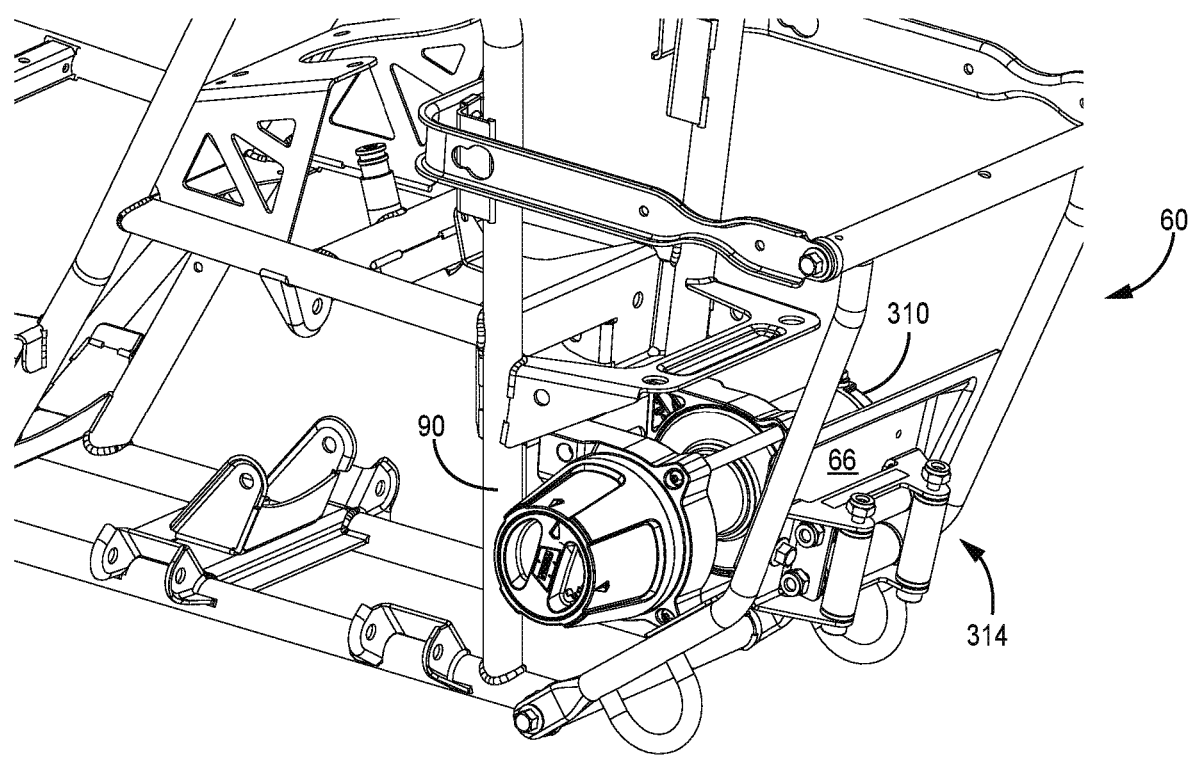
FIG. 17 illustrates a perspective view of a winch system, according to some embodiments of the present disclosure.

With regard to FIG. 17, a winch 310 is situated between middle cross member 66 of removable front frame portion 60 and first vertical members 90. In some embodiments, the winch is coupled to winch bracket 312 (FIG. 4B). In some embodiments, the winch guide assembly 314 is coupled to the middle cross member 66.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An offroad vehicle, comprising:
   a frame including a front end and a rear end;
   an engine connected to the frame, the engine including:
     a front portion and a rear portion,
     a single cylinder that extends vertically and rearwardly,
     an air intake port disposed in the front portion of the engine and facing towards the front end of the frame, and
     an exhaust port disposed in the rear portion of the engine facing towards the rear end of the frame;
   an engine exhaust system including an engine exhaust tube fluidly connected to the exhaust port, the engine exhaust tube extending from the rear portion of the engine towards the rear end of the frame;
   a drivetrain comprising:
     a continuously variable transmission housing;
     a drive clutch rotatably attached to the engine and positioned in the continuously variable transmission housing;
     a driven clutch positioned rearward of the drive clutch, the driven clutch is rotatably coupled to the drive clutch with a belt, the driven clutch and the belt are positioned in the continuously variable transmission housing;
   a straddle seat connected to the frame, the engine being disposed under the straddle seat;
   a first foot support disposed on a first side of a longitudinal center plane of the offroad vehicle; and
   a second foot support disposed on a second side of the longitudinal center plane.

2. The offroad vehicle of claim 1, wherein a center axis of the single cylinder is inclined at an angle of 30 degrees or more relative to a vertical plane.

3. The offroad vehicle of claim 2, wherein a first plane extending through a rotational axis of the drive clutch and a cylinder head of the single cylinder passes through the straddle seat.

4. The offroad vehicle of claim 3, further comprising an air filter assembly connected to the frame and fluidly connected to the air intake port of the engine, wherein at least a portion of the air filter assembly is disposed in front of the front portion of the engine.

5. The offroad vehicle of claim 4, wherein the air filter assembly is disposed entirely longitudinally between the front end of the frame and the first plane extending through the rotational axis of the drive clutch and the cylinder head.

6. The offroad vehicle of claim 5, wherein at least one portion of the engine exhaust tube is disposed vertically between a top end and a bottom end of the continuously variable transmission housing.

7. The offroad vehicle of claim 6, wherein the at least one portion of the engine exhaust tube is positioned vertically within a circumference of a cylindrical surface defined by a perimeter of the driven clutch.

8. The offroad vehicle of claim 7, wherein the continuously variable transmission housing extends rearward of the exhaust port, and the at least one portion of the engine exhaust tube is positioned rearward of the continuously variable transmission housing.

9. The offroad vehicle of claim 3, wherein the engine exhaust system includes a muffler in fluid communication with the engine exhaust tube, wherein the muffler is entirely disposed vertically between an uppermost portion of the engine and the rotational axis of the driven clutch.

10. The offroad vehicle of claim 9, wherein the muffler is disposed vertically between a first axis passing through the rotational axis of the drive clutch and the rotational axis of the driven clutch, and the first plane.

11. The offroad vehicle of claim 1, wherein the exhaust port is below a horizontal plane passing through a top end of a secondary pulley.

12. The offroad vehicle of claim 1, wherein the first foot support and the second foot support are connected to the frame.

13. The offroad vehicle of claim 1, further comprising an air intake duct connected to the continuously variable transmission housing, the air intake duct defining an air intake disposed forward of the continuously variable transmission housing and the engine.

14. The offroad vehicle of claim 13, further comprising a shift lever operably connected to the frame at a first point, wherein the air intake is positioned forward of the shift lever along a length of the offroad vehicle and higher than the first point where the shift lever is operably connected to the frame.

15. The offroad vehicle of claim 14, further comprising a steering column, wherein the air intake duct includes a rearward end positioned along the length of the offroad vehicle rearward of the steering column, and a forward end defining the air intake, wherein the air intake is positioned along the length of the offroad vehicle forward of an upper portion of the steering column and rearward of a front wheel axis of rotation when the front wheel axis of rotation is perpendicular to the longitudinal center plane of the offroad vehicle.

16. The offroad vehicle of claim 1, further comprising an air exhaust duct connected to the continuously variable transmission housing, the air exhaust duct defining an air outlet positioned vertically higher than the continuously variable transmission housing, the exhaust port of the engine and the engine exhaust tube, wherein the air outlet is positioned rearward of a drive clutch axis of rotation, and wherein the air outlet is directed rearward and inward towards the longitudinal center plane of the offroad vehicle.

17. The offroad vehicle of claim 16, wherein the air outlet is positioned closer to the longitudinal center plane of the offroad vehicle than a portion of the engine exhaust system.

18. The offroad vehicle of claim 17, wherein the offroad vehicle includes a first side separated from a second side, the air exhaust duct includes a rearward end connected to a muffler on the first side of the longitudinal center plane of the offroad vehicle, and the muffler includes an exhaust outlet positioned on the second side of the longitudinal center plane.

19. The offroad vehicle of claim 1, further comprising a plurality of wheels, at least one of the plurality of wheels being operatively connected to the engine for propelling the offroad vehicle, and a steering assembly supported by the frame and operatively connected to at least one of the plurality of wheels to steer the offroad vehicle.

* * * * *